United States Patent
Volker et al.

(10) Patent No.: US 11,796,704 B2
(45) Date of Patent: Oct. 24, 2023

(54) MONITORING WELLBORE SCALE AND CORROSION

(71) Applicant: Saudi Arabian Oil Company, Dhahran (SA)

(72) Inventors: Arno Willem Frederik Volker, Delft (NL); Abubaker Saeed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 317 days.

(21) Appl. No.: 17/190,982

(22) Filed: Mar. 3, 2021

(65) Prior Publication Data

US 2022/0283331 A1 Sep. 8, 2022

(51) Int. Cl.
*G01V 1/50* (2006.01)
*E21B 47/00* (2012.01)
(Continued)

(52) U.S. Cl.
CPC .............. *G01V 1/50* (2013.01); *E21B 47/006* (2020.05); *G01V 1/523* (2013.01); *E21B 47/12* (2013.01)

(58) Field of Classification Search
CPC ... G01V 1/50; G01V 1/48; G01V 1/44; G01V 1/40; G01V 1/523; G01V 2001/526;
(Continued)

(56) References Cited

U.S. PATENT DOCUMENTS 5,081,611 A * 1/1992 Hornby .................... G01V 1/50
367/27
5,092,176 A 3/1992 Buttram et al.
(Continued)

FOREIGN PATENT DOCUMENTS

WO WO-2018125078 A1 * 7/2018 ............. E21B 43/12

OTHER PUBLICATIONS

Bang, Su & Lee, Yeong & Shin, youn-jeong. (2021). Defect Detection in Pipelines via Guided Wave Based Time-Frequency Domain Reflectometry. IEEE Transactions on Instrumentation and Measurement. pp. 1-1. 10.1109/TIM.2021.3055277. (Year: 2021).*
(Continued)

*Primary Examiner* — Daniel R Miller
*Assistant Examiner* — Eric Sebastian Von Wald
(74) *Attorney, Agent, or Firm* — Fish & Richardson P.C.

(57) ABSTRACT

Some methods of scale and corrosion monitoring of a well include receiving information from a plurality of transducers disposed in a ring on a circumference of a tubing of the well, the received information including frequency domain information representing a first longitudinal ultrasonic wave and a first torsional ultrasonic wave to arrive at the plurality of transducers; determining arrival times for the first longitudinal ultrasonic wave and the first torsional ultrasonic wave to arrive at the plurality of transducers based on the received information; comparing the determined arrival times with a range of predetermined arrival times from a model that accounts for wave refraction using a ray tracing scheme to determine a wall thickness of the tubing, a scale thickness of scale within the tubing, and a scale shear wave velocity of the scale; and identifying a material of the scale based on the determined scale shear wave velocity.

25 Claims, 44 Drawing Sheets
(18 of 44 Drawing Sheet(s) Filed in Color)

(51) Int. Cl.
  *G01V 1/52* (2006.01)
  *E21B 47/12* (2012.01)
(58) Field of Classification Search
  CPC ............... G01V 1/52; G01S 7/2883; G05B
      2219/34048; G06T 2207/20056; G21B
      47/006; E21B 47/12; E21B 47/14; E21B
      47/16; E21B 47/007; H04L 27/265; H04B
      2201/70727; H03M 1/1085
  See application file for complete search history.

(56) References Cited

U.S. PATENT DOCUMENTS

| | | | |
|---|---|---|---|
| 9,026,376 | B2 | 5/2015 | Volker et al. |
| 9,638,671 | B2 | 5/2017 | Borigo et al. |
| 9,759,556 | B2 | 9/2017 | Davis et al. |
| 9,803,976 | B2 | 10/2017 | Simonetti et al. |
| 10,253,615 | B2 | 4/2019 | Hunter et al. |
| 2009/0139337 | A1* | 6/2009 | Owens ............... G01N 29/2412 73/622 |
| 2009/0150094 | A1* | 6/2009 | Van Velsor ........ G01N 29/2462 702/56 |
| 2011/0041612 | A1* | 2/2011 | Paige ................. G01N 29/2412 73/623 |
| 2015/0053009 | A1 | 2/2015 | Yan et al. |

OTHER PUBLICATIONS

Ghavamian A, Mustapha F, Baharudin BTHT, Yidris N. Detection, Localisation and Assessment of Defects in Pipes Using Guided Wave Techniques: A Review. Sensors. 2018; 18(12):4470. https://doi.org/10.3390/s18124470 (Year: 2018).*

Volker, Arno. (2018). Guided wave tomography in anisotropic media using recursive extrapolation operators. AIP Conference Proceedings. 1949. 090001. 10.1063/1.5031564. (Year: 2018).*

Huthwaite, "Evaluation of inversion approaches for guided wave thickness mapping," Proceedings of the Royal Society A, Mar. 2014, 470:20140063, 28 pages.

Huthwaite, "Improving accuracy through density correction in guided wave tomography," Proceedings of the Royal Society A, Jan. 2016, 472:20150832, 25 pages.

Petrowiki.spe.org [online], "Scale Problems in Production," available on or before Jan. 15, 2018, retrieved on Feb. 16, 2021, retrieved from URL <https://petrowiki.spe.org/Scale_problems_in_production>, 15 pages.

Rao et al., "Guided Wave Tomography Based on Full Waveform Inversion," IEEE Transactions on Ultrasonics, Ferroelectrics and Frequency Control, May 2016, 63:5, 9 pages.

Rao et al., "Guided Wave Tomography Based on Full Waveform Inversion," Manuscript, The School of Mechanical and Aerospace Engineering, Nanyang Technology University, Feb. 26, 2016, 33 pages.

Saeed et al., "Innovative Permanent Down-Hole Scale and Corrosion Monitoring SystemUsing Ultrasound Guided Waves Technology," SPE-198609-MS, Society of Petroleum Engineers (SPE), presented at the SPE Gas & Oil Technology Showcase and Conference, Dubai, UAE, Oct. 21-23, 2019, 10 pages.

PCT International Search Report and Written Opinion in International Appln. No. PCT/US2022/018355, dated Jun. 15, 2022, 17 pages.

Saeed et al., "Innovative Permanent Down-Hole Scale and Corrosion Monitoring System Using Ultrasound Guided Waves Technology," SPE Gas & Oil Technology Showcase and Conference, Oct. 2019, 198609: 1-11.

* cited by examiner

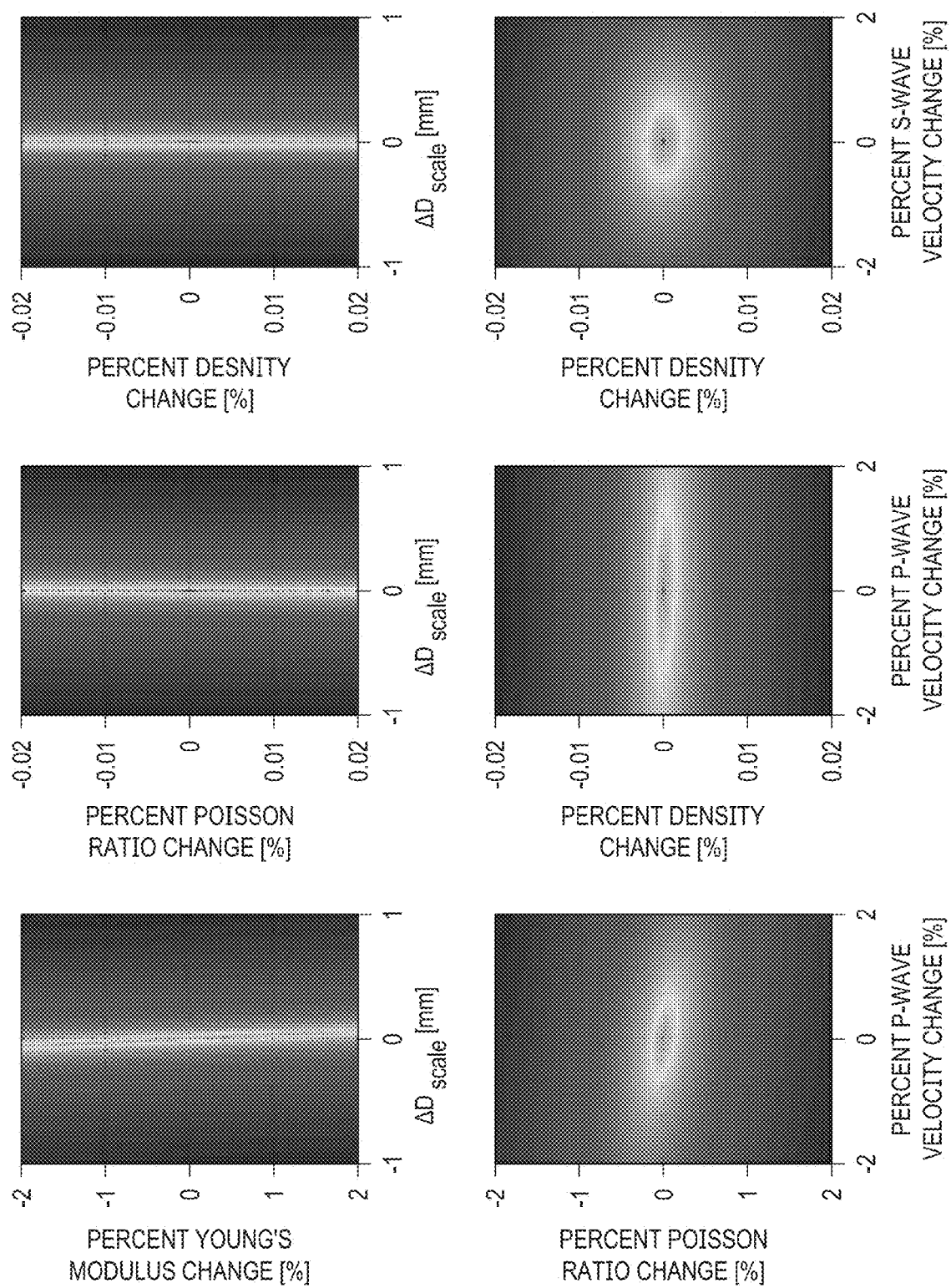

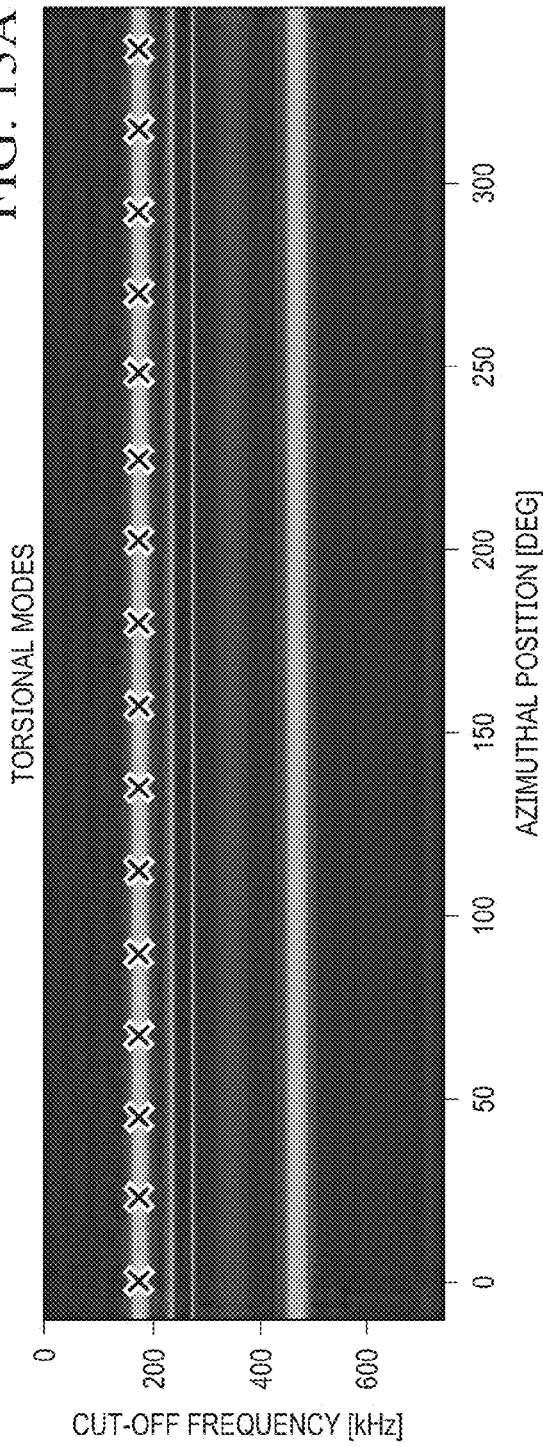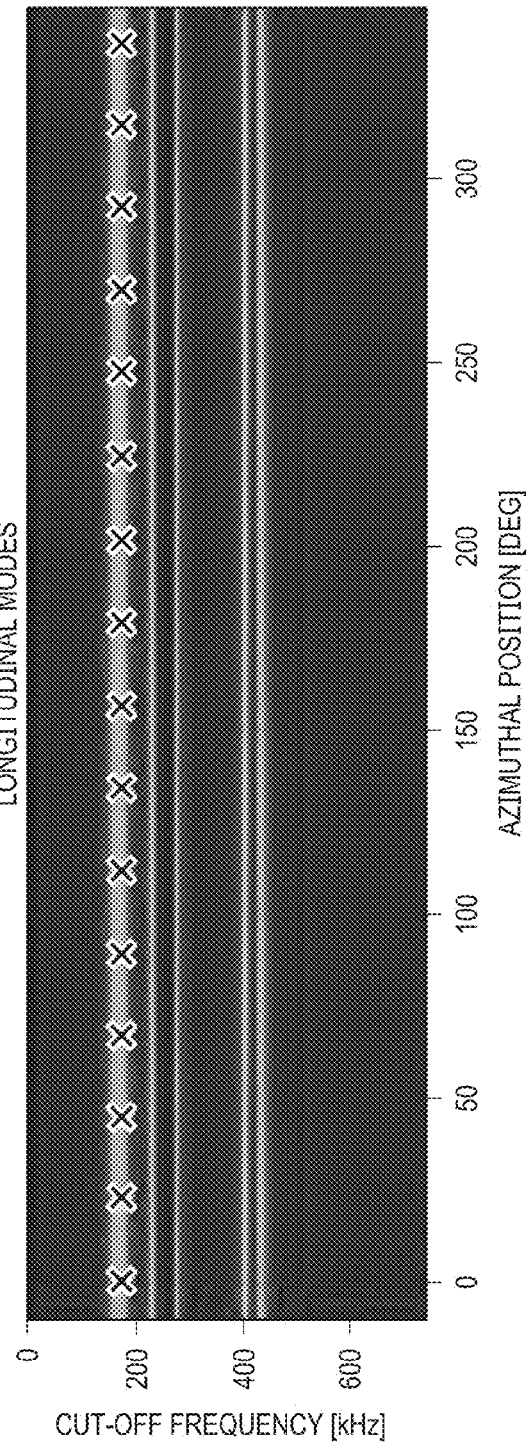

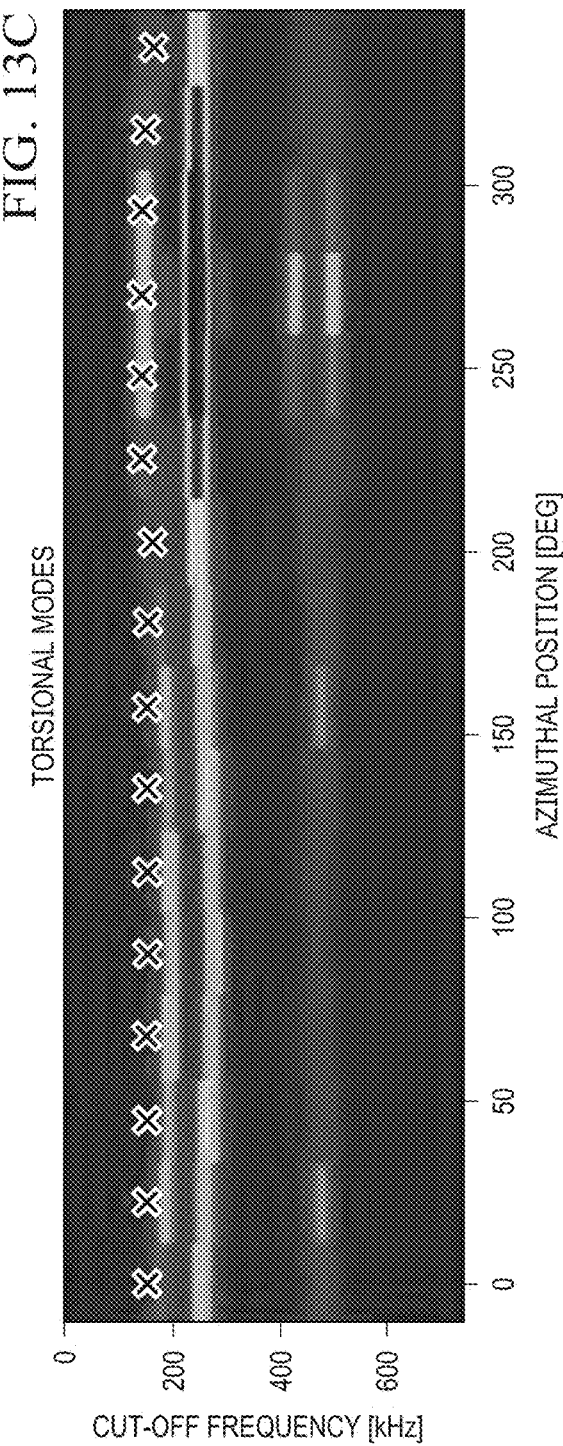
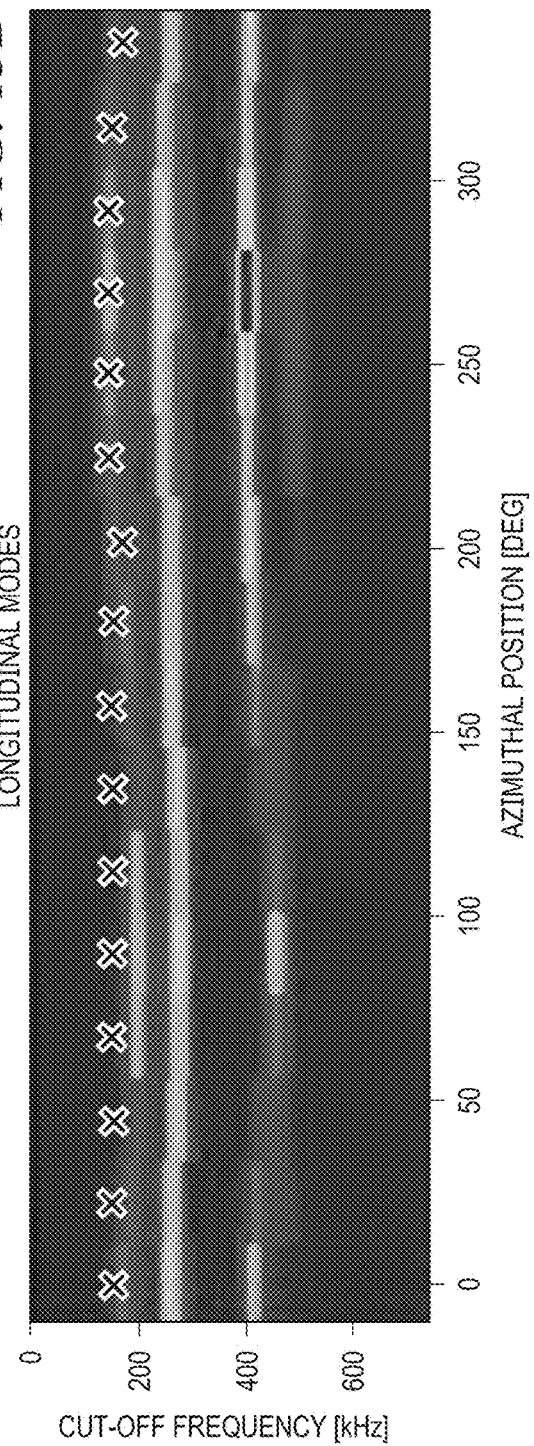

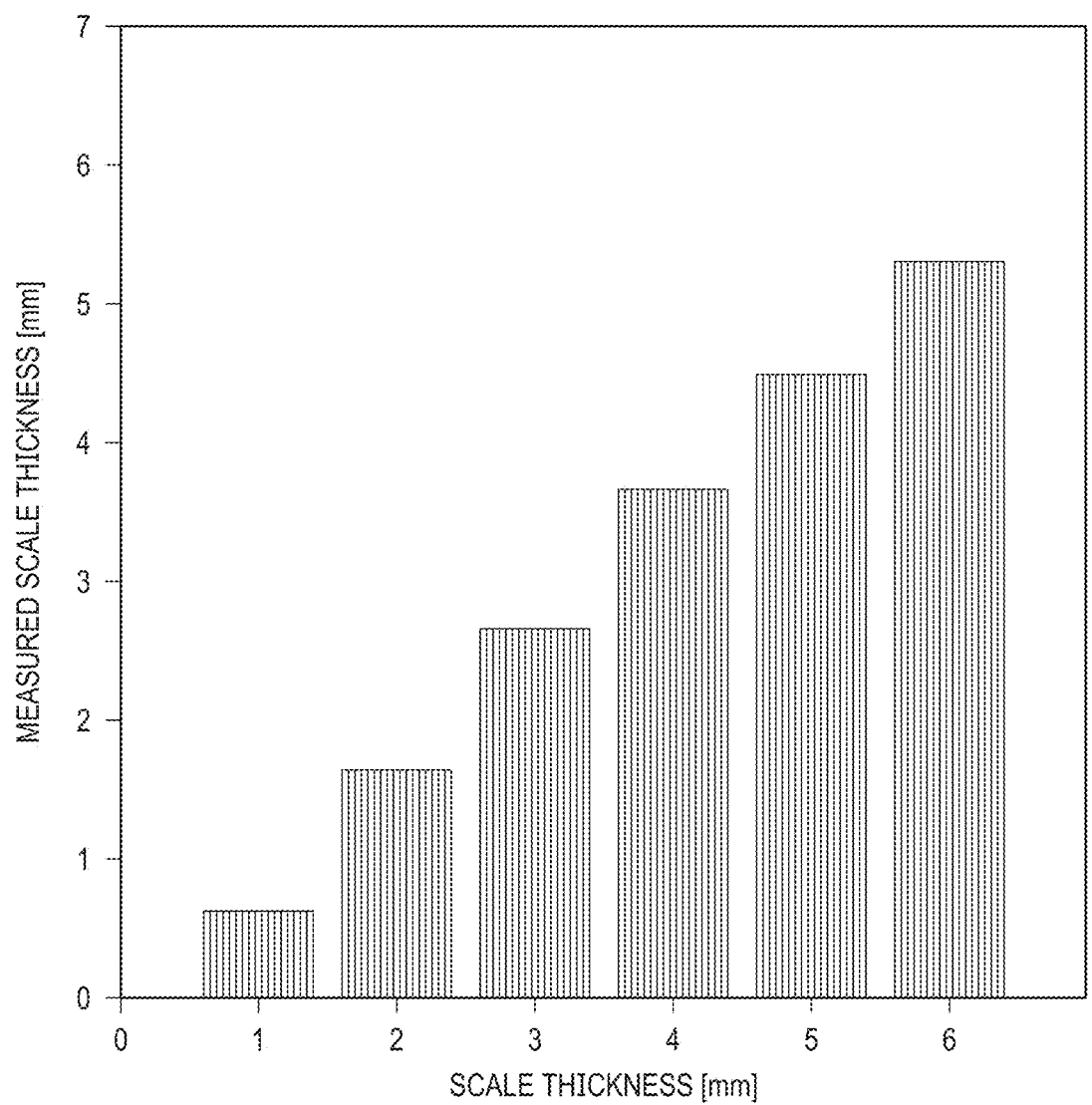

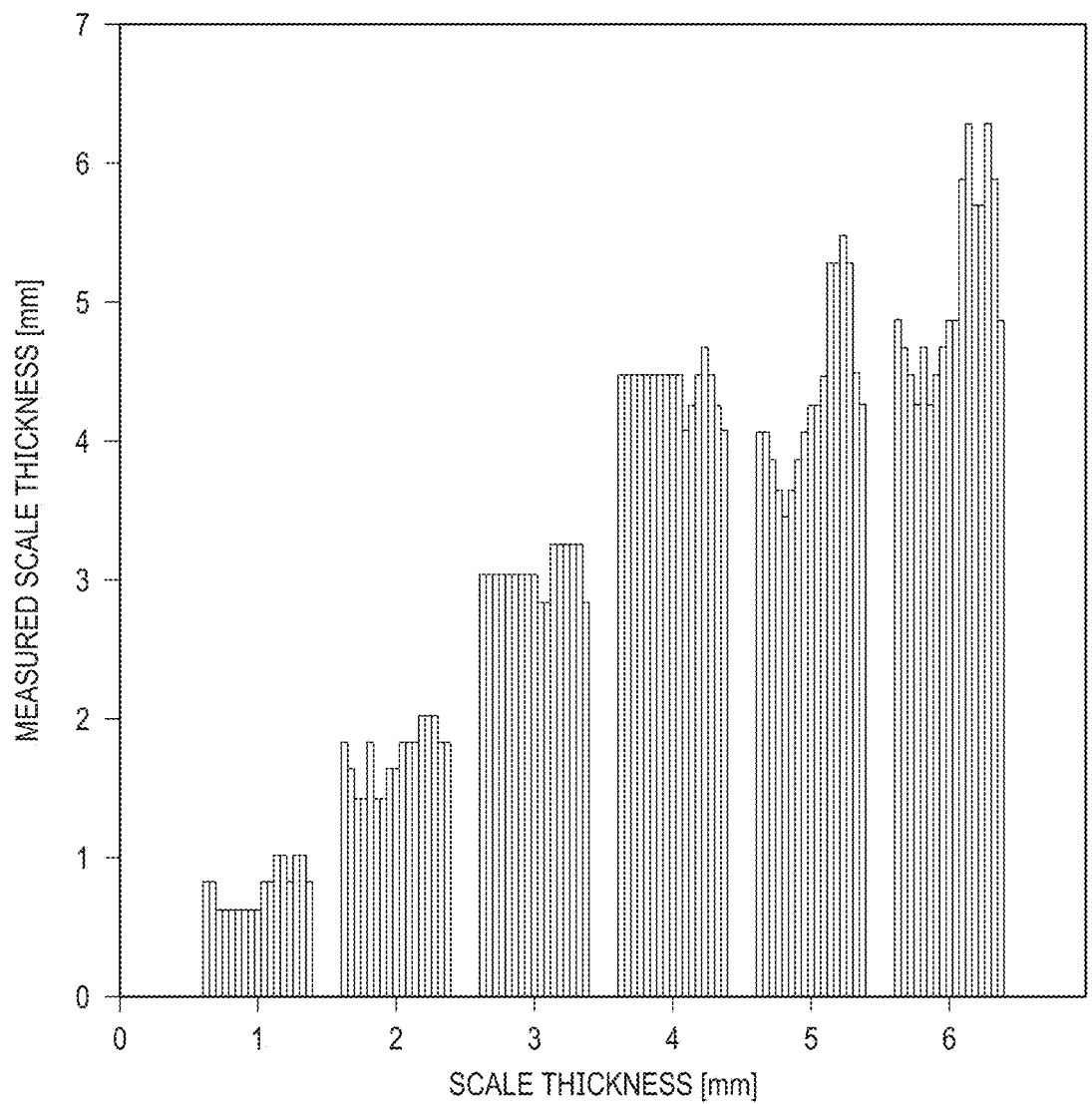

FIG. 15
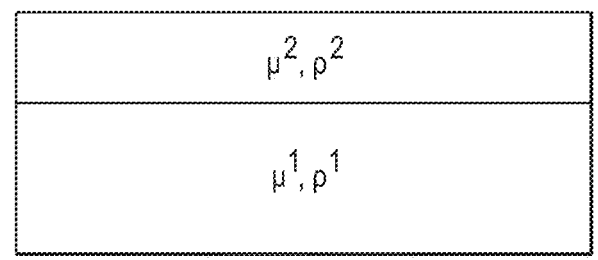
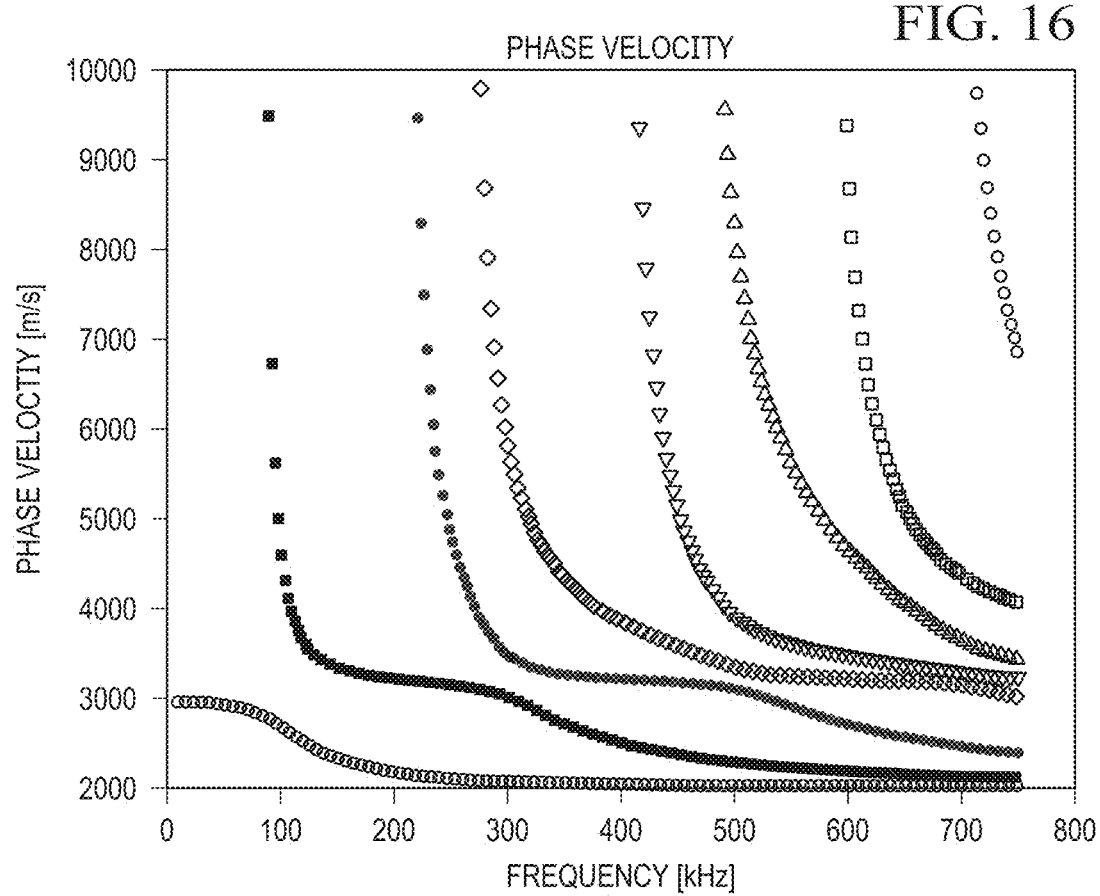
FIG. 16

FIG. 21
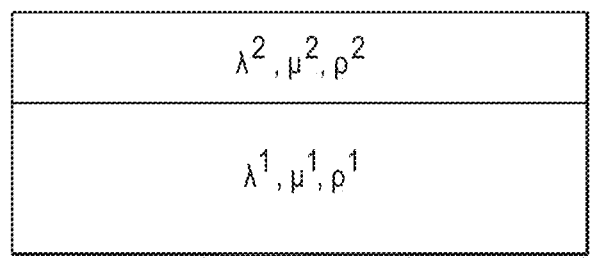
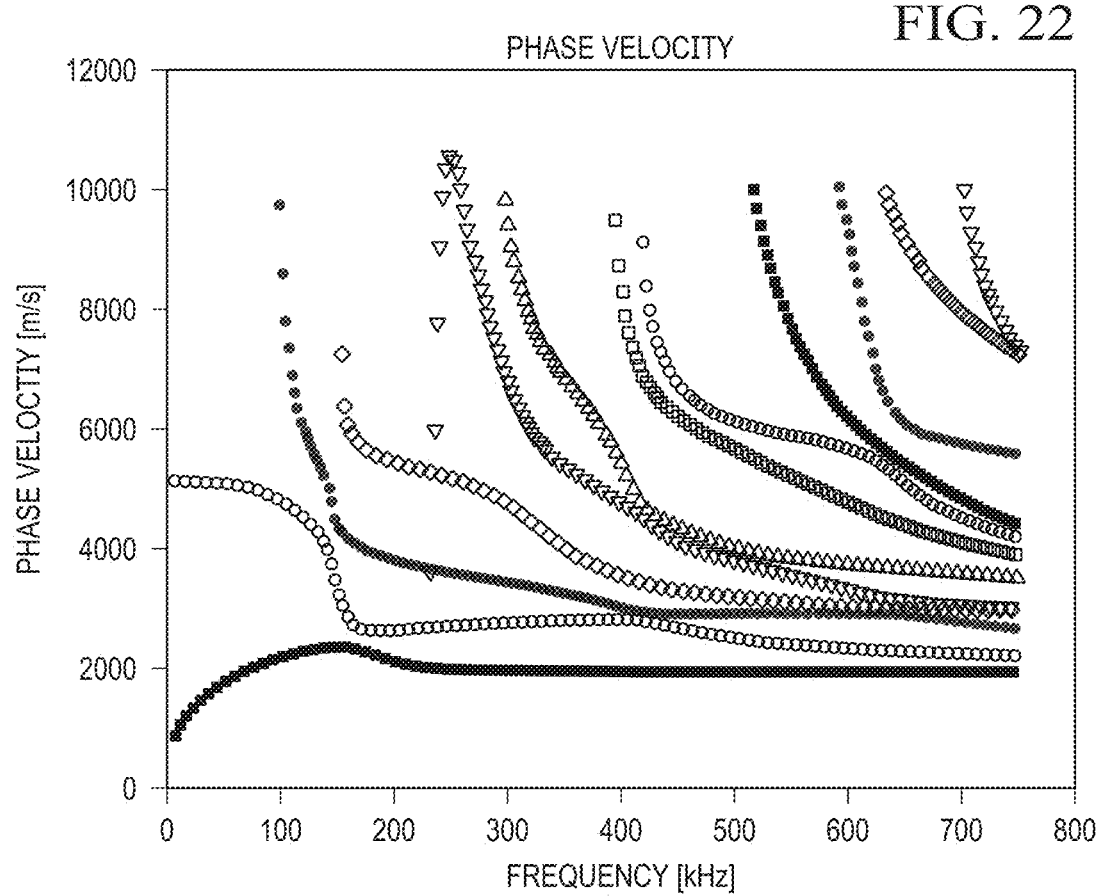
FIG. 22

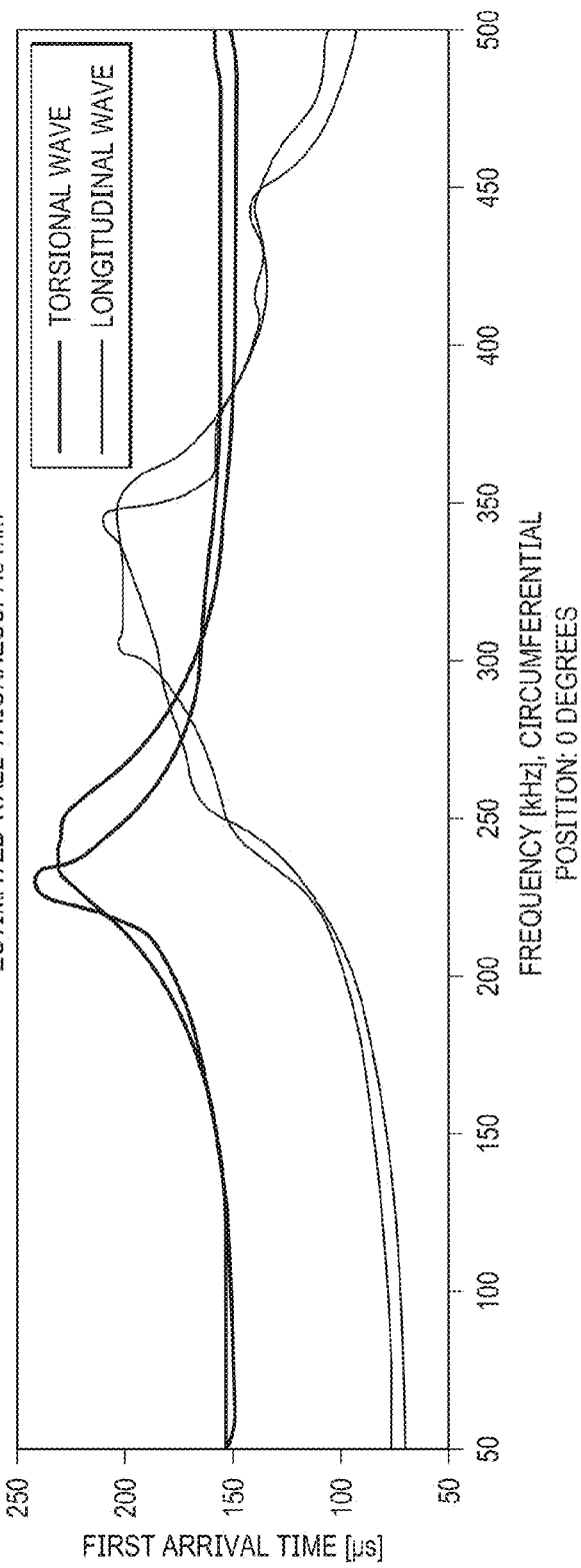
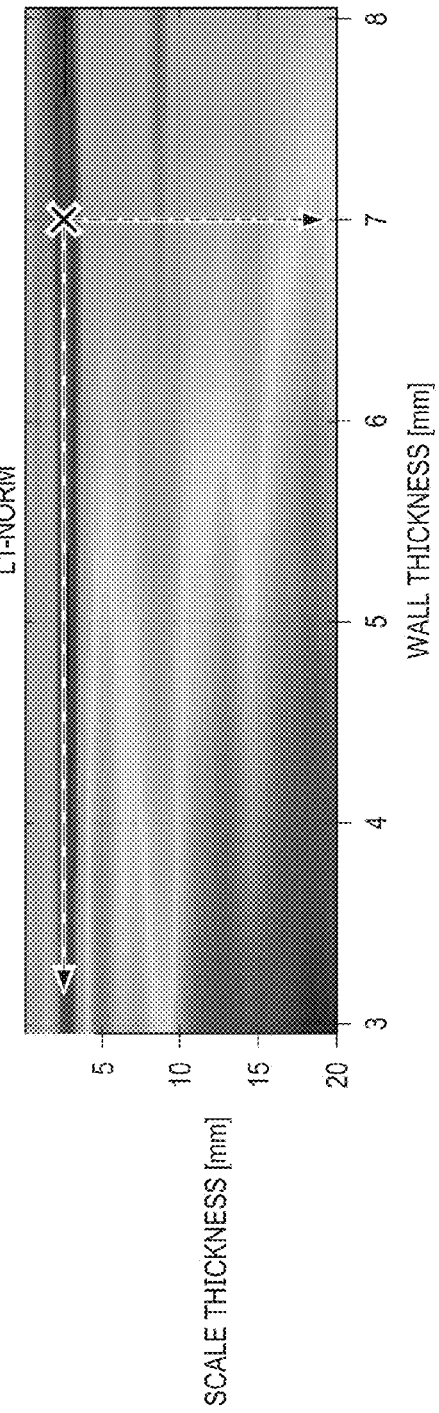

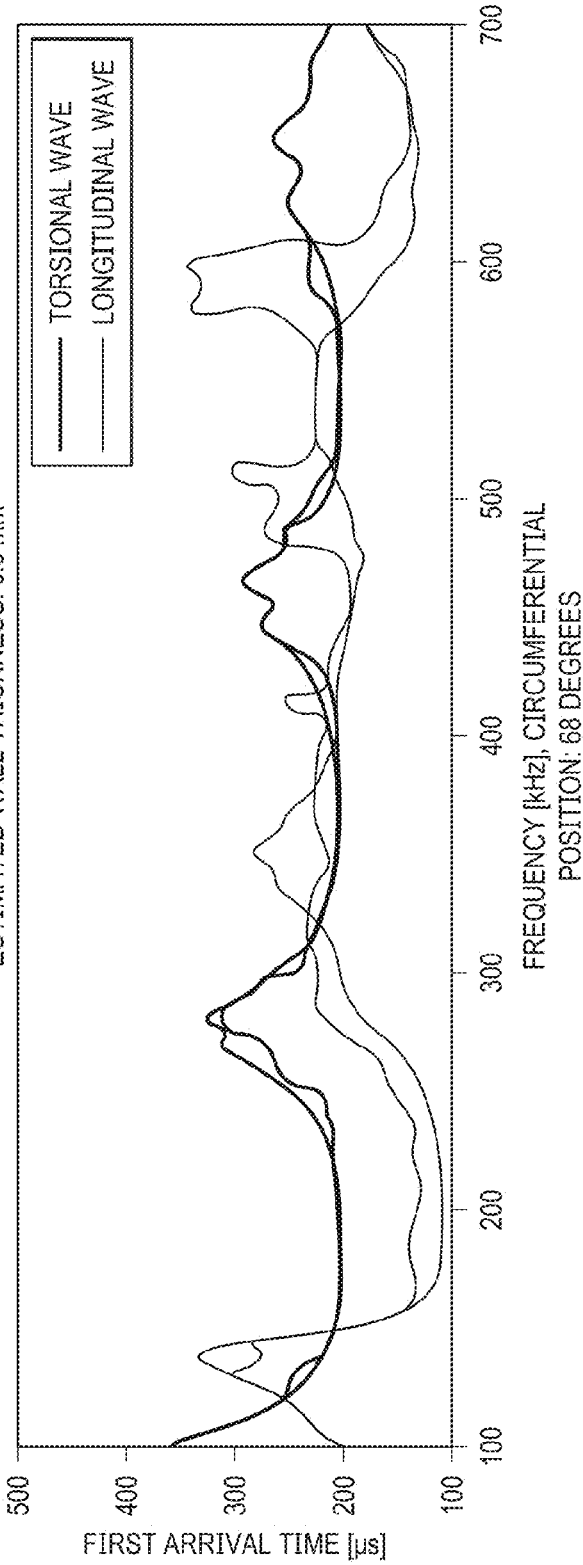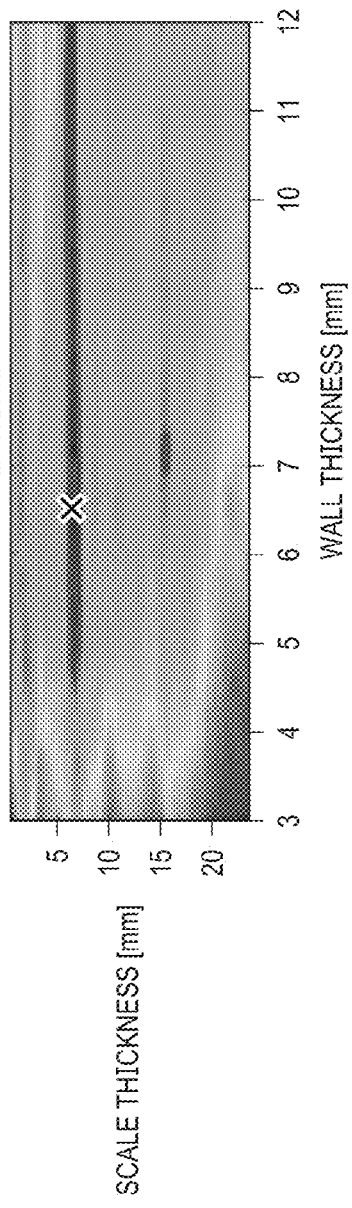

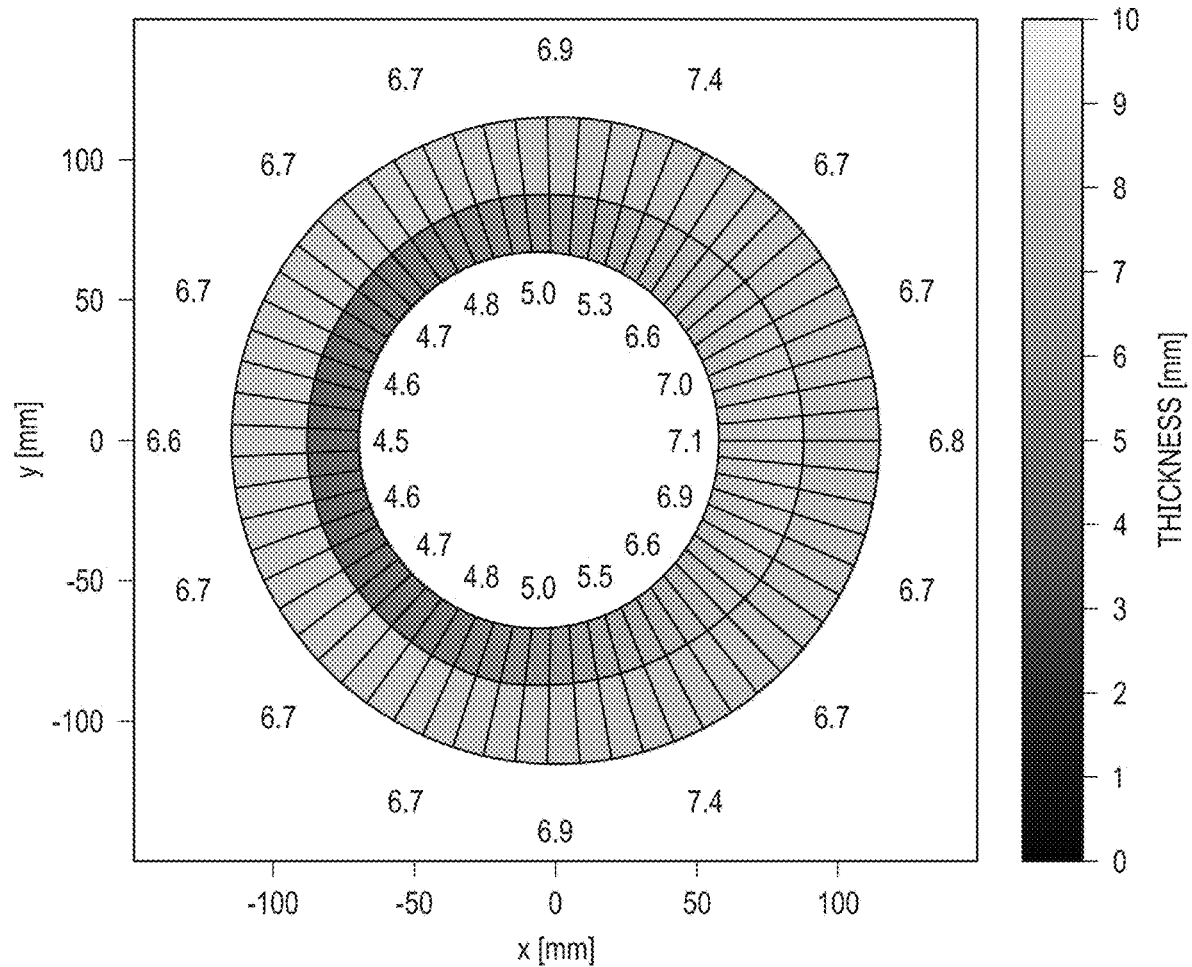

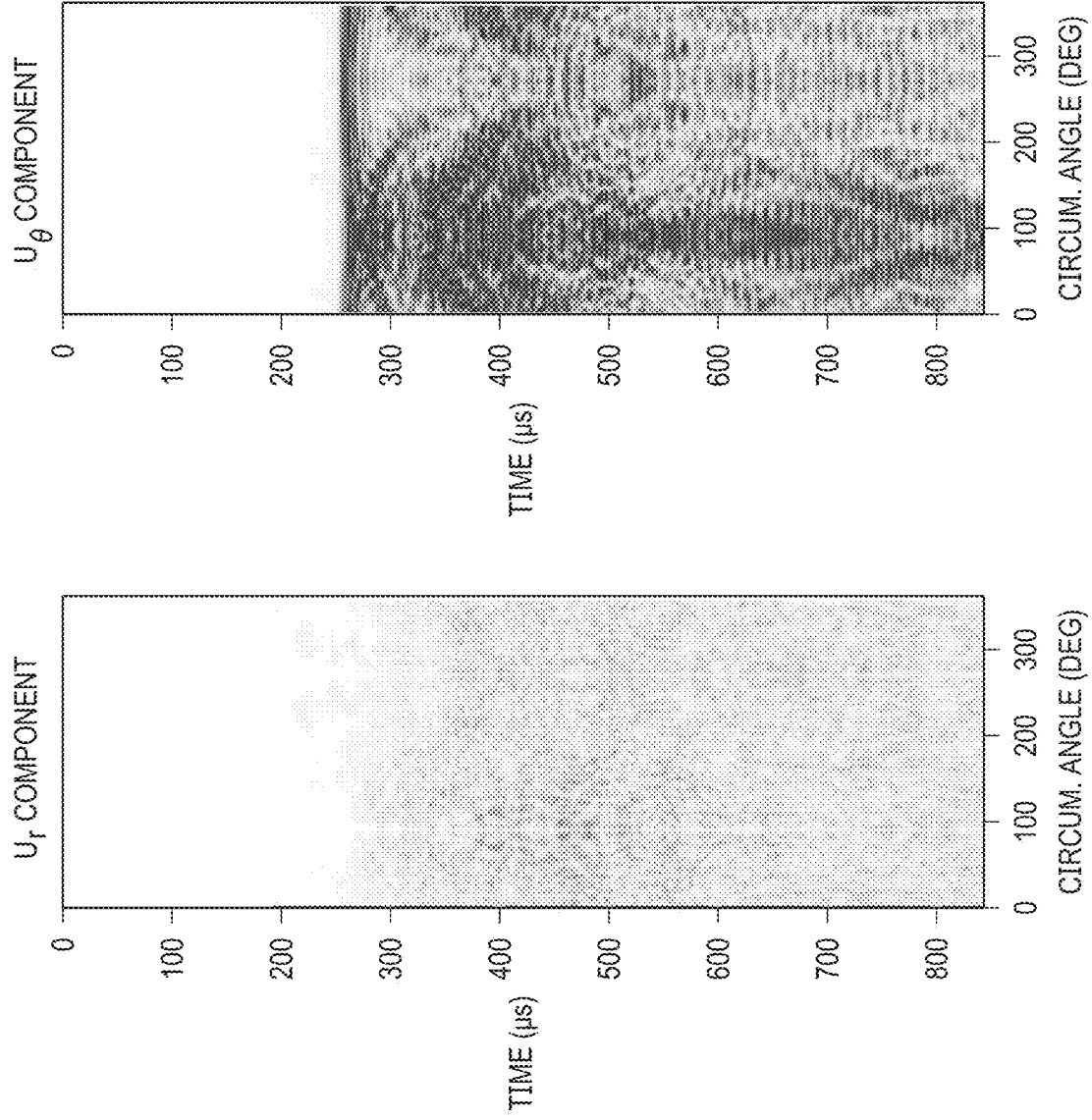
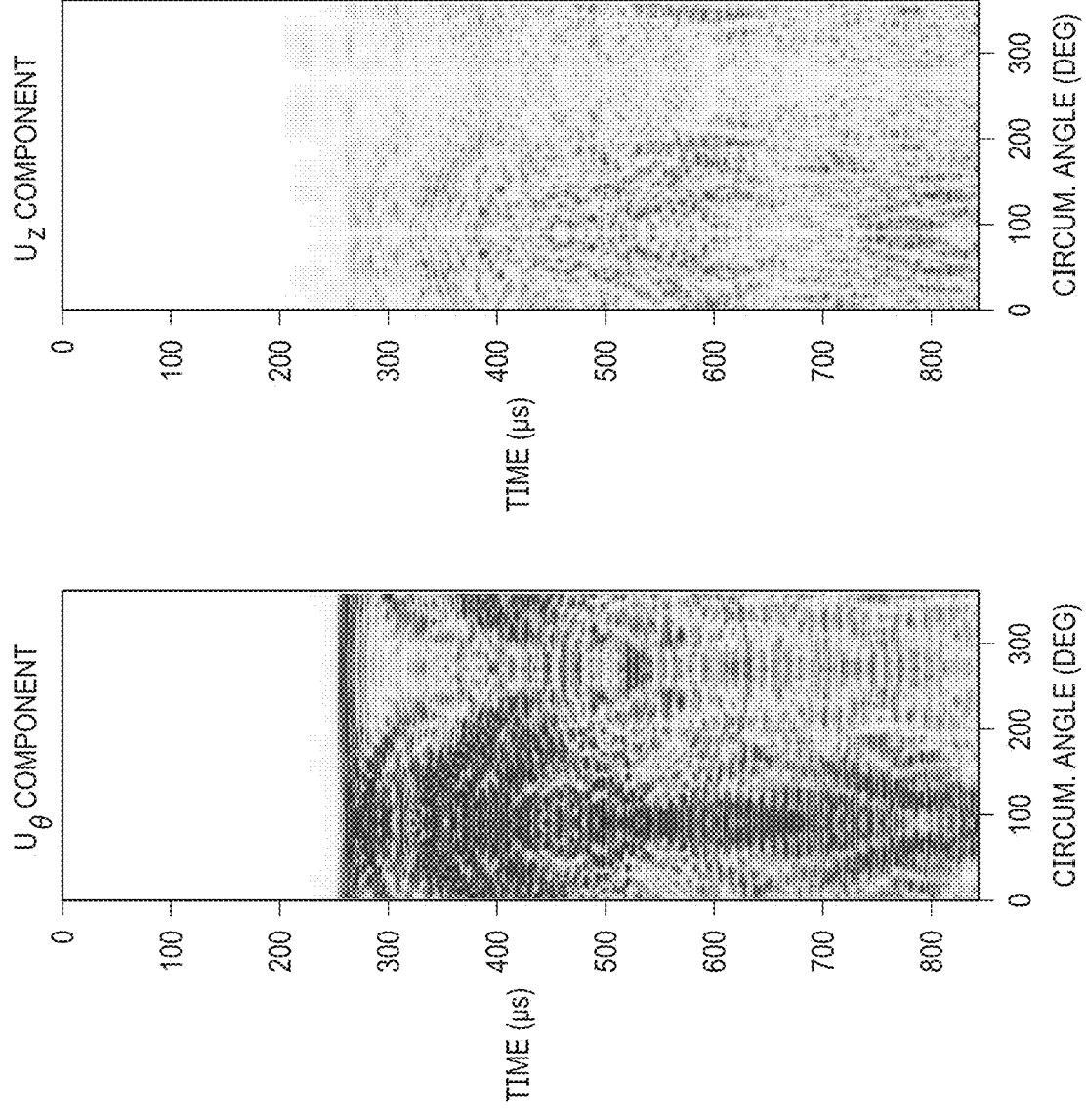
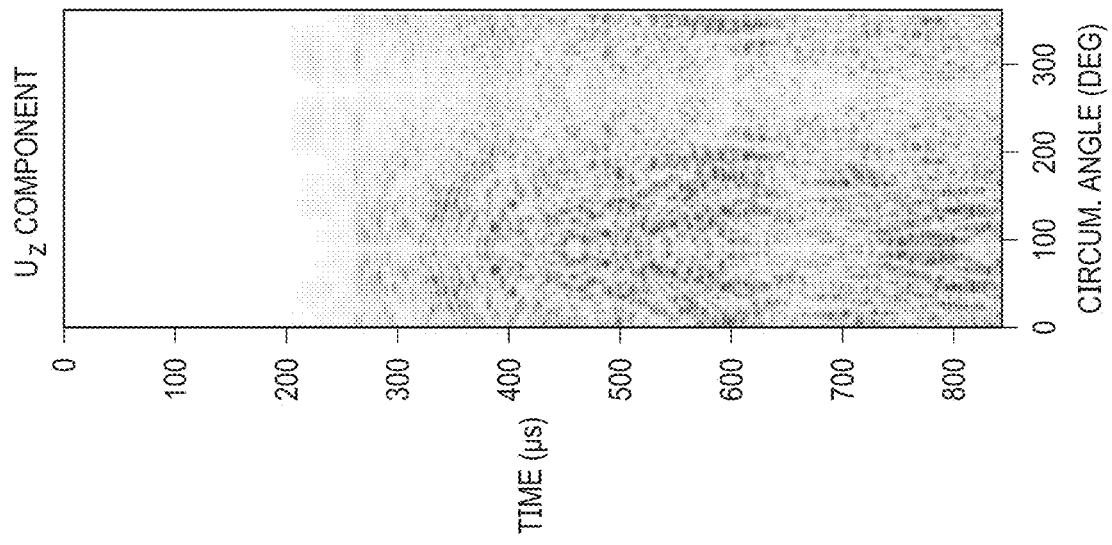

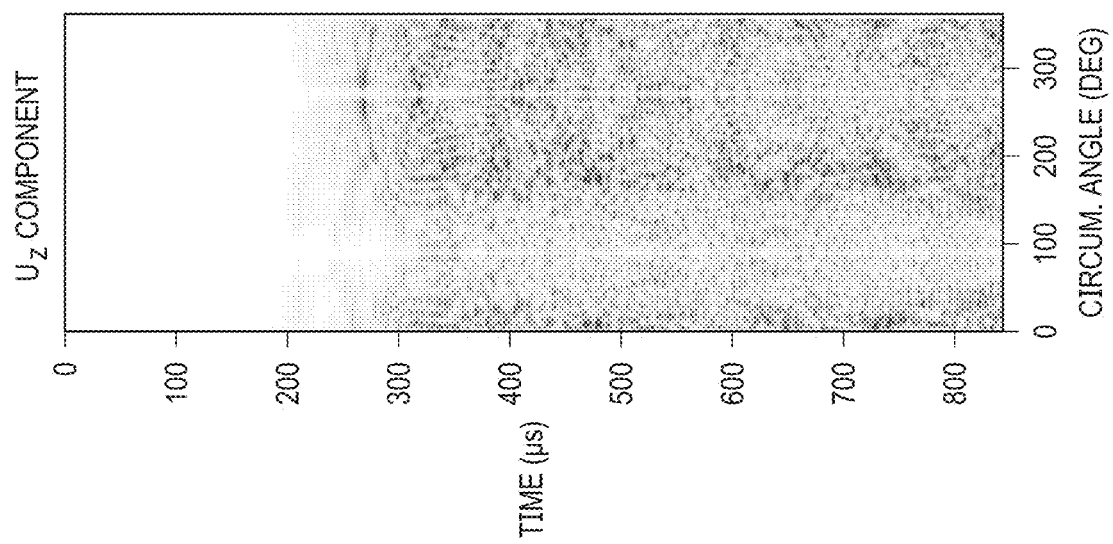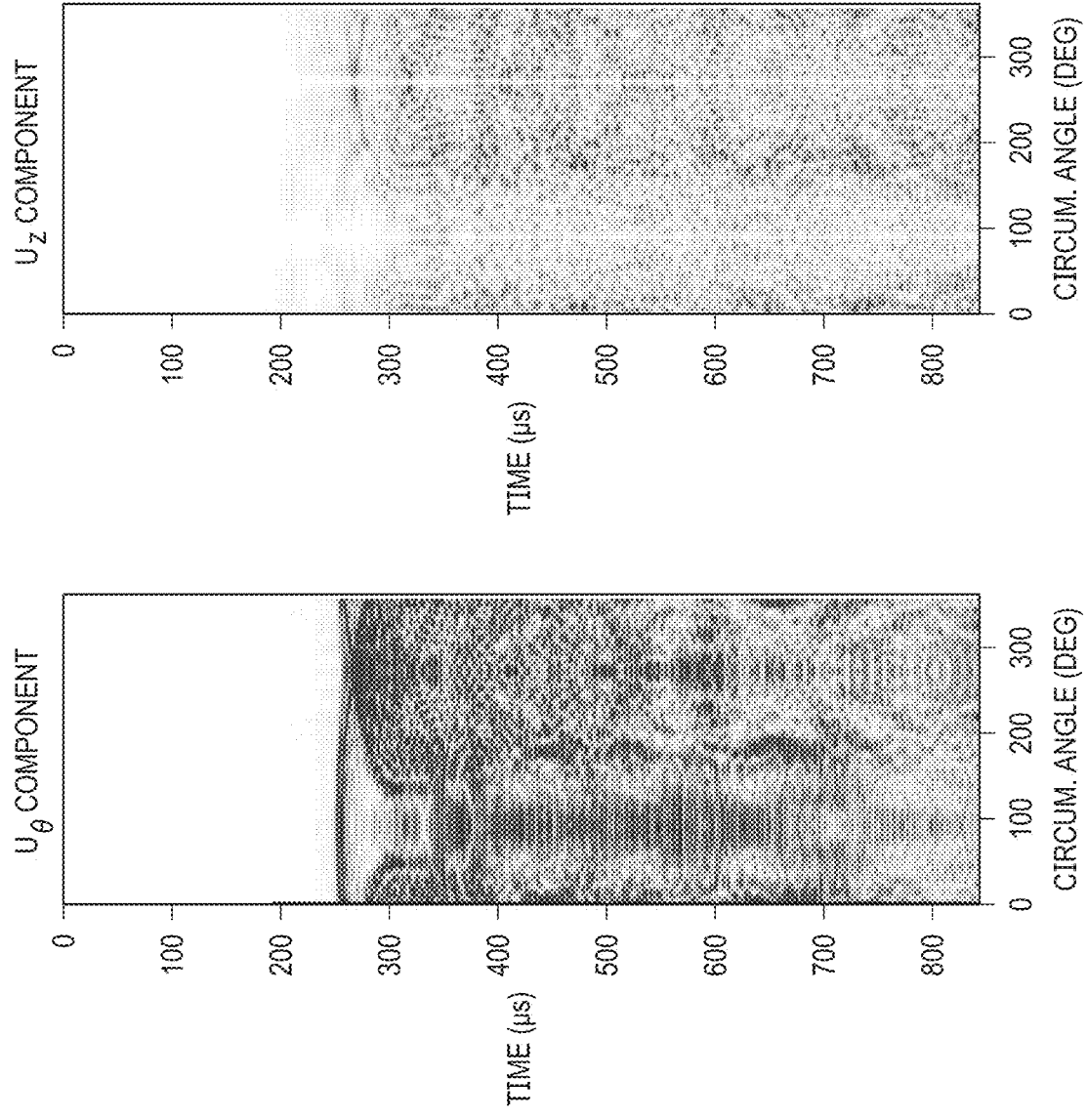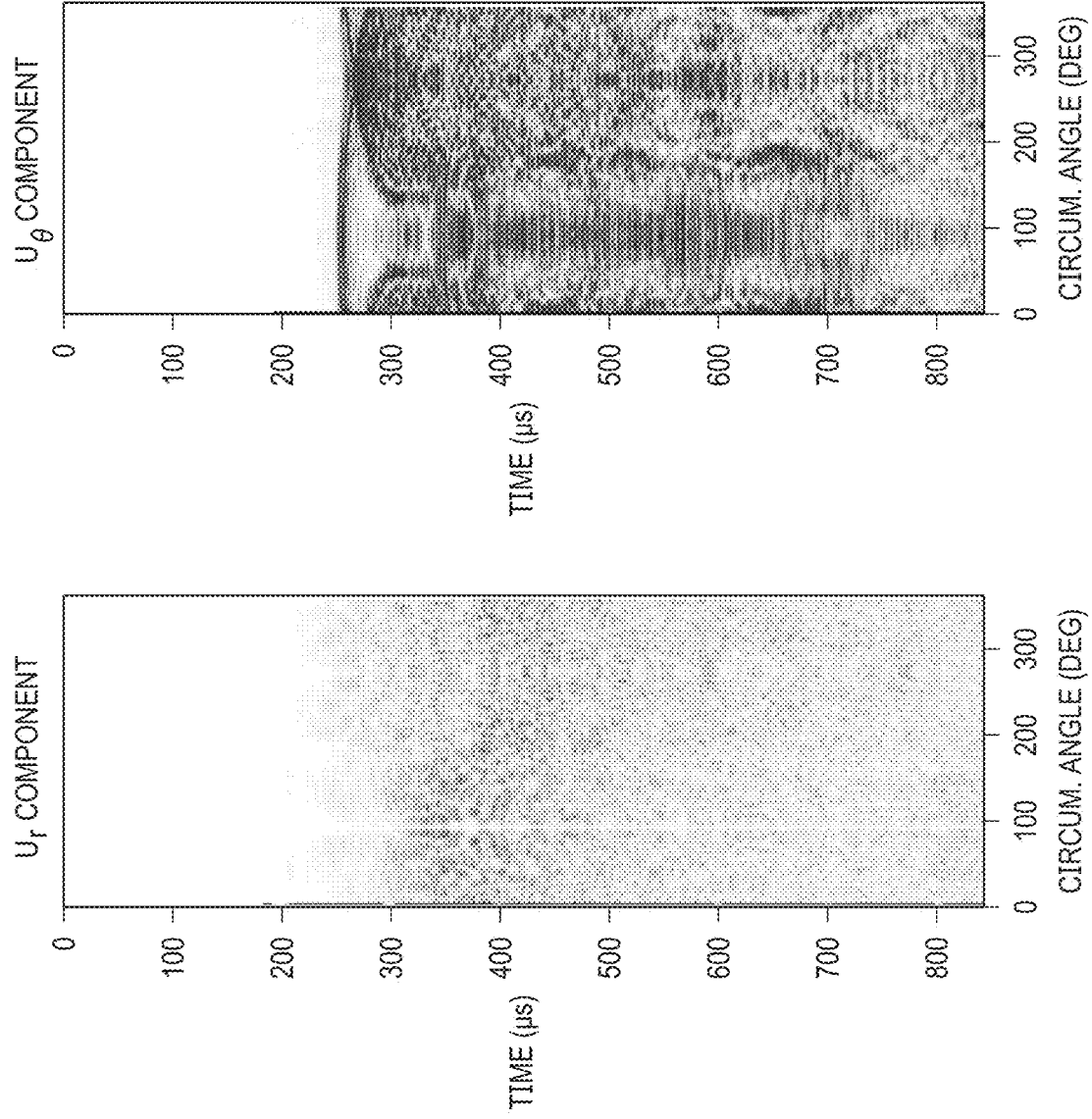

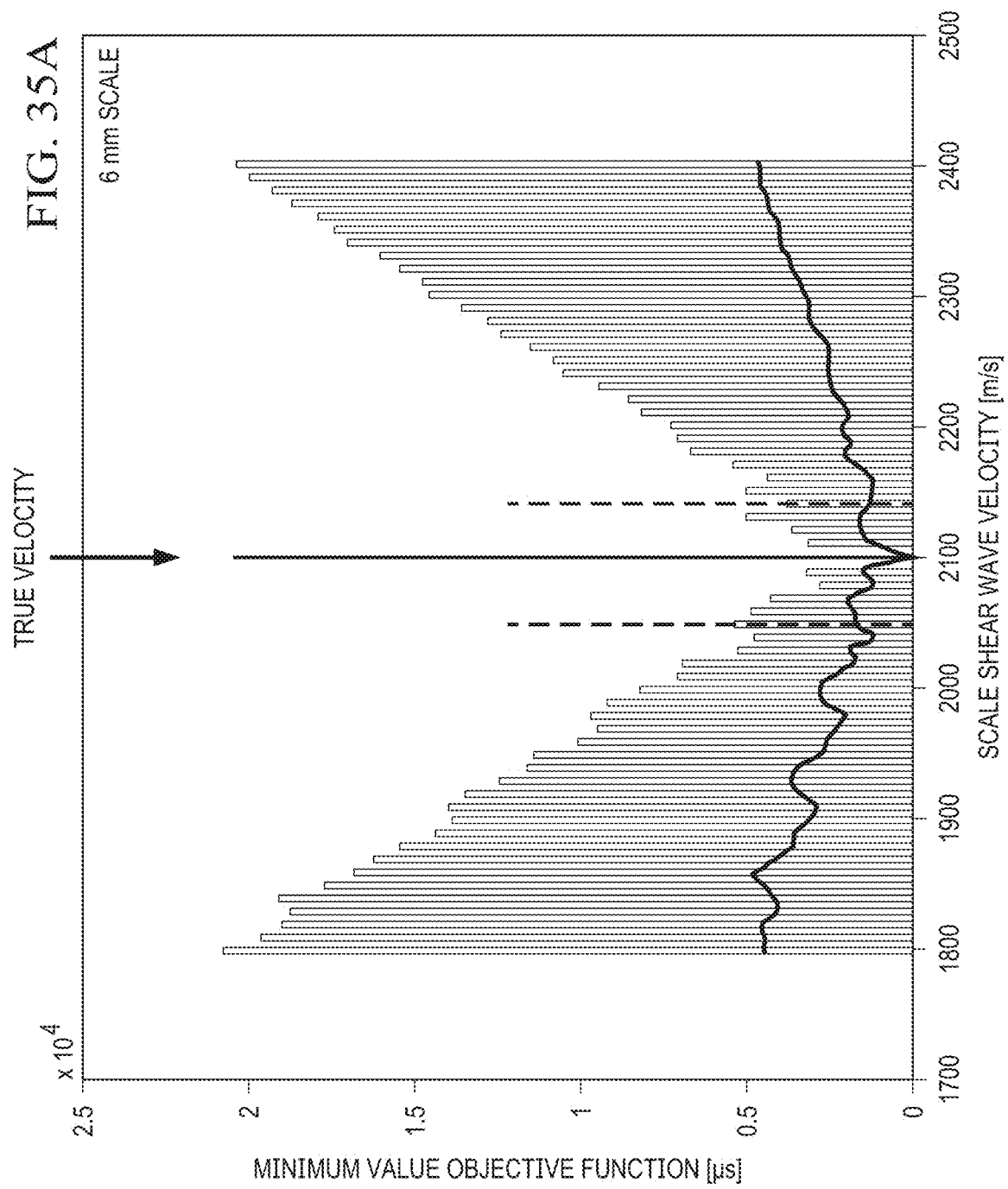

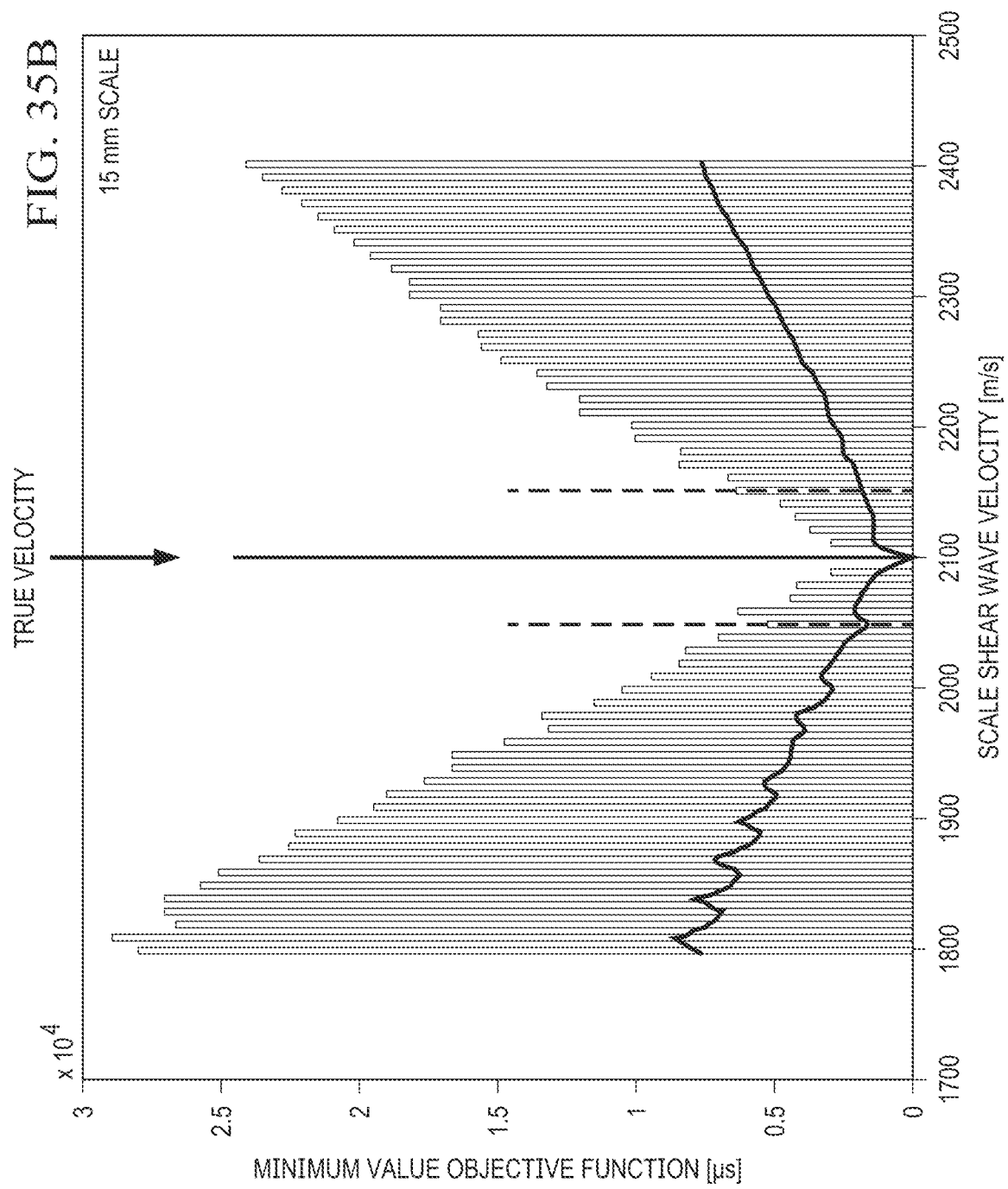

MONITORING WELLBORE SCALE AND CORROSION

TECHNICAL FIELD

This disclosure describes systems and methods for scale and corrosion monitoring systems for wells, and in particular, guided wave scale and corrosion monitoring systems using ultrasonic guided waves.

BACKGROUND

Information about the integrity and down-hole flow conditions of production wells are difficult to obtain. For example, corrosion and scale build up impact the flow of fluid and gas in the tubing of the well and also in fluid and gas transport pipes. In some cases, "scale" or "fouling" builds up over time as a layer inside the tubing and piping which can restrict the flow of fluid and gas from the well. In some cases, corrosion causes the tubing and piping to corrode and deteriorate over time which can lead to leaks.

Corrosion and scale build up build up reduces wellbore accessibility, inhibits production engineers from achieving down hole control, reduces the produced fluid and gas rate, and, in some cases, forces well shut downs.

SUMMARY

The systems and methods described in this disclosure are related to detecting scale and corrosion within wellbore tubing and/or pipelines. The methods use arrival times of the fastest ultrasonic waves to travel to a receiver (e.g., from a transmitter), compare the arrival times with a model of known arrival times, and predict results based on the comparison. In some cases, the results include determining a wall thickness of the tubing, a scale thickness of a layer of scale that is deposited on an inside of the tubing, a shear wave speed of the scale, and identifying material of the scale. In some examples, the scaling rate is derived as a prediction when an intervention needs to take place based on two measurements at different times. In some examples, flow induced vibrations within the tubing or pipeline are used instead of a transmitter for generating the ultrasonic waves. In this scenario, a cross-correlation of signals from each receiver is determined and used by the scale and corrosion monitoring system for determining the results based on the cross-correlation.

The scale and corrosion monitoring system uses the arrival times of the fastest longitudinal and torsional ultrasonic waves. In some examples, the arrival times as a function of frequency is obtained from a time-frequency analysis (for example, by a Fourier transformation from the time domain into the frequency domain) of the information from the receivers. The arrival times are used for input into a scale and corrosion inversion scheme. The inversion scheme compares the arrival times with known arrival times using pre-determined dispersion curves from a model. The dispersion curves are generated using a range of material and/or geometric properties of the tubing (for example, different materials, different thicknesses, etc.) and scale as a function of a range of shear wave velocities of the tubing and scale. In some cases, the pre-determined dispersion curves use a ray tracing model for increased accuracy. The determined arrival times can be compared with pre-determined arrival times from pre-determined dispersion curves. The comparison process involves minimizing an objective function for the scale thickness and wall thickness as function of scale shear wave velocity. The global minimum of the objection function is the scale shear wave velocity.

The scale and corrosion monitoring system used scale shear wave velocity for scale material identification. In some cases, a linear interpolation is performed by the scale and corrosion monitoring system to identify the scale material based on the shear wave velocity. To reduce the number of unknowns, the scale and corrosion monitoring system infers that the Poisson ratios for a range of the different scale materials is the same, or at least substantially the same. For example, scale materials can vary (for example, calcium carbonate, iron sulfide (FeS), and barium sulfates, calcite, barite, celestite, anhydrite, gypsum, iron sulfide, halite), but these materials are all amorphous solids and often have the same, or substantially the same, Poisson ratio. A constant Poisson ratio means that the ratio between pressure wave velocity and shear wave velocity is constant regardless of scale material. This means that the solution process need only solve for either pressure wave velocity or shear wave velocity. In some examples, the scale and corrosion monitoring system determines the scale shear wave velocity of the scale and this uniquely identifies the scale material. In some cases, testing is performed on scales of interest and a relationship between the shear wave velocity of the scale and the scale material is documented. For example, some scale materials (such as FeS-scale) appear in different crystallographic forms. Generally, the more densely packed the crystal is the harder the scale and the higher the shear wave velocity. Knowing the material of scale and the thickness of the scale allows production engineers to determine proper mitigating measures and/or well interventions.

Scale and corrosion monitoring systems for a well can include a plurality of transmitters disposed on a circumference of a tubing of the well for transmitting axisymmetric longitudinal and torsional ultrasonic waves along a longitudinal axis of the tubing, each transmitter of the plurality of transmitters operable to transmit at the same time; a plurality of transducers disposed in a ring on the circumference of the tubing for measuring the transmitted longitudinal and torsional ultrasonic waves from the plurality of transmitters; and one or more processors in electronic communication the plurality of transmitters and the plurality of the transducers, the one or more processors operable to: receive information from the plurality of transducers, the received information including frequency domain information representing a first longitudinal ultrasonic wave and a first torsional ultrasonic wave to arrive at the plurality of transducers; determine arrival times for the first longitudinal ultrasonic wave and the first torsional ultrasonic wave arrive at the plurality of transducers based on the received information; compare the determined arrival times with a range of predetermined arrival times from a model to determine a wall thickness of the tubing, a scale thickness of scale within the tubing, and a scale shear wave velocity of the scale; and identify a material of the scale based on the determined scale shear wave velocity.

Methods for scale and corrosion monitoring systems for a well can include receiving information from a plurality of transducers disposed in a ring on a circumference of a tubing of the well, the received information including frequency domain information representing a first longitudinal ultrasonic wave and a first torsional ultrasonic wave to arrive at the plurality of transducers; determining arrival times for the first longitudinal ultrasonic wave and the first torsional ultrasonic wave to arrive at the plurality of transducers based on the received information; comparing the determined arrival times with a range of predetermined arrival times from a model to determine a wall thickness of the tubing, a scale thickness of scale within the tubing, and a scale shear wave velocity of the scale; and identifying a material of the scale based on the determined scale shear wave velocity.

Scale and corrosion monitoring systems for a well can include a first transducer ring disposed around a circumference of a tubing of the well, the first transducer ring including a first plurality of transducers for measuring longitudinal ultrasonic waves and torsional ultrasonic waves; a second transducer ring disposed around the circumference of the tubing, the second transducer ring including a second plurality of transducers for measuring longitudinal ultrasonic waves and torsional ultrasonic waves; and one or more processors in electronic communication the first and second plurality of transducers, the one or more processors operable to: receive information from the first and second plurality of transducers, the received information including frequency domain information representing a first longitudinal ultrasonic wave and a first torsional ultrasonic wave; cross-correlating the received information between the first and second plurality of transducers to determine arrival times for the first longitudinal ultrasonic wave and the first torsional ultrasonic wave arrive at the plurality of transducers based on the received information; compare the determined arrival times with a range of predetermined arrival times from a model to determine a wall thickness of the tubing, a scale thickness of scale within the tubing, and a scale shear wave velocity of the scale; and identify a material of the scale based on the determined scale shear wave velocity.

Implementations of these systems and methods can include one or more of the following features.

Some implementations include comparing the determined arrival times with the model by accounting for wave refraction using a ray tracing scheme.

Some implementations include transmitting the first longitudinal ultrasonic wave and the first torsional ultrasonic wave using a plurality of transmitters disposed on the circumference of the tubing, each transmitter of the plurality of transmitters transmitting at the same time.

Some implementations include transmitting the first longitudinal ultrasonic wave and the first torsional ultrasonic wave by transmitting a source wavelet with frequency content between 100 kHz and 500 kHz. In some cases, transmitting the first longitudinal ultrasonic wave and the first torsional ultrasonic wave includes transmitting the first longitudinal ultrasonic wave and the first torsional ultrasonic wave using a non-contact EMAT system. In some cases, transmitting the first longitudinal ultrasonic wave and the first torsional ultrasonic wave includes transmitting the first longitudinal ultrasonic wave and the first torsional ultrasonic wave using a piezo-electric system in bonded contact with the circumference of the tubing.

Some implementations include the plurality of transducers mechanically mounted in at least two transducer rings and the plurality of transmitters arranged between the at least two transducer rings Some implementations include determining the wall thickness, the scale thickness, and the scale shear wave velocity by determining the wall thickness, the scale thickness, and the scale shear wave velocity as a function of angular position around the circumference of the tubing.

Some implementations include determining the wall thickness, the scale thickness, and the scale shear wave velocity by determining the wall thickness, the scale thickness, and the scale shear wave velocity at each transducer location of the plurality of transducers.

Some implementations include determining the wall thickness, the scale thickness, and the scale shear wave velocity by determining the wall thickness, the scale thickness, and the scale shear wave velocity by minimizing an objective function between the determined arrival times and the range of predetermined arrival times from the model.

Some implementations include pumping fluid through the tubing to generate flow induced vibration that is measured by the plurality of transducers.

Some implementations include determining arrival times includes cross-correlating the received information between the plurality of transducers.

Some implementations include damping vibrations using a vibration-absorbing material disposed around the circumference of the tubing and located adjacent to a joint of the tubing. In some cases, the layer of vibration-absorbing material includes a length of at least 25 cm along a longitudinal direction of the tubing.

The systems and methods described in this specification can provide various advantages.

Some scale and corrosion monitoring systems combine both torsional wave and longitudinal wave arrival times. The arrival times associated with torsional waves provide a good indication of the scale thickness measurement and the arrival times associated with longitudinal waves provide a good indication of the tubing wall thickness. Some scale and corrosion monitoring systems use both longitudinal waves and torsional waves instead of using one or the other. For example, both longitudinal waves and torsional waves are used to measure both wall thickness and scale thickness. Scale and corrosion monitoring requires both wave modes while when there is only corrosion a single wave mode can be used.

Some scale and corrosion monitoring systems eliminate the pressure wave velocity from the unknown parameters by assuming that Poisson's ratio is the same for a range of scale materials.

Some scale and corrosion monitoring systems use flow-induced vibrations instead of a transmitter. This can lead to lower energy use by avoiding a need for a power amplifier.

Some scale and corrosion monitoring systems are permanently installed in the well and provides frequent (for example, hourly, daily, weekly, etc.) notifications on scale build-up and corrosion. These scale and corrosion monitoring systems do not interfere with or block the production tubing meaning that production continues while the scale and corrosion monitoring system is monitoring the scale and corrosion (for example, the tubing and cement of the well do not affect the measurements of the scale and corrosion monitoring systems).

Some scale and corrosion monitoring systems are used in all flow lines and pipelines in addition to downhole. This approach has the potential to save money by monitoring scale and corrosion build up across an entire pipeline network and providing notifications to production engineers when mitigation and intervention is necessary.

Some scale and corrosion monitoring systems do not require logging operations to determine the scale and corrosion. This approach avoids the need to lower logging instruments equipped with sensors into the well to obtain information about the corrosion and scale build up. These scale and corrosion monitoring systems are particularly helpful in production tubing where well operations would need to be shutdown to assess the scale and corrosion of the tubing and pipelines. For example, the scale and corrosion monitoring systems provide production engineers with important data about down-hole scale and corrosion, and better enables the engineers to optimize the dose of inhibitors, adjust process settings, plan interventions, and maximize production by reducing unnecessary shutdowns.

Some scale and corrosion monitoring systems use predetermined dispersion curves to avoid needing an iterative inversion scheme. This approach avoids common problems with iterative schemes where too many local minima exists which the iteration process incorrectly converges to instead of the global minima of the correct solution. For example, because the arrival time is used in the inversion for the fastest wave, the fastest mode to reach the receivers may jump to another mode during an iterative inversion scheme. Therefore, iterative inversion schemes can be inaccurate when used with arrival times.

Some scale and corrosion monitoring systems determine the thickness of both layers in a two-layer system (the scale thickness and the wall thickness) simultaneously in contrast to historical solutions where a tomographic approach could determine a local thickness reduction in a single material layer, but not a two-layer system. Indirect features such as attenuation are also not necessary with the scale and corrosion monitoring system. Generally, historical approaches require indirect features such as an amount of attenuation to be considered in the model. For example, attenuation varies monotonically with scale thickness and is valid over a very limited thickness range. This makes it difficult to use attenuation over a large thickness range.

Some scale and corrosion monitoring systems determine the scale thickness and the wall thickness as function of circumferential position around the tubing. This gives a spatially varying result of the scale and corrosion compared to a lumped average.

Some scale and corrosion monitoring systems provide a direct physical relation between mode cut-off frequency and scale thickness. For example, scale and corrosion monitoring systems are suitable for scale thickness sizing because of the direct relation of thickness and resonance frequency, assuming that the material properties are known.

Some scale and corrosion monitoring systems are used with a thin layer of nickel foil (e.g., 0.1 mm) between the receivers and the outside diameter of the tubing. In some examples, the output of the receivers with a layer of nickel foil is 70 times greater than for without a layer of nickel foil. This increases the received signal strength.

Some scale and corrosion monitoring systems use a non-contact EMAT transmitter to generate the longitudinal and torsional ultrasonic waves. Some scale and corrosion monitoring systems use a non-contact EMAT receiver to generate the longitudinal and torsional ultrasonic waves. Compared to a piezo-based transmitter and receiver, a non-contact EMAT transmitter and receiver does not require bonding to the surface of the tubing. In some examples, using a non-contact transmitter and non-contact receiver is preferred because a contact transmitter and a contact receiver could scatter the wave energy causing undesired interferences. Piezo non-contact transmitters and piezo non-contact receivers are small and scattering is reduced compared to contact receivers and transducers.

Some scale and corrosion monitoring systems use a multi-sensor configuration of more than receiver sensors (e.g., two or three) along the axial length of the tubing. In some examples, having more than one receiver enhances the number of locations where the results are determined. For example, with one transmitter, four receivers can be positioned along the length of the tubing to receive the transmitted ultrasonic waves and compute results.

The first arrival times of these guided wave modes provides reliable information to determine the scale thickness and wall loss because the first arrivals are less affected by interference of slower wave modes. The fastest waves modes have a dominant in-plane displacement and are less affected by the tubing (for example, the fastest wave modes do not radiate energy in the (liquid-filled) annulus). Some scale and corrosion monitoring systems compute first arrival times using a time-frequency analysis. Some scale and corrosion monitoring systems compute first arrival times using arrays in the axial direction to measure phase velocity using a wavenumber-frequency domain Fourier analysis. For example, a scale and corrosion monitoring system using an array in the axial direction determines a phase velocity of the waves using a wavenumber-frequency domain Fourier analysis. In some scenarios, an array in the axial direction compensates for wave interferences better than one receiver per mode. In some examples, the scale and corrosion monitoring systems use one receiver per wave-mode in the axial direction and use an array in circumferential direction to calculate the thickness profile.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

The file of this patent contains at least one drawing executed in color. Copies of this patent with color drawings will be provided by the Patent and Trademark Office upon request and payment of the necessary fee.

FIGS. 12A and 12B are plots of cross-sections through example objective functions.

FIGS. 13A-13D are plots of mode cut-off frequency spectra for 3 mm thick scale as a function of the circumferential position.

FIGS. 14A and 14B are plots of scale thickness sizing around the circumference of a tubing.

FIG. 15 is a schematic of a two-layer model used for solving for dispersion relations of torsional waves.

FIG. 16 is a plot of example dispersion curves for a 7 mm thick steel wall and a 6 mm thick scale layer.

FIG. 21 is a schematic of a two-layer model used for solving for dispersion relations of longitudinal waves.

FIG. 22 is a plot of phase velocity dispersion curves for a steel tubing with a 7 mm wall thickness and a scale thickness of 6 mm.

FIG. 26A is a plot of measuring both scale thickness and tubing wall loss using picked arrival times and calculated first arrival time. FIG. 26B is a plot of an objective function with a global minimum.

FIG. 27A is an example spectrogram plot for a 6.5 mm wall thickness tubing and a 6.6 mm scale thickness. FIG. 27B is an example objective function for the inversion process shown in FIG. 27A.

FIG. 29A is a plot of scale inversion results for a 6 mm nominal thickness and FIG. 29B is a plot of scale inversion results for wall thickness sizing results from simulated data.

FIGS. 30A-30C are plots of the recorded torsional wave field for a smooth scale thickness variation around the tubing circumference. FIG. 30A plots the recorded $U_r$-component, FIG. 30B plots the recorded $U_\theta$-component, and FIG. 30C plots the recorded $U_z$-component.

FIGS. 31A-31C are plots of the recorded torsional wave field for both wall thickness and scale thickness around the tubing circumference. FIG. 31A plots the recorded $U_r$-component, FIG. 31B plots the recorded $U_\theta$-component, and FIG. 31C plots the recorded $U_z$-component.

FIGS. 35A and 35B are plots of scale thickness and wall thickness versus shear wave velocity. FIGS. 35A and 35B show an objective function for varying shear wave velocity for a scale with a scale thickness of 6 mm and 15 mm, respectively.

Like reference symbols in the various drawings indicate like elements.

DETAILED DESCRIPTION

The systems and methods described in this disclosure are related to detecting scale and corrosion within a wellbore tubing and/or pipelines. These systems and methods use arrival times of the fastest ultrasonic waves to travel to a receiver (e.g., from a transmitter), compare the arrival times with a model of known arrival times, and predict results based on the comparison. In some cases, the results include determining a wall thickness of the tubing, a scale thickness of a layer of scale that is deposited on an inside of the tubing, a shear wave speed of the scale, and identifying a material of the scale. In some examples, the scaling rate is derived as a prediction when an intervention needs to take place based on two measurements at different times. In some examples, flow induced vibrations within the tubing or pipeline are used instead of a transmitter for generating the ultrasonic waves. In this scenario, a cross-correlation of signals from each receiver is determined and used by the scale and corrosion monitoring system for determining the results based on the cross-correlation.

Figure 1:
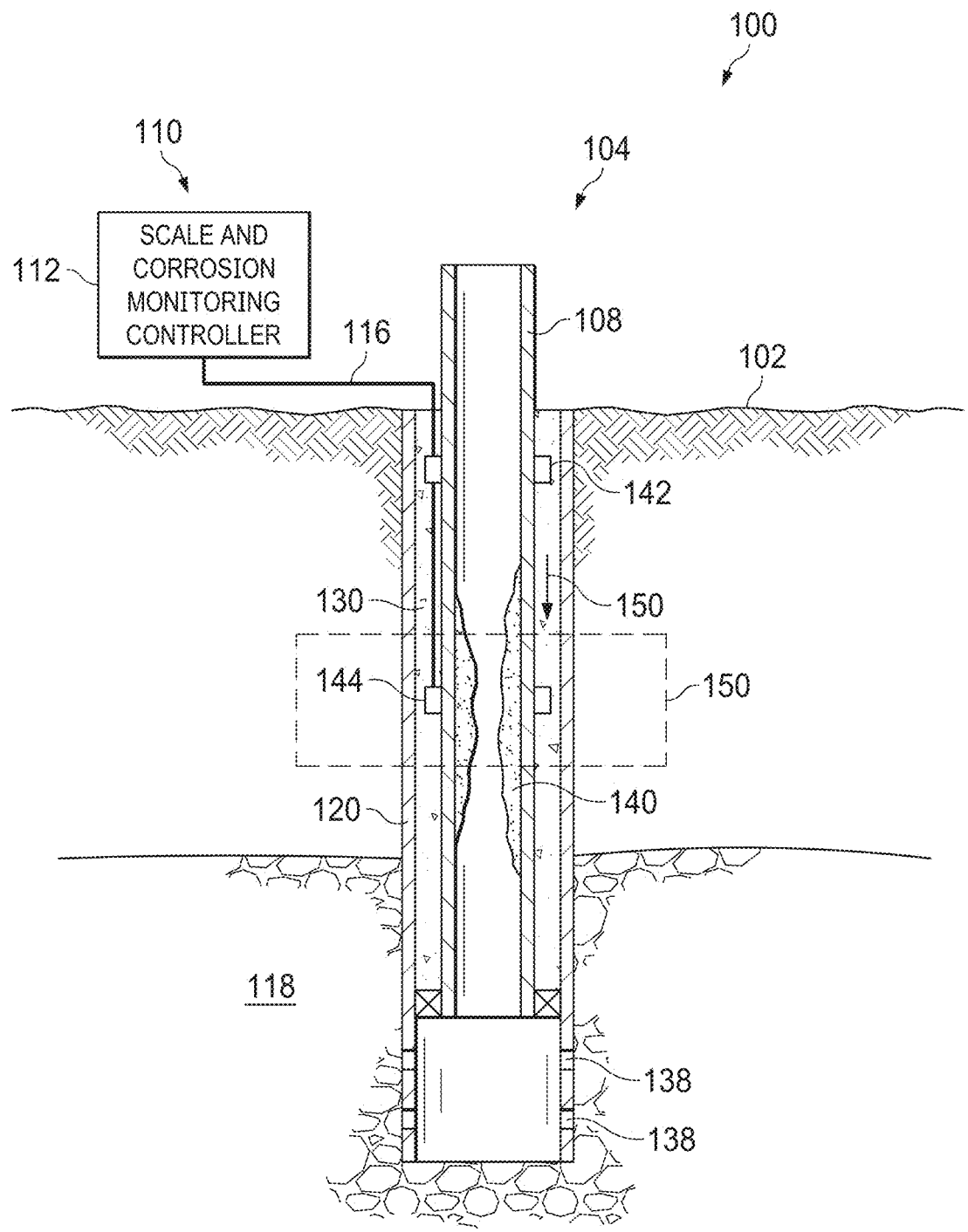
FIG. 1 is a schematic diagram of an example implementation of a wellbore system according to the present disclosure.

FIG. 1 is a schematic diagram of an example implementation of a wellbore system 100 according to the present disclosure. The wellbore system 100 includes a wellbore 104 formed (for example, drilled or otherwise) from a surface 102 and to and into subterranean formation 118. Although the surface 102 is illustrated as a land surface, the surface 102 may be a sub-sea or other underwater surface, such as a lake or an ocean floor under a body of water. Thus, the present disclosure contemplates that the wellbore 104 may be formed under a body of water from a drilling location on or proximate the body of water.

The illustrated wellbore 104 has a casing 120 positioned and set around the wellbore 104 from the surface 102 into a particular depth in the Earth. For example, the casing 120 may be a relatively large-diameter tubular member (or string of members) set (for example, cemented) around the wellbore 104 in a shallow formation. As used herein, "tubular" may refer to a member that has a circular cross-section, elliptical cross-section, or other shaped cross-section. The casing 120 refers to and includes any form of tubular member that is set (for example, cemented) in the wellbore 104. In some cases, the casing 120 is a production casing 122 and in other cases, the casing 120 is a surface casing 120.

Cement 130 is positioned (for example, pumped) around the casing 120 in an annulus between the casing 120 and the wellbore 104. The cement 130, for example, may secure the casing 120 (and any other casings or liners of the wellbore 104) through the subterranean layers under the surface 102. In some aspects, the cement 130 may be installed along the entire length of the casing (for example, casing 120 and any other casings), or the cement 130 could be used along certain portions of the casings if adequate for the particular wellbore 104. Other casings, such as conductor casings or intermediate casings, are also contemplated by the present disclosure for the wellbore system 100.

The wellbore 104 extends through one or more subterranean layers and lands in subterranean formation 118. In some examples, the subterranean formation 118 is chosen as the landing for wellbore 104 in order to initiate completion operations such as hydraulic fracturing operations and ultimately recover hydrocarbon fluids from the subterranean formation 118. In some examples, the subterranean formation 118 is composed of shale or tight sandstone. Shale, in some examples, may be source rocks that provide for hydrocarbon recovery from the subterranean formation 118.

In the example shown in FIG. 1, the wellbore system 100 includes one or more perforations 138 that are formed in the wellbore 104. The perforations 138 are openings through the casing 120 and the cement 130 that enable fluid and gas to flow from the subterranean formation 118 into the tubing 108 of the wellbore system 100. Generally, the perforations 138 are formed by, for example, shaped explosive charges, water jetting, laser, or other conventional perforating techniques.

The wellbore system 100 includes a scale and corrosion monitoring system 110 with a controller 112 for controlling the scale and corrosion monitoring system 110. The scale and corrosion monitoring system 110 detects scale and corrosion of a tubing 108 of the wellbore system 100. In some examples, the controller 112 includes one or more processors and other computer components of a controller 4400 described with reference to FIG. 44.

Some scale and corrosion monitoring systems 110 detect when a layer of scale 140 develops on an inside diameter of the tubing 108. In some examples, the layer of scale 140 can develop over time as fluid and gas flow from the subterranean formation 118, through the tubing 108, and out of the wellbore 104. Some scale and corrosion monitoring systems 110 detect when the tubing 108 wall thickness changes due to, for example, corrosion. Some scale and corrosion monitoring systems 110 detect scale and corrosion of associated pipelines of the wellbore system 100 such as a pipeline used for distributing the fluid and gas of the wellbore system 100 to a processing plant.

The scale and corrosion monitoring system 110 includes a transmitter 142 located on an outside circumference of a tubing 108 that is in communication with the controller 112 via an electrical connection 116. The transmitter 142 transmits both longitudinal and torsional ultrasonic waves along a longitudinal axis of the tubing 108 to a receiver 144 located on the outside circumference of the tubing 108. The receiver 142 is also in communication with the controller 112 via the electrical connection 116. The receiver 142 receives both the longitudinal and torsional ultrasonic waves transmitted by the transmitter 144. In this way, the ultrasonic waves travel, in the form of mechanical vibrations, longitudinally along the sidewall of the tubing 108 in direction 150 from the transmitter 142 to the receiver 144. Torsional ultrasonic waves generally travel in a torsional (or circumferential) direction (for example, a helical path) around the circumference of the tubing 108 while longitudinal ultrasonic waves generally travel in a straight-line path (or axial) direction.

Some scale and corrosion monitoring systems 110 use a transmitter 142 and a receiver 144 mounted on the outside of the tubing in the space between the tubing 108 and the casing 120. In some examples, this space is generally referred to as the tubing casing annulus. In some cases, the height of the transmitter 142 and the receiver 144 (e.g., measured along a radial dimension of the tubing 108) is less than or equal to 20 mm so transmitter 142 and the receiver 144 can be inserted into the tubing 108 when the tubing 108 is a 4.5 inch (114.3 mm) diameter tubing 108 and when the casing 120 is a 7 inch (177.8 mm) diameter casing 120. In some cases, the transmitter 142 and the receiver 144 is contactless (e.g., does not physically touch the tubing 108). In some cases, a non-contact EMAT transmitter 142 used to generate the torsional and longitudinal waves.

Some scale and corrosion monitoring systems 110 are permanently installed. For example, some scale and corrosion systems 110 are permanently pre-installed on the tubing 108 because there is limited access between the tubing 108 and the casing 120 after the tubing 108 is installed. In this case, it can be difficult for a tool to be lowered into this limited space to mount/remove scale and corrosion monitoring systems 110. Some scale and corrosion monitoring systems 110 are pre-installed on a 10 foot section of tubing 108 before the tubing 108 is lowered into the wellbore system 104. In some cases, multiple lengths of tubing 108 are connected together and lowered into the wellbore system 104 together. In some cases, a section of tubing of the wellbore system 104 is replaced with a section of tubing with a transmitter 142 and a receiver 144 for use with a scale and corrosion monitoring system 110.

Figure 2:
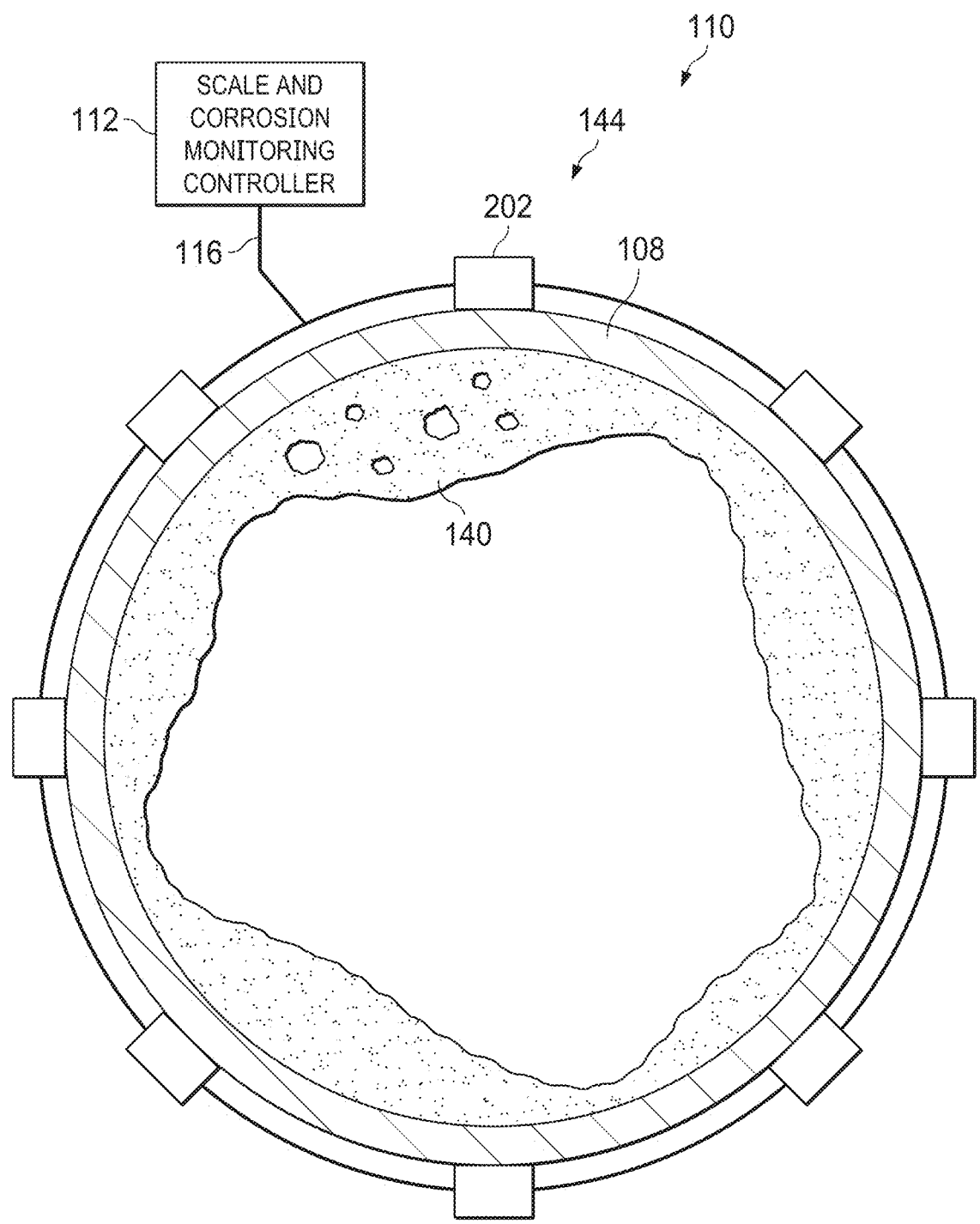
FIG. 2 is a schematic cross-section of a tubing showing a layer of scale in detail.

FIG. 2 is a schematic cross-section (for example, cross section 150 of the tubing 108 shown in FIG. 1) showing a layer of scale 140 in detail. In the example shown, the layer of scale 140 is located on an inside circumference of the tubing 108. In general, the scale 140 varies axially along the longitudinal axis of the tubing 108 (for example, as shown in FIG. 1) and angularly around the circumference of the tubing 108 as shown in FIG. 2. In some examples, the wall thickness of the scale 140 (e.g., the scale thickness) varies between 0 mm and 18 mm. In the example shown, the receiver 144 is disposed around the tubing 108 and includes eight transducers 202 equally spaced around the circumference of the tubing 108 for receiving ultrasonic waves.

Figure 3A:
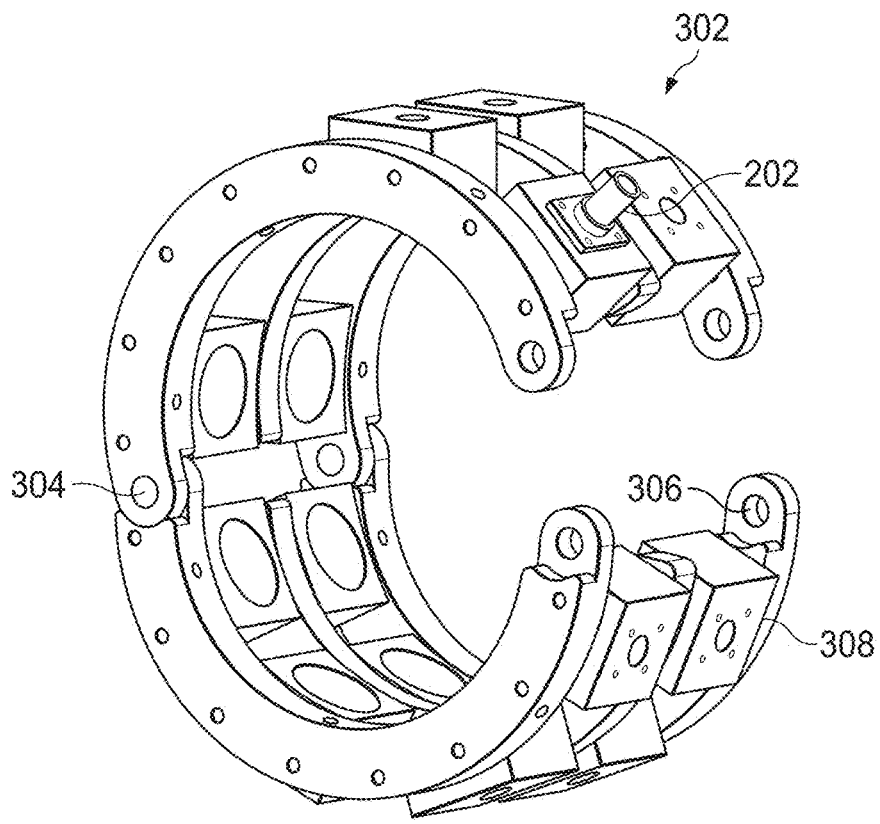
FIG. 3A is a perspective view of an example housing of a receiver.

FIG. 3A is a perspective view of an example housing 302 of a receiver, such as the receiver 144 of FIGS. 1 and 2. The housing 302 includes sixteen mounting blocks 308 for mounting sixteen transducers 202. The mounting blocks 308 are equally spaced around the circumference of the tubing 108. A set of eight of the sixteen transducers 202 are used for measuring longitudinal ultrasonic waves and a different set of eight of the sixteen transducers 202 are used for measuring torsional ultrasonic waves. In this way, longitudinal and torsional ultrasonic waves are measured completely around the circumference of the tubing 108. For example, the housing 302 includes a first ring of eight transducers 202 for measuring longitudinal waves positioned at 45 degree intervals around the circumference of the tubing 108 and a second ring of eight transducers 202 for measuring torsional waves positioned at 45 degree intervals around the circumference of the tubing 108. In some cases, the second ring is axially offset from the first ring. By axially offsetting the second ring for measuring torsional waves from the first ring for measuring longitudinal waves, the distance between the transmitter used to transmit the torsional waves and the second ring for measuring the torsional waves is the same as the distance between the transmitter used to transmit the longitudinal waves and the first ring for measuring the longitudinal waves. This means that the scale and corrosion monitoring system 110 does not need to account for different travel distances for the longitudinal waves and the torsional waves. In this way, the housing 302 includes a dual-ring design where the sixteen transducers 202 are equally spaced around the tubing 108 when the housing 302 is positioned around the tubing 108.

The housing 302 includes a pivot axis 304 that allows the housing 302 to pivot open for inserting the housing 302 around the outside circumference of the tubing 108. A connector (for example, a pin or bolt) inserts into a series of holes 306 to secure the housing 302 around the tubing 108 in a clamped configuration (shown in FIG. 3B). A series of alignment screws are used to center and position the housing 302 on the tubing 108. For example, it is preferred to generate an axisymmetric wave such that the displacement amplitude of the wave is the same around the entire circumference. In some examples, a constant displacement amplitude around the entire circumference is achieved by controlling the gap size to be the same between the transducers 202 and the tubing 108 around the entire circumference. One approach to control the gap size is by using alignment screws.

While the housing 302 is used with sixteen transducers, in other cases, more or less than sixteen transducers are used (for example, 10, 12, 18, 20, etc.). Increasing the number of transducers 202 provides a higher resolution of the wave, but the resolution is also limited by the wave length of the wave. In the example shown in FIG. 3A, eight transducers 202 are used around the circumference of the tubing 108 because using more than eight transducers 202 would not fit around the specific tubing 108. However, in some scale and corrosion monitoring systems, ten transducers 202 are equally spaced (for example, every 36 degrees) to measure ultrasonic waves with more data points around the circumference of the tubing 108. In some examples, sixteen transducers 202 are equally spaced (for example, every 22.5 degrees) for measuring longitudinal ultrasonic waves and an additional sixteen transducers 202 are equally spaced for measuring torsional ultrasonic waves. Preferably, the signal to noise ratio for the receiver 144 is greater than 40 dB (for example, 50 dB, 60 dB) for both longitudinal and torsional wave modes.

Figure 3B:
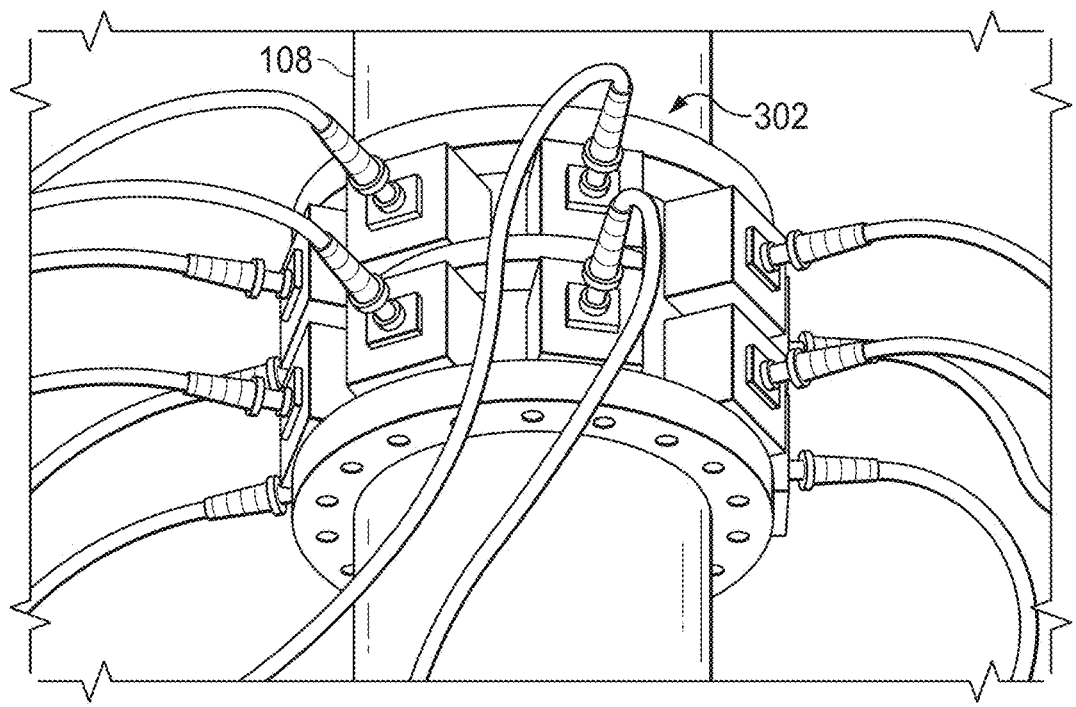
FIG. 3B is a perspective view of a housing with sixteen transducers installed on a tubing.

FIG. 3B is a perspective view of the housing 302 with all sixteen transducers 202 installed and mounted on the outside circumference of a tubing 108 (for example, in a clamped configuration).

Some scale and corrosion monitoring systems 110 use a thin nickel foil (for example, a 0.1 mm thick nickel foil) positioned between the tubing 108 and the transducers 202 to enhance magnetostriction (for example, the nickel foil has a magnetostrictive coefficient to enhance magnetostriction). In some examples, a 1 mm thick nickel foil is bonded to the outside circumference of the tubing 108 using an Araldite adhesive. Preferably, the thickness of the foil is larger than three times the skin depth in the nickel. In some cases, the thickness is a few hundred micrometers (for example, 100 µm to 300 µm (or 0.1 mm to 0.3 mm)).

Some scale and corrosion monitoring systems 110 use transducers 202 where each transducer is a conventional wide band transducer. In some cases, the sixteen transducers 202 are part of a piezo-electric system in bonded contact with the circumference of the tubing 108. In some cases, the transducers 202 are either piezo-ceramic based transducers or magnetostrictive transducers. In some cases, the transducers 202 measure vibrations within a range of 100 kHz to 500 kHz. In some cases, the transducers 202 have an overall mode-purity better than 20 dB, meaning that for any frequency the spurious wave mode signal is 20 dB below the primary wave mode.

Some scale and corrosion monitoring systems 110 use longitudinal wave transducers 202 with a linear coil design of 30 turns of copper wire (for example, a 0.08 mm diameter copper wire) around a 35 mm diameter by 20 mm high neodymium disc magnet. In this example, the transducers 202 are electromagnetic acoustic transducers (EMATs) that operate by inducing a mechanical force in the tubing 108 using electromagnetic principles such as Lorentz force and Magnetostriction. For example, in some cases, the transducers 202 use Magnetostriction by aligning the magnetic domains with an applied alternating electric field generated using an electric current flowing through the linear coil design of the transducer 202. A permanent bias magnetic field is also applied to the transducer 202. The dominant strain is in the axial direction to measure the longitudinal waves.

Some scale and corrosion monitoring systems 110 use torsional wave transducers 202 with a racetrack design (for example, using a 0.08 mm wire) of a single pair of opposing magnets. In some cases, the width of the magnets is 3 mm. In some cases, the length of the racetrack coil in circumferential direction is 10 mm. In this example, the torsional wave transducers 202 are similar in design to the example above relating to the longitudinal wave transducers 202. However, the induced strains are in the circumferential direction to measure the torsional waves.

Figure 4A:
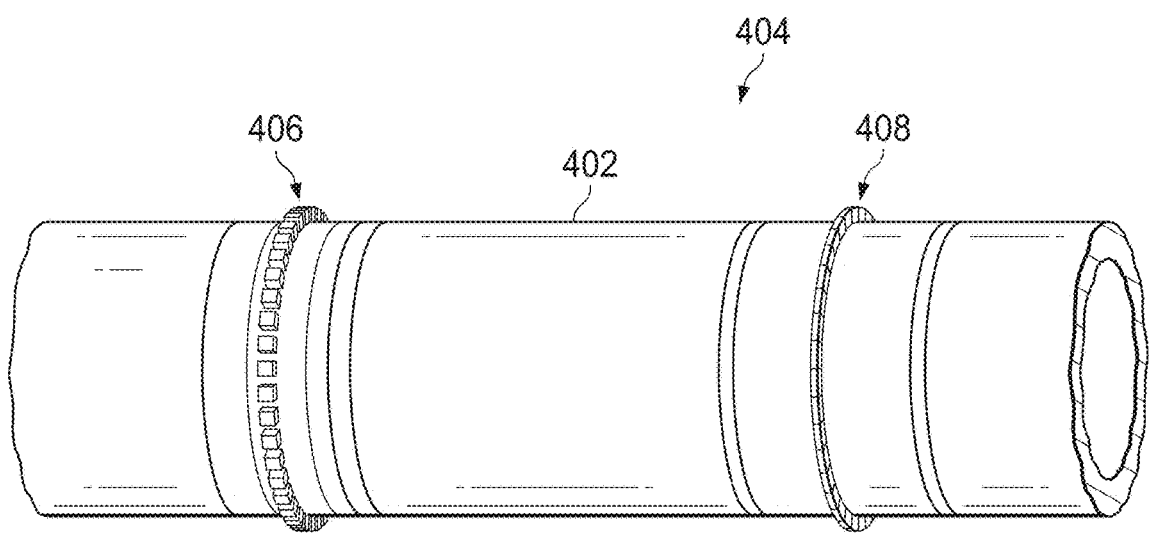
FIGS. 4A and 4B are perspective views an example transmitter used with a scale and corrosion monitoring system.
Figure 4B:
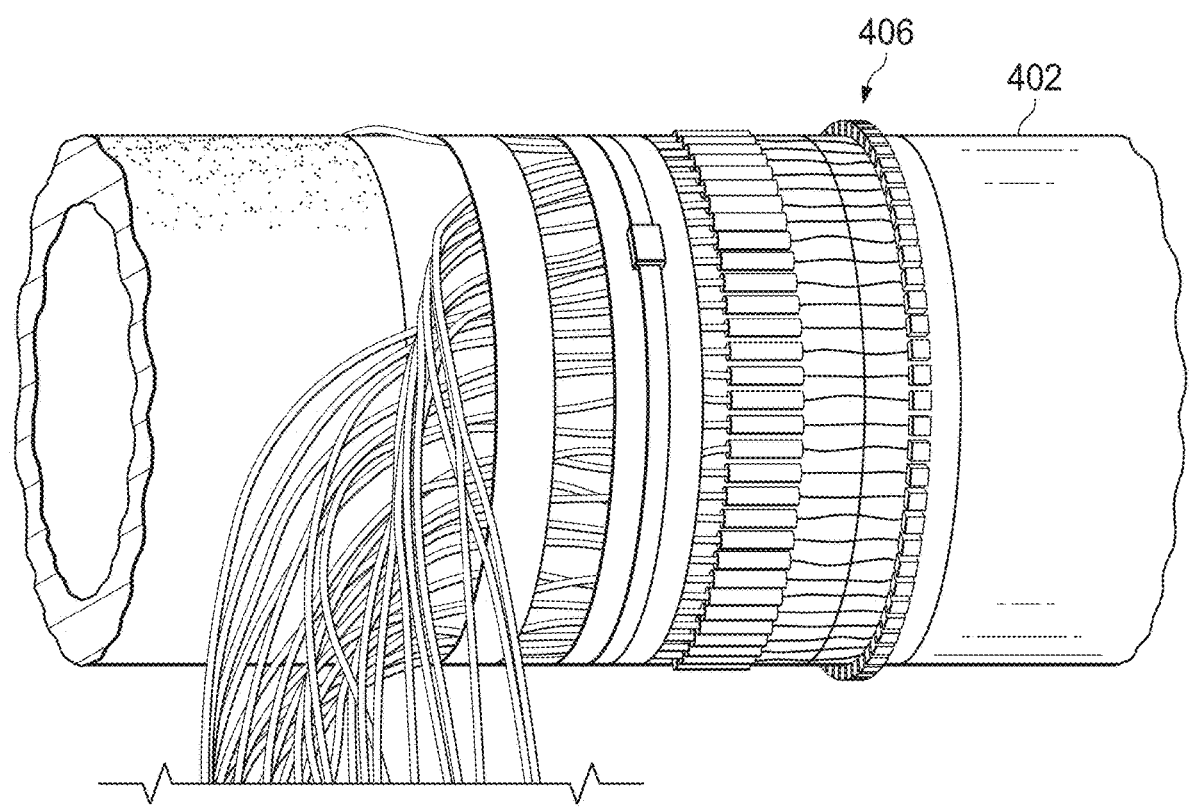

FIGS. 4A and 4B are perspective views an example transmitter 404 used with the scale and corrosion monitoring system 110. In some examples, the transmitter 404 is substantially similar to, or the same as, the transmitter 142 described with reference to FIG. 1. The transmitter 404 is mounted on a tubing 402. In some examples, the tubing 402 is substantially similar to, or the same as, the tubing 108 described with reference to FIG. 1. In this example, the tubing 402 has a nominal wall thickness of 7 mm. In some examples, the transmitter 404 produces both longitudinal and torsional ultrasonic waves with frequency content between 100 to 500 kHz in the tubing 402. In other examples, different frequencies are used. The frequencies used depend on the thickness of the scale inside the tubing (for example, higher frequencies are used to measure thinner scale thicknesses and vice versa). For example, the transmitter 404 produces both longitudinal and torsional ultrasonic waves with frequency content higher than 100 to 500 kHz (for example, between 500 kHz and 1 MHz) for measuring thin scale layers (for example, less than 3 mm thickness as might be measured in small diameter tubings). In other examples, the transmitter 404 produces both longitudinal and torsional ultrasonic waves with frequency content lower than 100 to 500 kHz (for example, between 50 kHz and 100 kHz) to measure thick scale layers (for example, greater than 20 mm thickness as might be measured in large diameter tubings). In all these examples, it is preferred to maintain a constant scale thickness (and/or wall thickness) to frequency ratio (for example, a 6 mm scale thickness to a 114.3 mm diameter tubing 108 is a thickness to frequency ratio of 0.05).

In the example shown, the transmitter 404 is disposed on an outside circumference of the tubing 402 and includes two separate rings of EMATs 406, 408 that are in direct contact with the tubing 402. The two rings of EMATs 406, 408 are EMAT coil designs (for example, including coils and permanent magnets) for transmitting longitudinal and torsional guided waves, respectively. The longitudinal wave transducers 406 produce current that travels through the coils along the circumferential direction of the tubing 402. All magnets have the same polarity so the produced current generates a magnetic field perpendicular to the surface of the tubing 402. The magnetic field causes a force to be generated in an axial direction of the tubing 402. The force generates longitudinal waves traveling along the axial direction of the tubing 402.

The torsional wave transducers 408 produce current that travels though coils in the axial direction of the tubing 402 in a race-track configuration. Alternating polarity magnets are used to generate a magnetic field perpendicular to the tubing surface. The alternating current direction and matching alternating polarity of the magnets generates a continuous force in the circumferential direction. The continuous force generates torsional waves that propagate in the axial direction of the tubing 402. The generated torsional waves are axisymmetric since the torsional transducers 408 are located around the circumference of the tubing 108.

In some examples, the spacing of the longitudinal wave transducers 406 and/or the torsional wave transducers 408 around the circumference is determined by the wave length of the ultrasonic waves used. For example, spacing in the order of a wavelength is sufficient. In this example, spatial variations are measured on the order of a wavelength (or a few wavelengths such as one, two, or three wavelengths) and is sufficient because spatial variations are not expected to be large in the direction around the circumference. In other words, because the waves are expected to be substantially axis-symmetric, any variations from true axis-symmetry is caused by variations in the scale thickness and is measurable when the spacing of the longitudinal wave transducers 406 and/or the torsional wave transducers 408 around the circumference is on the order of a wavelength.

Figure 5A:
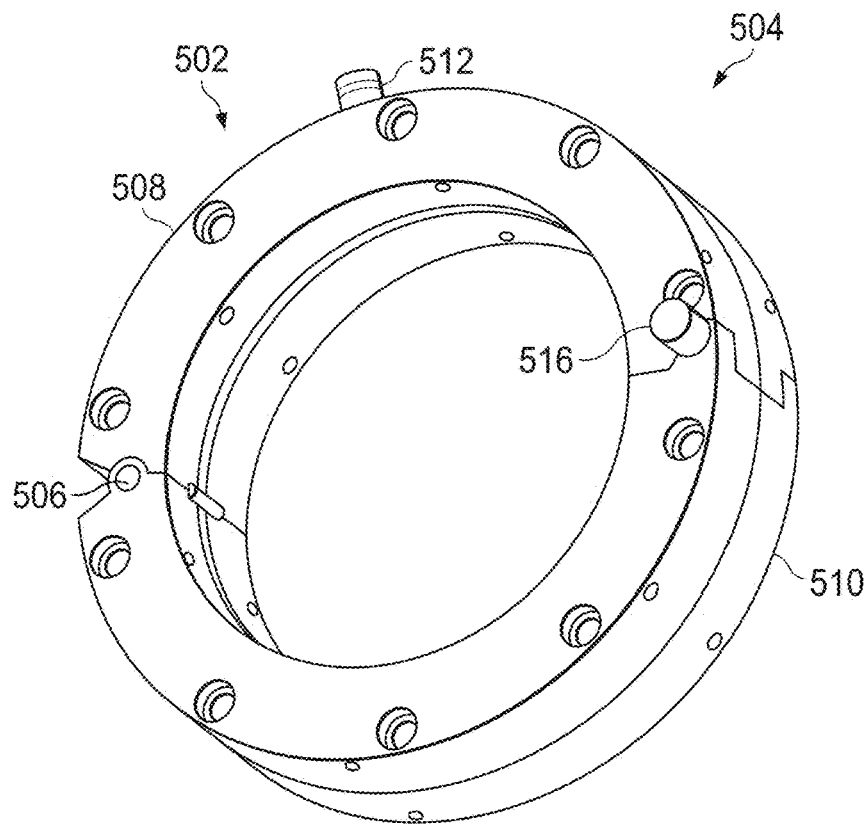
FIGS. 5A and 5B are perspective views of an example housing for a non-contact transmitter used with a scale and corrosion monitoring system.
Figure 5B:
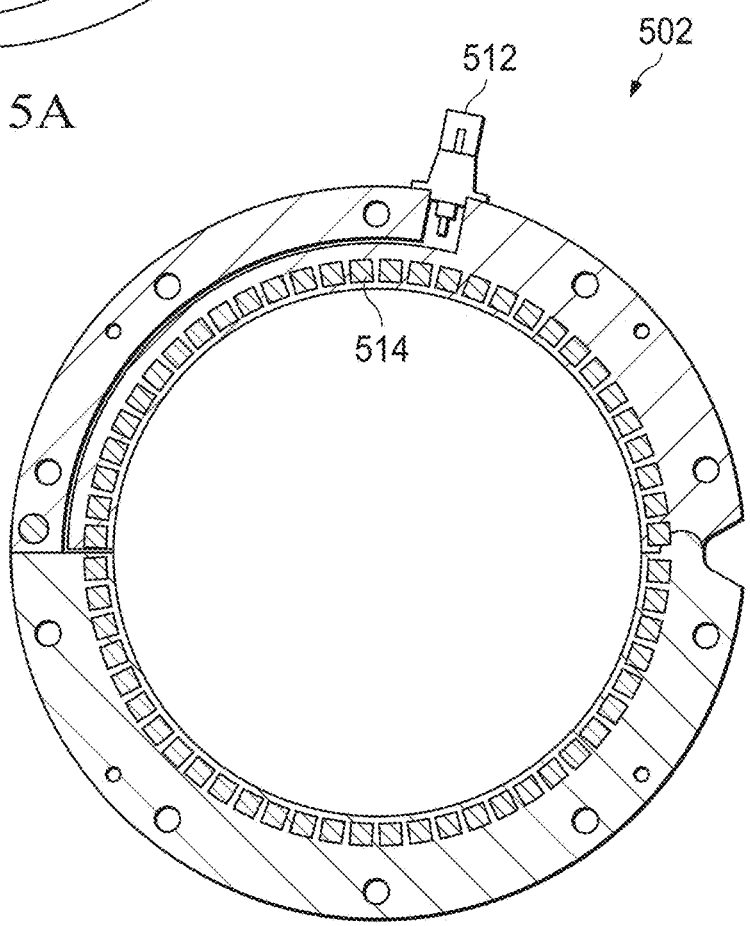

FIGS. 5A and 5B are perspective views of example housing 502 for a non-contact transmitter 504 used with the scale and corrosion monitoring system 110 for generating longitudinal waves. In some examples, the transmitter 504 is substantially similar to, or the same as, the transmitter 142 described with reference to FIG. 1. In some implementations, the non-contact transmitter 504 is used with the scale and corrosion monitoring system 110 instead of a contact transmitter 404 as described with reference to FIGS. 4A and 4B. The transmitter 504 is an EMAT design that transmits longitudinal ultrasonic waves in a tubing (such was tubing 108 or tubing 402). The non-contact transmitter 504 is housed within the housing 502 and positioned around with tubing leaving a small gap (e.g., 5 mm) between the internal diameter of the housing 504 and the outside diameter of the tubing. This gap decouples mechanical interaction between the transmitter 504 and the tubing, but allows the magnetic field to generate the mechanical forces similar to transmitter 404. Preferably, the gap is as small as possible to maximize signal amplitude while still able to account for non-roundness of the tubing without contacting the tubing. In other words, it is important that the gap between the sensor and the tubing is the same completely around the circumference. When using a slightly larger gap, small gap variation do not affect the signal amplitude as much which gives a more robust design.

In some implementations, the height of the non-contact transmitter 504 is smaller than the example shown in FIGS. 5A and 5B so that it fits between the tubing 108 and the casing 120 of a well. For example, the height is less than or equal to 20 mm when the tubing 108 is a 4.5 inch (114.3 mm) diameter tubing 108 and when the casing 120 is a 7 inch (177.8 mm) diameter casing 120 as described above with reference to FIG. 1. In some examples, an external connector is not used to minimize the height of the non-contact transmitter 504.

The housing 502 holds a plurality of magnets 514 and coils of the non-contact EMAT transmitter 504 such that they are held away from the outside circumference of the tubing with the air gap. In the example shown, the housing 502 is 80 mm in outer diameter, 58 mm in inner diameter, and 40 mm in length. The housing 502 is a clamshell design (similar to the housing 302 described with reference to FIG. 3A) with a hinge 506 so that the top 508 and bottom 510 portions open apart to allow the housing 506 to be wrapped around the outer diameter of the tubing for installation. Once in place, the housing 506 is pivoted closed. The housing 502 includes a connector 512 that electrically connects the magnets 514 and the coil to the external controller 112 of the scale and corrosion monitoring system 110.

In some examples, the transmitters 404, 504 include a mode purity better than −20 dB (for example, −30 dB, −40 dB, etc.). A −20 dB mode purity means that the amplitude of longitudinal waves is at least 20 dB lower than torsional waves for a torsional wave transmitter and the amplitude of torsional waves is at least 20 dB lower than longitudinal waves for the longitudinal wave transmitter. Mode purity is achieved using the size of the sensor in the circumferential direction. Alternatively the size in axial direction could be increased, but sometimes this has a negative effect on the frequency bandwidth.

Figure 6A:
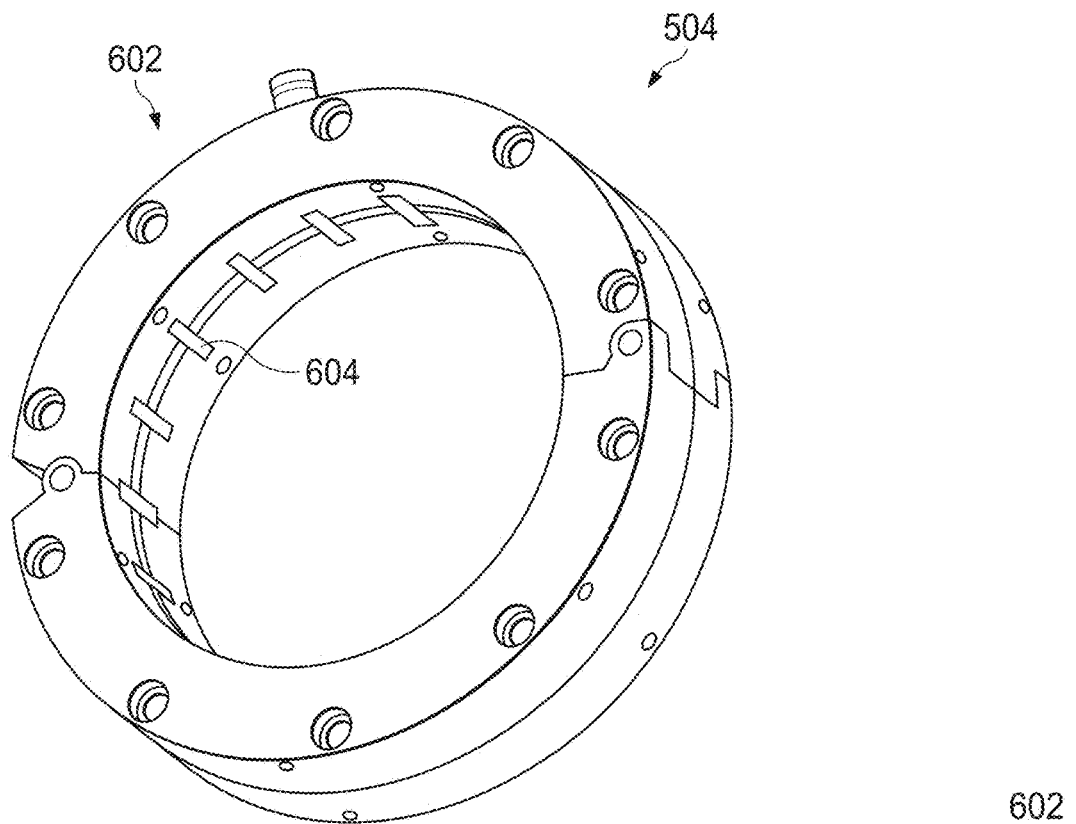
FIGS. 6A and 6B are perspective views of an example housing as part of the non-contact transmitter used with the scale and corrosion monitoring system.
Figure 6B:
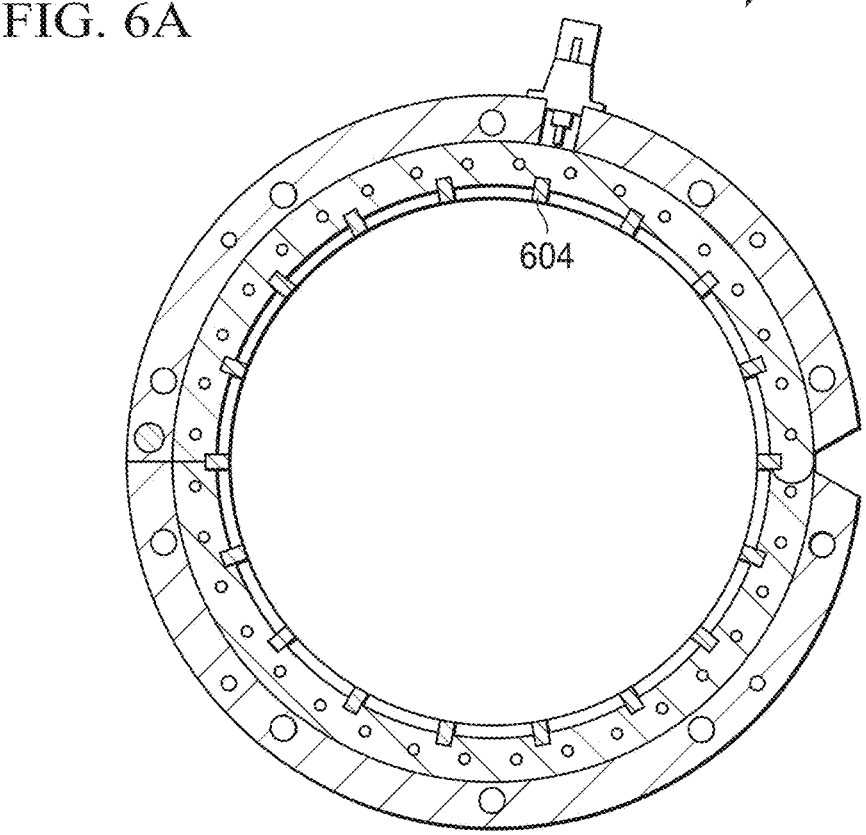

FIGS. 6A and 6B are perspective views of example housing 602 as part of the non-contact transmitter 504 used with the scale and corrosion monitoring system 110 for generating torsional waves. The housing 602 is substantially similar to, or the same as, the housing 504 described with reference to FIGS. 5A and 5B, except the magnets 604 are arranged longitudinally. The housing includes a recess for receiving a protrusion 516 of housing 502 when the housings 502, 602 are installed on the tubing 108 adjacent to each other.

Figure 7:
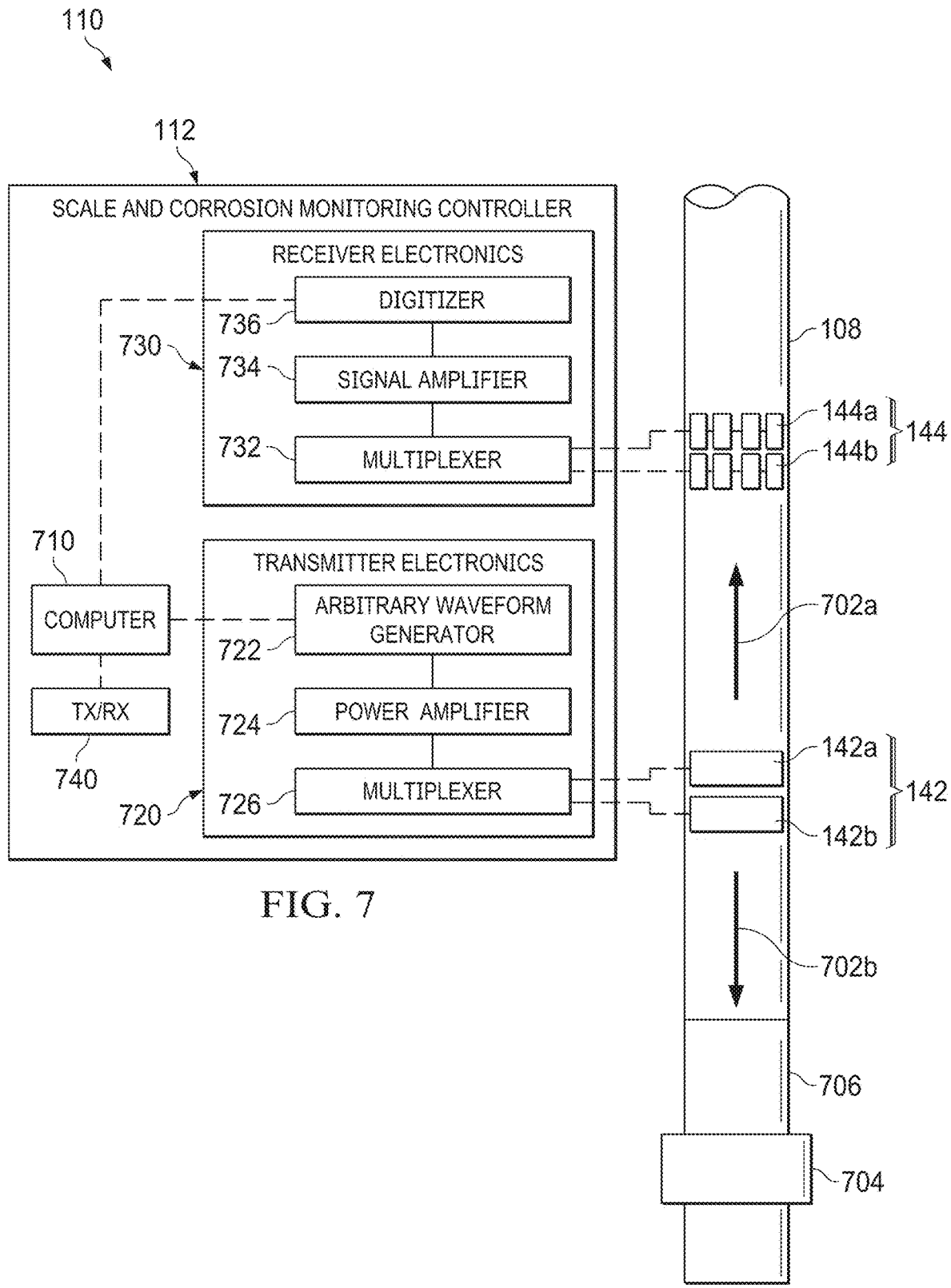
FIG. 7 is a schematic view of a scale and corrosion monitoring system according to the present disclosure.

FIG. 7 is a schematic view of the scale and corrosion monitoring system 110 according to the present disclosure. The scale and corrosion monitoring controller 112 includes a transmitter 142 with a first ring of transducers 142a for transmitting longitudinal waves and a second ring of transducers 142b for transmitting torsional waves. The longitudinal and torsional waves propagate through the side wall of the tubing 108 in both axial directions 702a and 702b away from the transmitter 142. The waves propagating in direction 702a are received by the receivers 114. The receivers include a first ring of transducers 114a for receiving longitudinal waves and a second ring of transducers 144b for transmitting torsional waves. In some examples, a distance between transmitter 142 and the receiver 144 is at least 3 feet (for example, 4 feet, 6 feet, 10 feet, etc.).

In some examples, because the transmitter 404 wraps completely around the circumference of the tubing 402, the transmitter 404 transmits axisymmetric longitudinal ultrasonic waves and axisymmetric torsional ultrasonic waves through the tubing 402. "Axisymmetric" waves do not depend on an angular position around a circumference of the tubing 402. This means that any arbitrary position around the circumference of the tubing 402 has the same vibrational response. As the ultrasonic waves travel to the transducers 144, the wave speed of the waves depend on the thickness of the tubing 108, the material of the tubing 108, the thickness of the scale 140, and the material of the scale 140. The wave speed of the waves also depend on the thickness of the tubing 108, the material of the tubing 108, the thickness of the scale 140, and the material of the scale 140. This change is wave speed is detected by the scale and corrosion monitoring controller 112 by processing the data received by the receiver 144.

The scale and corrosion monitoring controller 112 includes transmitter electronics 720 and receiver electronics 730 both in communication with a computer 710. The transmitter electronics 720 include an arbitrary waveform generator 732, a power amplifier 734, and a multiplexer 736. The receiver electronics 730 include a multiplexer 732, a signal amplifier 734, and a digitizer 736. The computer 710 accounts for time synchronization between the transmitted signal and the received signal. The scale and corrosion monitoring controller 112 includes external transmit and receive electronics 740 for sending data to and/or from an external computer, for example, for sending measurement data to the surface of the well for further software analysis.

Figure 41A:
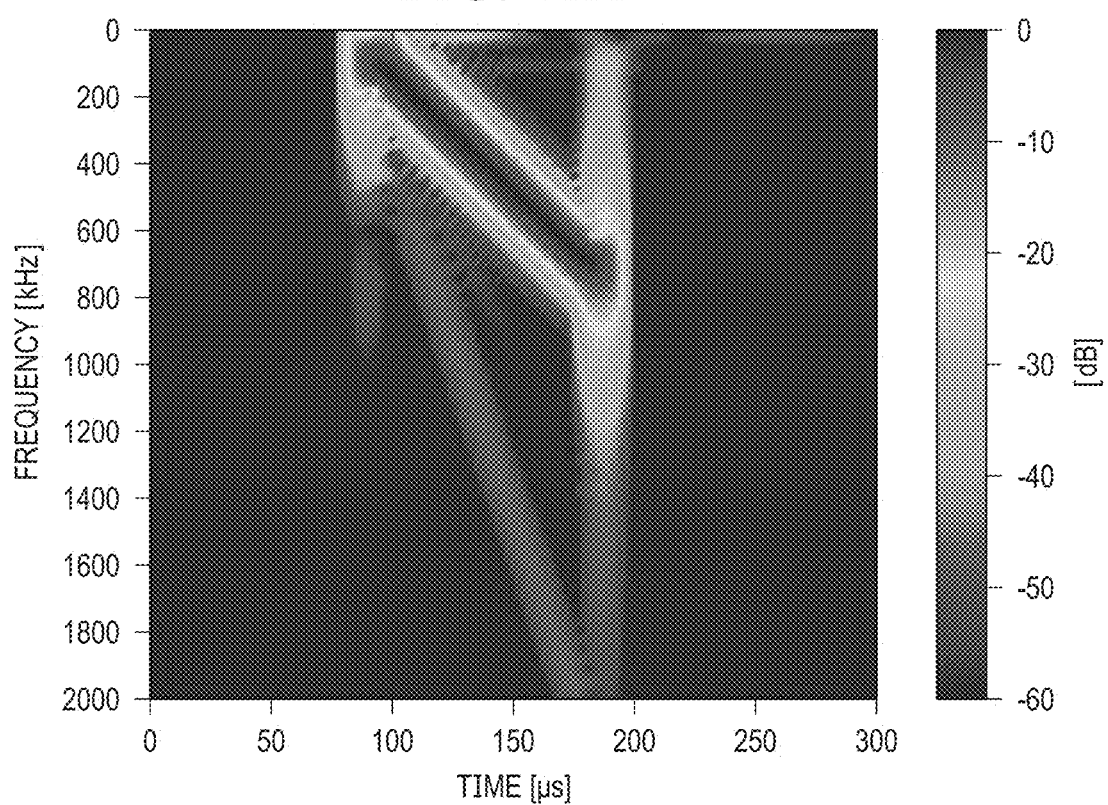
FIGS. 41A and 41B are frequency domain representations of example drive signals.
Figure 41B:
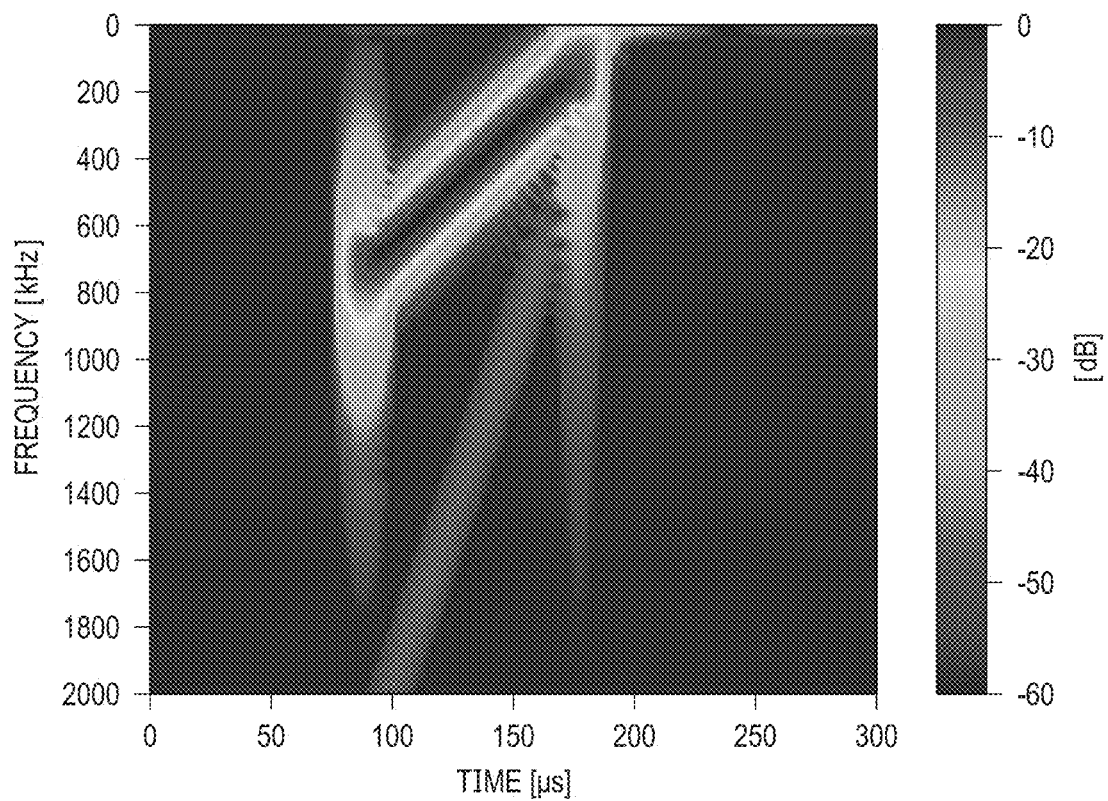
Figure 42:
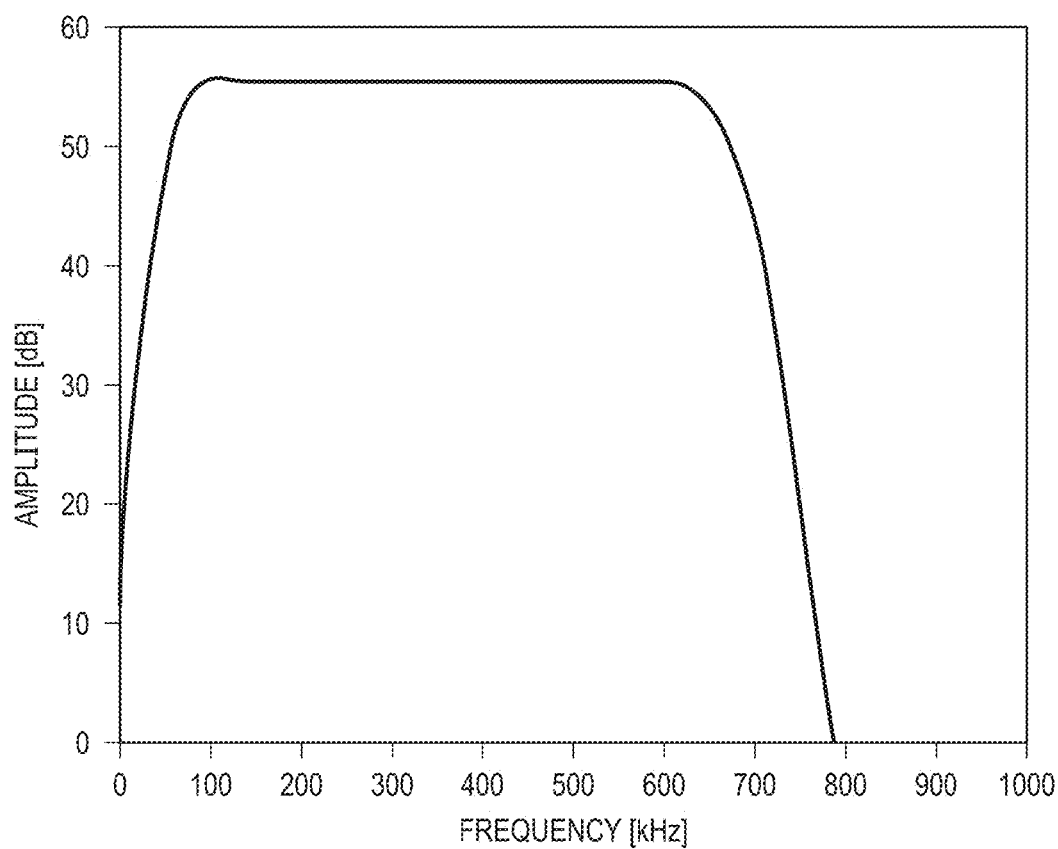
FIG. 42 is a frequency spectrum of source sweep signal between 20 to 750 kHz.

The waveform generator 732 is controlled by the computer 710 to produce a drive signal (for example a source wavelet signal) with frequencies between 100 kHz and 500 kHz. In some examples, the drive signal is a time-domain signal of a sine wave with changing frequency over time. In this example, a frequency domain representation of the drive signal is shown in FIG. 41. In some examples, the drive signal contains broadband frequency content that includes all frequencies between 100 kHz and 500 kHz. For example, including broadband frequency content in the drive signal increases a likelihood that higher order modes are excited in the tubing 108. The sampling frequency of the arbitrary waveform generator 732 is at least 2 MHz with a 12 bit resolution. The frequency sweep is larger than the transducer bandwidth to minimize edge effects. For example, an example frequency sweep is shown in FIG. 42. In this example, edge effects are minimized because the sweep is tapered at the beginning and end of the sweep while also maintaining the required bandwidth by using a constant amplitude. In this case, the frequency range is larger than the transducer bandwidth such that the excitation signal has constant amplitude within the required bandwidth. In some cases, the drive signal includes a frequency sweep starting at the highest frequency of interest (for example, 500 kHz) and sweeps to the lowest frequency of interest (for example, 100 kHz). For example, sweep parameters for an example sweep is tabulated in Table 1. In this case, the sweep runs from 50 to 750 kHz with a length of 100 μs. This "high-to-low" frequency sweep reduces interference caused by harmonic distortion in the scale and corrosion monitoring controller 112.

TABLE 1

Sweep Parameters.

| Parameter | Min. Value | Max. Value | Unit |
| --- | --- | --- | --- |
| Frequency | 50 | 750 | kHz |
| Time | 0 | 100 | μs |

The power amplifier 724 receives the drive signal from the waveform generator 732 and amplifies the signal to deliver 500 W of instantaneous power to the transmitter 142. In some examples, the drive signal is amplified to 100 V In some examples, the power to be delivered (in this example 500 W) is determined (for example, maximized) based on the limitations of the amplifier and/or hardware of the test setup (for example, transducers or signal conditioning electronics). In some examples, the energy required for a single wall thickness and scale thickness measurement using the scale and corrosion monitoring system 110 is 1.6 Joules. This power requirement assumes 1000 times averaging is used and that EMATs are used for the transmitter 142 and receiver 144. This power requirement also assumes that one receiver signal is recorded for each transmitted source wavelet.

Each ring 142a, 142b of the transmitter 144 is used sequentially. To avoid needing two power amplifiers 724, the multiplexer 726 is used to switch between the two different transmitters 142a, 142b. In this scenario, the transmitter 144 alternates between transmitting longitudinal waves and torsional waves. In some examples, the sweep is performed for a duration of 100 us which is limited by the electrical cross-talk between the transmitter and the receiver. In some examples, this cross-talk saturates the receive amplifier, which means the receive amplifier cannot properly amplify the guided wave signals. In some cases, the signals are averaged to further enhance SNR. In some examples, the signal are averaged at 1000$x$ to further enhance SNR. It is important to transmit only one wave mode at a time (for example, either longitudinal waves or torsional waves) because transmitting both of these wave modes at the same time would lead to interference and make the signals difficult to interpret.

For the receiver electronics 730, the multiplexer 732 switches between the two different receivers 144a, 144b in the same way the multiplexer 726 is used to switch between the two different transmitters 142a, 142b. Using the multiplexer 732, the received signals are processed sequentially. In some implementations, instead of using a multiplexer 732, a multi-channel acquisition system is used to simultaneous record signals from both receivers 144a, 144b.

The received signal is sent to the signal amplifier 734 where the received signal is amplified. The amplified signal is digitized using the digitizer 736. The digitizer 736 uses at least a 12 bit A/D conversion with a sampling frequency of at least 2 MHz. The digitized signal is sent to the computer 710 and/or to an external computer via the transceiver 740 for processing. In some cases, information associated with the transmitted signal (e.g., drive signal definition, timing aspects, power levels, etc.) is also sent to the computer 710 and/or to an external computer via the transceiver 740 for processing. In some examples, the temperature is measured using thermocouples and sent to the computer 710 and/or to an external computer via the transceiver 740 for processing The scale and corrosion monitoring controller 112 is designed to withstand temperatures up to 166° C. (330° F.) and pressures up to 48 MPa (7000 PSI). It shall be designed to withstand commonly present chemicals including hydrogen sulfide. In this example, the scale and corrosion monitoring controller 112 is designed to withstand downhole conditions with temperatures up to 166° C. (330° F.) and pressures up to 48 MPa (7000 PSI). In this case, the Curie temperature of the magnets are one of the most important design parameters to increase the likelihood that the magnets function properly at these temperatures. Pressure is less of a concern as long as there are no air pockets inside the transducers. In other words, when the transducers are made of a pure solid material there should no air pockets inside the transducers because there is no space for the air to occupy.

In examples where a joint 704 between two sections of tubing 108 exist, waves propagating in the axial direction 702b are generally reflected at the joint 704. These reflected waves interfere with the signals received by the receiver 144 and minimizing these reflected waves is important. In some examples, placing the transmitter 142 (and/or receiver 144) at least 8 feet from any joints 704 of the tubing 108 minimizes these reflected waves.

Some scale and corrosion monitoring systems 110 use a highly absorbing material 706 applied to the outside circumference of the tubing 108 adjacent to the joints 704. When a highly absorbing material 706 is used, the distance between the transmitter 142 (and/or receiver 144) can be reduced below 8 feet (e.g., 1 foot, 2 feet, etc.). In this way, the absorbing material significantly reduces (and completely eliminates in some cases) reflection from the joints. The absorbing material allows the transmitters and receivers of the scale and corrosion monitoring system 110 to be located close to a joint (for example, within 1 foot) to increase the distance between transmitter and receiver to monitor larger sections. In some examples, the layer of vibration-absorbing material 706 has a length of at least 25 cm along the longitudinal axis of the tubing 108. In some examples, the vibration-absorbing material 706 is wrapped around the tubing 108 with STOPAQ. In some examples, three strips of 10 cm vibration-absorbing material 706 attenuates reflected longitudinal waves 10 dB/m and reflected torsional waves 17 dB/m.

Figure 8:
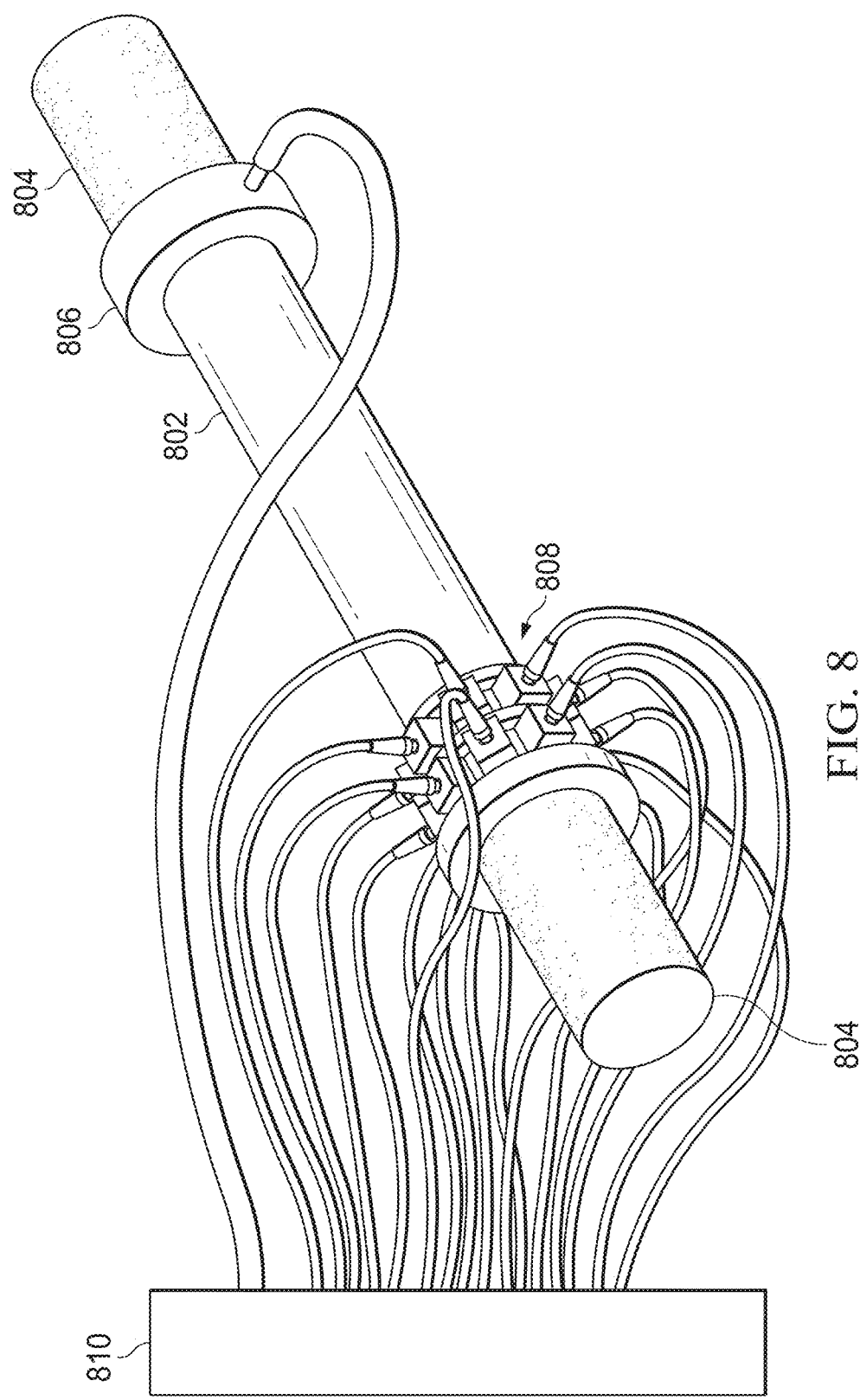
FIG. 8 is a perspective view of a scale and corrosion monitoring system according to the present disclosure.

FIG. 8 is a perspective view of a scale and corrosion monitoring system 800 according to the present disclosure. The scale and corrosion monitoring system 800 is the same as, or substantially similar to the scale and corrosion monitoring system 110. The scale and corrosion monitoring system 800 includes a 4.5 inch diameter hollow tubing 802. Both ends of the tubing 802 are wrapped with a STOPAQ vibration-absorbing material 804 to minimize reflections. An EMAT transmitter 806 is used to transmit the longitudinal and torsional ultrasonic waves in the tubing 802. Two rings of eight EMAT transducers each are used as the receiver 808. A controller 810 is included that is the same as, or substantially similar to, the controller 112.

The scale and corrosion monitoring system 800 transmits ultrasonic longitudinal waves and torsional waves using the transmitter 806 which is received by the receiver 808. The data processing scheme of the scale and corrosion monitoring system 800 is described with reference to FIGS. 9-37. Among other things, the data processing scheme includes determining a wall thickness of the tubing 802, a wall thickness of scale within the tubing 802, a location of the scale within the tubing 802, and the scale material.

The processing sequence begins with reading a new dataset using the receivers 808. The received data is filtered to remove noise outside the frequency band of interest (e.g., outside a range of 100 kHz-500 kHz). The time domain received data is transformed into the frequency domain using a time-frequency analysis and plotted as a spectrogram.

Figure 9:
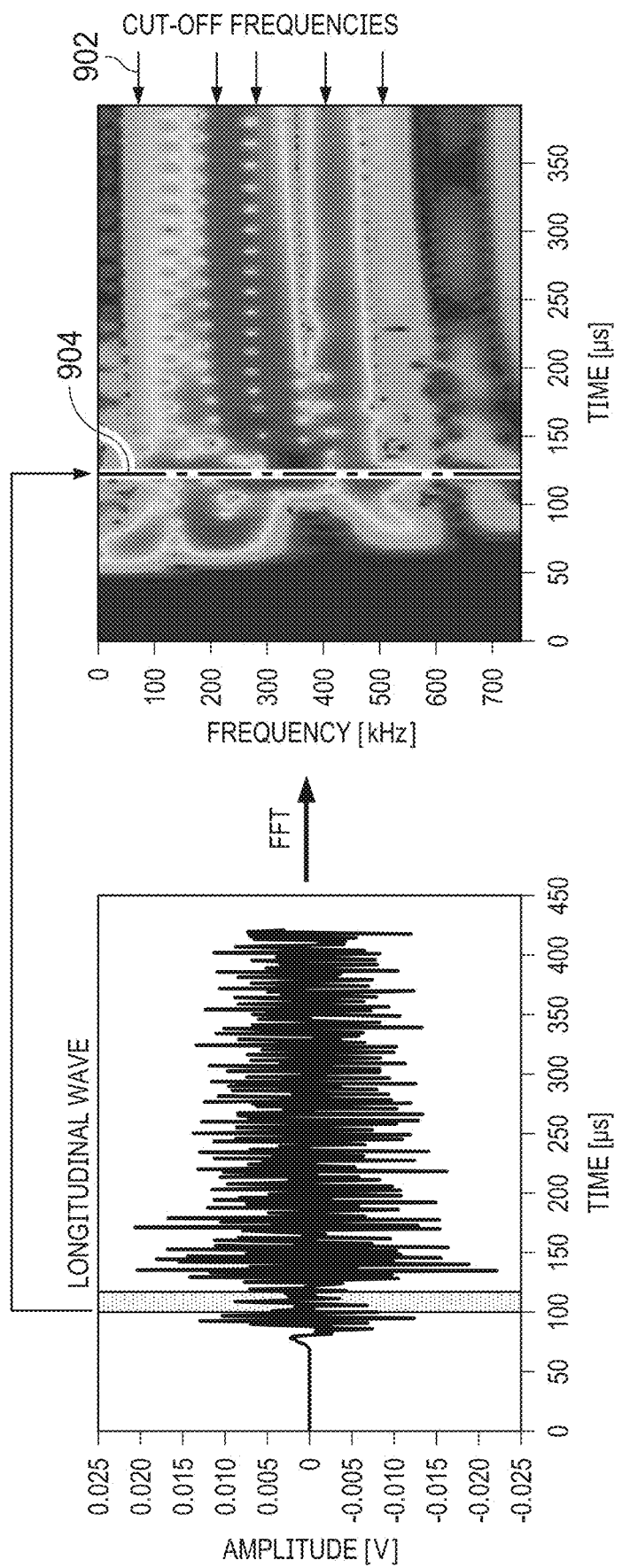
FIG. 9 is a data plot of the time-frequency analysis used with the scale and corrosion monitoring system 110.

FIG. 9 is a data plot of the time-frequency analysis used with the scale and corrosion monitoring system 110. A Fast Fourier Transform (FFT) analysis is performed in a moving time window. The length of time window defines the resolution obtained in the frequency domain. When the window is too short, the frequency resolution is very low. However, if the window is too long, the curvature of the dispersion curves is not clear because of a smoothing effect applied over the window. In some examples, the window is sized to include three cycles of the lowest frequency of interest. The moving time window is applied and for each time window the Fourier transform is computed and collected in a matrix (or spectrogram) shown in FIG. 9. The dotted line 904 in the spectrogram of FIG. 9 represents the time that corresponds to the location of the moving window. Each window position produces one column in the spectrogram matrix indicated by the dotted line 904.

The cut-off frequencies in the data appear as horizontal bands 902. One very useful property of higher order guided wave modes is that they have a cut-off frequency. Higher order modes have cut-off frequencies because higher order modes start as a standing wave in the thickness direction where the first standing wave is half of a cycle. This phenomena is similar to a string on a guitar. Below the cut-off frequencies, these waves do not exist. The cut-off frequency physically corresponds to a thickness resonance. Just above the cut-off frequency the guided waves have a very low group velocity and the cut-off frequencies appear in the spectrogram as horizontal lines.

Figure 10A:
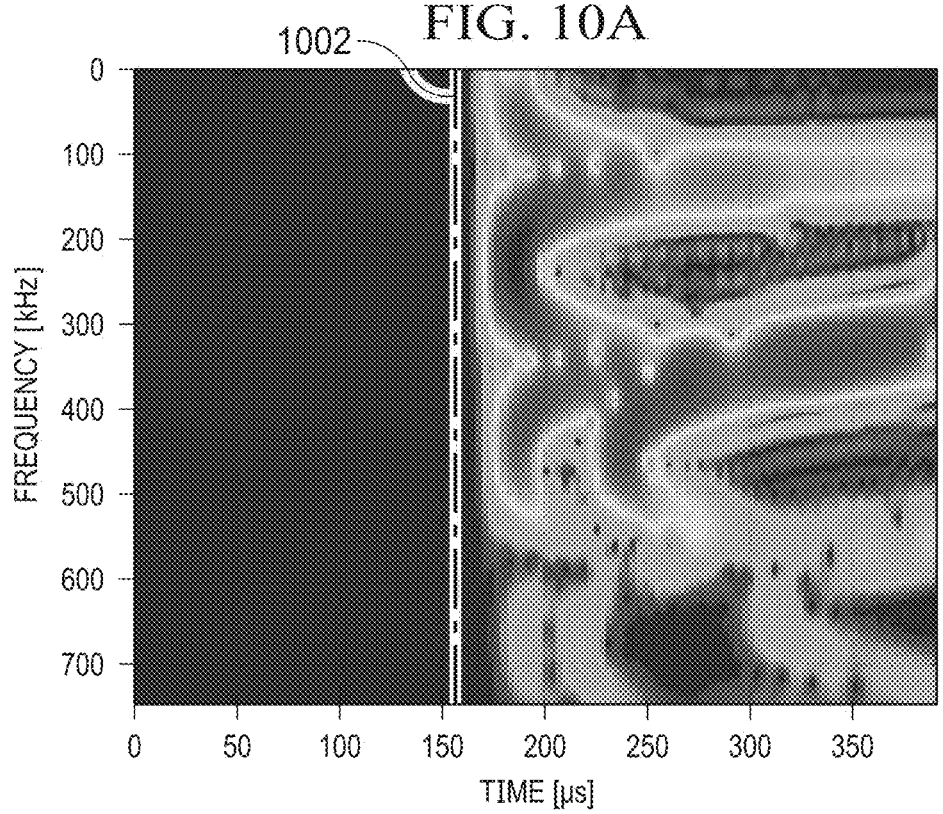
FIGS. 10A and 10B are spectrogram plots for a 6 mm thick scale.
Figure 10B:
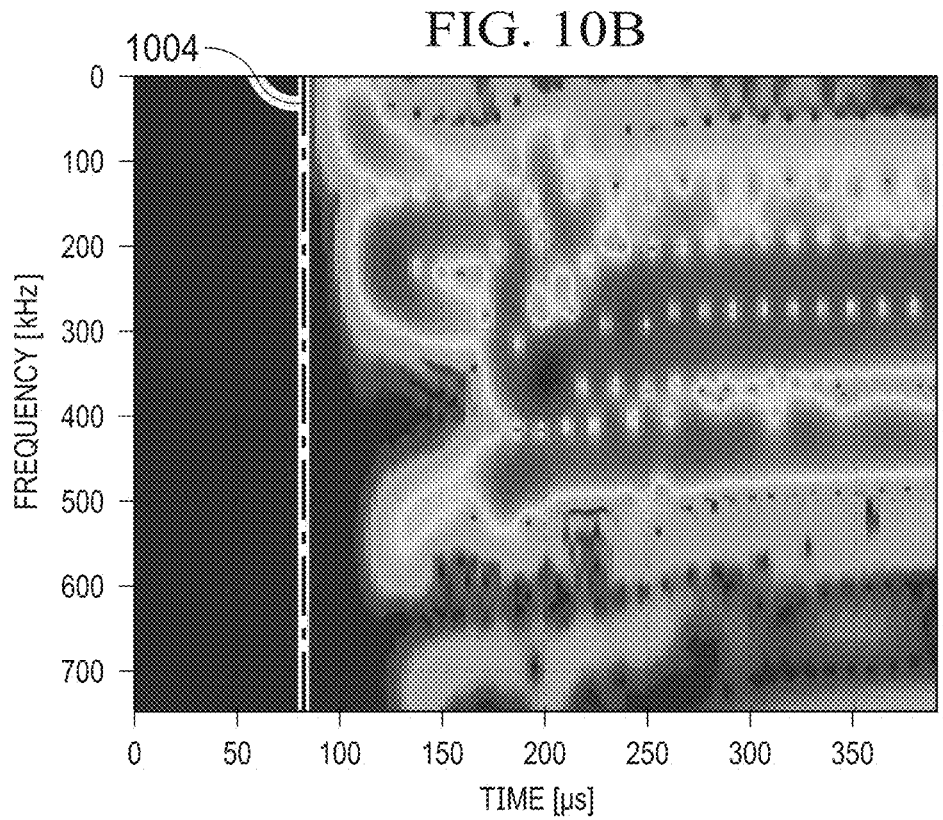

FIGS. 10A and 10B are spectrograms for a layer of scale with a 6 mm thickness. FIG. 10A is a spectrogram for $U_\theta$-excitation (e.g., torsional excitation) and FIG. 10B is a spectrogram for $U_z$-excitation (e.g., longitudinal excitation) from the transmitter 808. The vertical dashed lines 1002, 1004 indicate the arrival times of the fastest frequency components to show that the arrival times depend on frequency. The location of cut-off frequencies of the wave modes (e.g., longitudinal vs. torsional) depends on the scale thickness. Increasing scale thickness affects the propagation velocity of the first waves to arrive at the receiver 806. The cut-off frequencies of modes are directly related to the scale layer thickness and the mechanical properties of the scale.

The mode cut-off frequencies for shear horizontal waves can be calculated with a simple model. These cut-off frequencies originate from standing wave resonances in the bi-layer system (e.g., a bi-layer system of the tubing 802 and a scale within the tubing 801). An analytic expression of the frequency dependent reflection coefficients can be determined of such a bilayer system. The shear wave impedance is defined as the product of density and shear wave velocity. The normal incidence reflection and transmission coefficients are calculated.

Figure 11A:
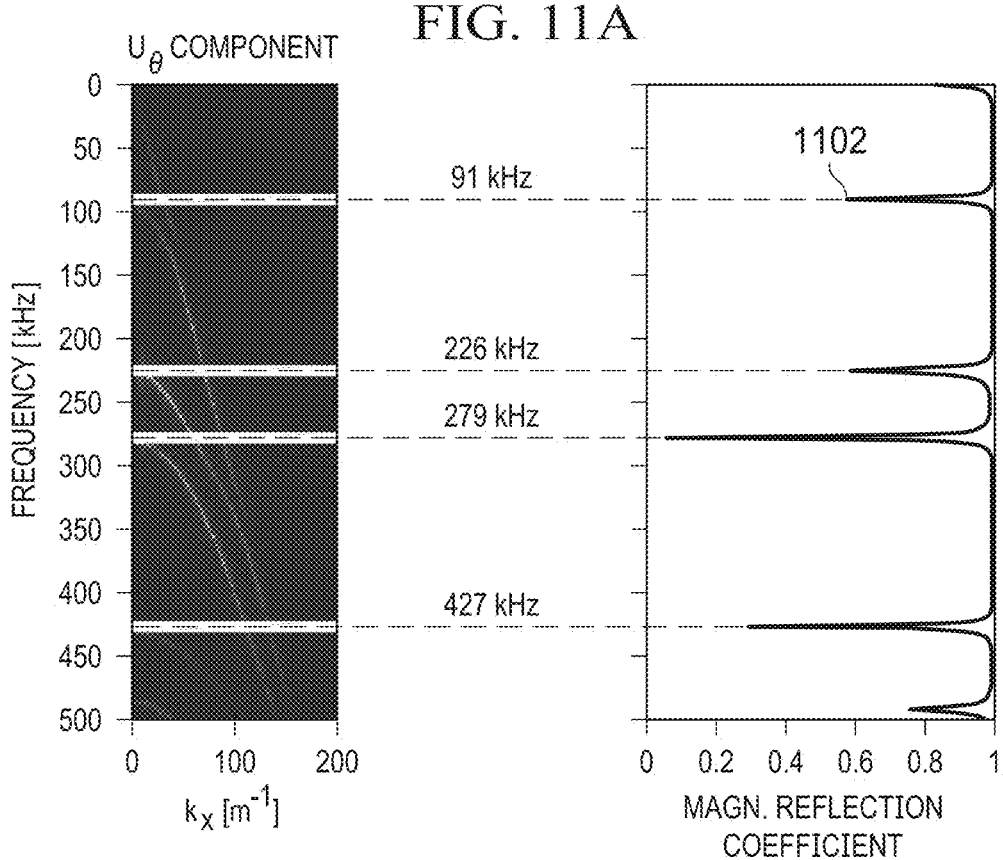
FIGS. 11A and 11B are wave number spectrum plots for torsional and longitudinal waves, respectively, for 6 mm thick scale.

FIG. 11A is a wave number spectrum for torsional waves for 6 mm thick scale and predicted cut-off frequencies from a simple layered medium model. FIG. 11A, right, shows the wavenumber-frequency spectrum from the layered medium model. FIG. 11A, left, shows the frequency transformed results from a 3D numerical model (such as a finite element model). The 3D model captures the relevant physics and in that sense it is similar to a measurement that could have been measured by the receiver 808. The model represents a torsional wave travelling through a 6.88 mm steel wall thickness with 6 mm of scale deposited circumferentially around the inside of the tubing. The peaks 1102 in the reflection coefficient correspond to the cutoff frequencies of the different wave modes. The resonance patterns (e.g., the peaks 1102) depend mainly on the scale shear wave velocity and the scale thickness. The scale mass density also affects the resonance pattern but this dependence is weak and is ignored by the scale and corrosion monitoring system 800.

A similar approach is followed for the longitudinal waves. For the longitudinal waves, the scale and corrosion monitoring system 800 only considers pure compressional and pure shear waves. The frequency dependent reflection curves for the compressional and shear waves are multiplied to obtain a single curve. For example, the reflection coefficients are obtained from a 1D layer model, taking into account all possible reflections in the layers stack. The reflections in the layers causes an interference pattern which is the reflectivity of the complete layer stack. In the 1D layer model only compressional or shear waves are used which ensures a pure wave mode response. The two curves are simply multiplied to obtain a signal figure. In this scenario, no mode conversion will occur at normal incidence.

Figure 11B:
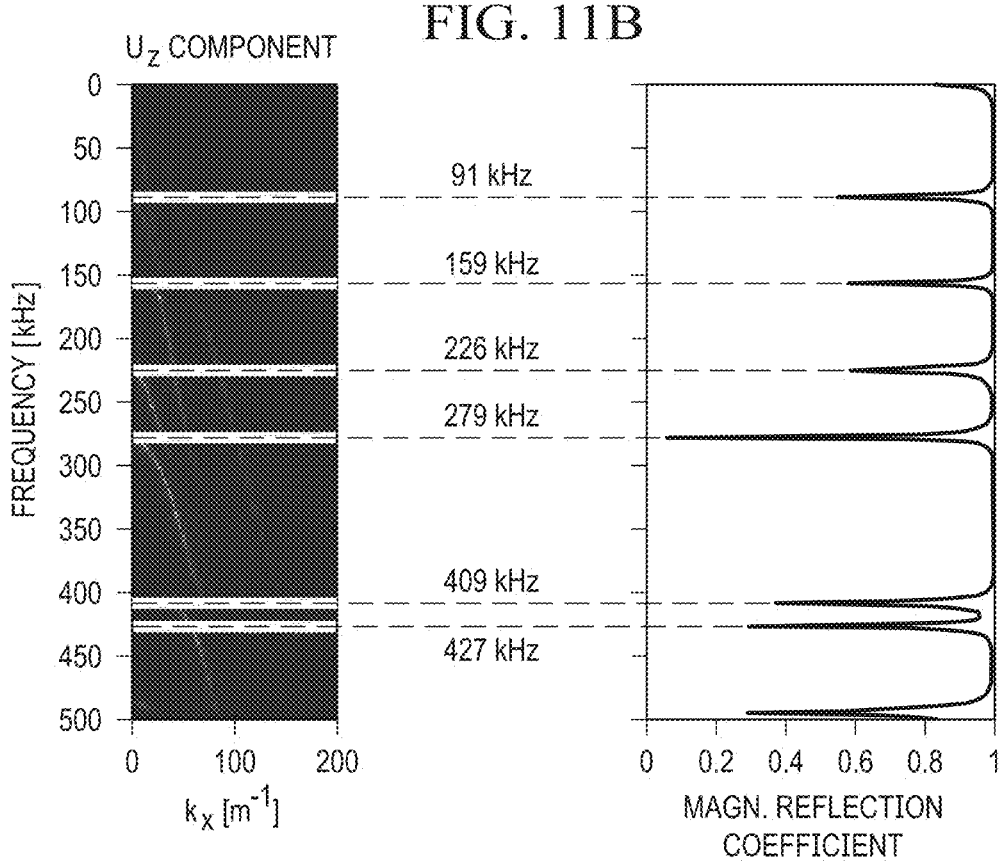

FIG. 11B is a wave number spectrum for longitudinal waves for 6 mm thick scale and predicted cut-off frequencies from a simple layered medium model. FIG. 11B shows the comparison between a modelled response (FIG. 11B, right) and 3D model. The result shows a good match between the modelled result and the measured results. The dispersion results depends on the scale thickness and the compressional and shear wave velocity of the scale. The scale and corrosion monitoring system 800 assume that the properties of the steel tubing are known (e.g., the mass density and elastic modulus).

The cut-off frequencies depend on scale thickness and scale properties. In this example, the scale and corrosion monitoring system 800 assumes that the steel properties of the tubing 802 are known and that there is no corrosion of the tubing 802. This means that for the average thickness only four parameters need to be estimated. The material parameters can be expressed in terms of a first set (i) of pressure wave velocity ($c_P$), shear wave velocity ($c_S$), and mass density ($\rho$) or in terms of a second set (ii) as Young's modulus (E), Poisson ratio (v), and mass density ($\rho$). The relation between the two sets (i) and (ii) is given by:

$$C_P = \sqrt{\frac{E(1-v)}{\rho(1+v)(1-2v)}} \text{ and} \quad (1)$$

$$C_S = \sqrt{\frac{E}{2\rho(1+v)}}. \quad (2)$$

Eq. (1) and (2) indicate that the pressure wave velocity and the shear wave velocity are not independent parameters, but are related. By comparing the objective functions for the two sets, we can evaluate whether either one has clear advantages. In some examples, the clear advantages include a better defined minimum of the objective function (for example, a circular shape and/or not very elongated in one direction).

Figure 12A:
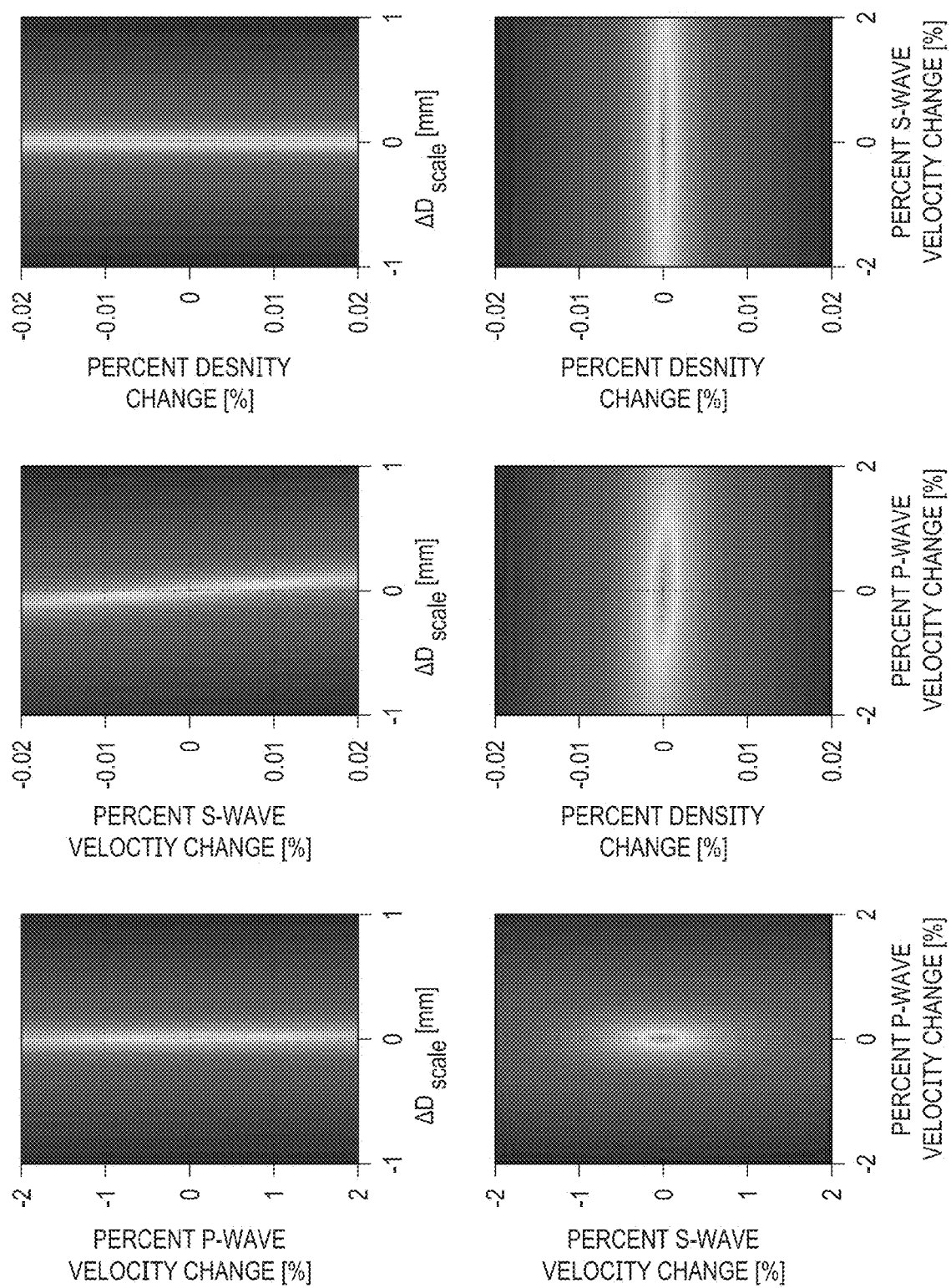

FIGS. 12A and 12B are plots of cross-sections through the objective functions. FIG. 12A shows the cross-section expressed in terms of scale thickness, pressure and shear wave velocity and density. FIG. 12B shows the cross-section expressed in terms of scale thickness, Young's modulus, Poisson ratio and mass density. In both cases, an elongated valley is observed in the relation between scale thickness and velocity/Young's modulus. For example, an elongated valley is shown in FIG. 12A, top row of plots. An ideal case is shown in the examples of FIG. 12B, bottom row left and right plot. When this valley is perfectly vertical (e.g., vertical with respect to the figure on the page), this means that the correct scale thickness will be found independent of the vertical parameter.

A slanted valley indicates that the influence of both parameters are interchangeable. For example, a slanted valley is shown in the examples of FIG. 12A, top middle plot and in the example of FIG. 12B, top left plot. In this example, both parameters represent thickness and velocity and together determine the total phase rotation. A slanted valley may lead to scale sizing errors because the response is sensitive to the product of thickness and velocity. For example, if the monitoring system only knows the travel time, then any combination of thickness and velocity can be used to obtain that same travel time. This situation happens in both parameter sets.

One approach to constrain the inversion problem is to use accurate information on the wave velocities in the scale. From the cross-sections through the objective function shown in FIGS. 12A and 12B there appears no clear preference between the two parameter sets. For example, there appears to be no clear preference because all combinations of parameters give a clearly defined minimum (for example, no elongated shapes). Because the pressure wave and shear wave velocities can be measured ultrasonically, we select these parameters. In general, the pressure and shear waves are measured using a different transducer than the transducers used for the longitudinal and torsional waves, but in some cases, the same transducers are used. The mode cut-off frequencies are determined from the spectrograms for a number of circumferential positions. The mode cut-off frequency spectra for uniform and 25% smooth scale thickness are shown in FIGS. 13A-13D.

FIGS. 13A-13D are plots of mode cut-off frequency spectra for 3 mm scale thickness as function of the circumferential position. FIG. 13A is the torsional mode frequency spectra for uniform scale thickness, FIG. 13B is the longitudinal mode frequency spectra for uniform scale thickness, FIG. 13C is the torsional mode frequency spectra for a 25% smooth scale thickness variation, and FIG. 13D is the longitudinal mode frequency spectra for a 25% smooth scale thickness variation. The inversion is initiated with an initial scale thickness estimate obtained from the data itself. In some examples, the initial scale thickness estimate is the value previously used by the monitoring system. In other examples, the monitoring system sets no scale (for example, a zero initial thickness) at the start when a new tubing is used with the monitoring system. The fundamental torsional mode cut-off frequency corresponding to the initial scale thickness estimate is shown as white marker in the displays.

The scale and corrosion monitoring system 800 obtains an initial scale thickness estimate when the first cut-off frequency peak is clearly visible. For example, the peaks in FIG. 11A are identified automatically via software because the peaks are well defined. When the scale becomes thicker, this peak shift to lower frequencies. This may cause problems when the low frequency content of the signal is weak.

FIGS. 14A and 14B are plots of scale thickness sizing around the circumference of a tubing. FIG. 14A is a plot for uniform scale thickness and FIG. 14B is a plot for 25% smooth scale thickness variation. The scale thickness sizing results are shown for the simulation cases of uniform thickness and 25% smooth variation. The scale thickness is calculated at 16 different positions around the circumference, these are shown as different colors in the bar plot.

Due to gridding effects in the numerical simulations, a 0.2 mm thickness deviation may occur. In this example, the numerical simulation is performed using a finite difference technique on a discrete grid and a layer that is described by a number of grid points. For the uniform scale thickness case, the sizing accuracy is 0.5 mm for most cases. Only for the 6 mm scale thickness case the error is slightly larger.

For the smooth varying scale thickness cases, the trend around the circumference is captured, again with a tendency to underestimate the scale thickness for larger scale thickness. The same is observed for the rough scale cases. The results demonstrate that the scale and corrosion monitoring system 800 is capable of determining the scale thickness from the mode cut-off frequency. In this case, the torsional wave results and the longitudinal wave results come together to provide a unique pattern of cut-out frequencies like a bar-code.

The above discussion focused on the use of the cut-off frequencies of modes, because the frequency is directly related to the scale layer thickness. In some scale and corrosion monitoring systems 800, the first arrival times of the received signal are also used in addition to, or in replacement of, the cut-off frequencies. First arrival times are useful in examples with rough scale because the scattering of the waves causes the horizontal events in the spectrogram to be less apparent. An example approach for determining model results for torsional waves (FIGS. 15-20) and longitudinal waves (FIGS. 21-24) propagating through a steel tubing with wall thickness of 7 mm and a scale thickness 6 mm is described in detail in the following paragraphs. The results are based on the first arrival times for longitudinal and torsional waves.

FIG. 15 is a schematic of a two-layer system used for solving for torsional waves. The wave propagation is solved analytically. This leads to a set of equations that is solved numerically. Dispersion relations are obtained from the analytical solution. Some scale and corrosion monitoring systems pre-determine the dispersion relation and store the dispersion relations in a database for retrieval when needed. This is because, in some examples, computing the dispersion curves requires a large computational effort. In some examples, the database includes a range of pre-determined dispersion curves based on a range of scale thickness, wall thickness, and/or scale shear wave velocity.

For each dispersion curve, the first arrival times for both wave modes are calculated using the group velocity. In some cases, the first arrival times for longitudinal and torsional waves are pre-determined and stored in the database. The objective function consists for the absolute difference (L1-norm) between measured and calculated arrival times. The overall minimum as function of shear wave velocity is determined first. Once the scale shear wave velocity has been found, the local scale and wall thickness are determined.

Figure 17:
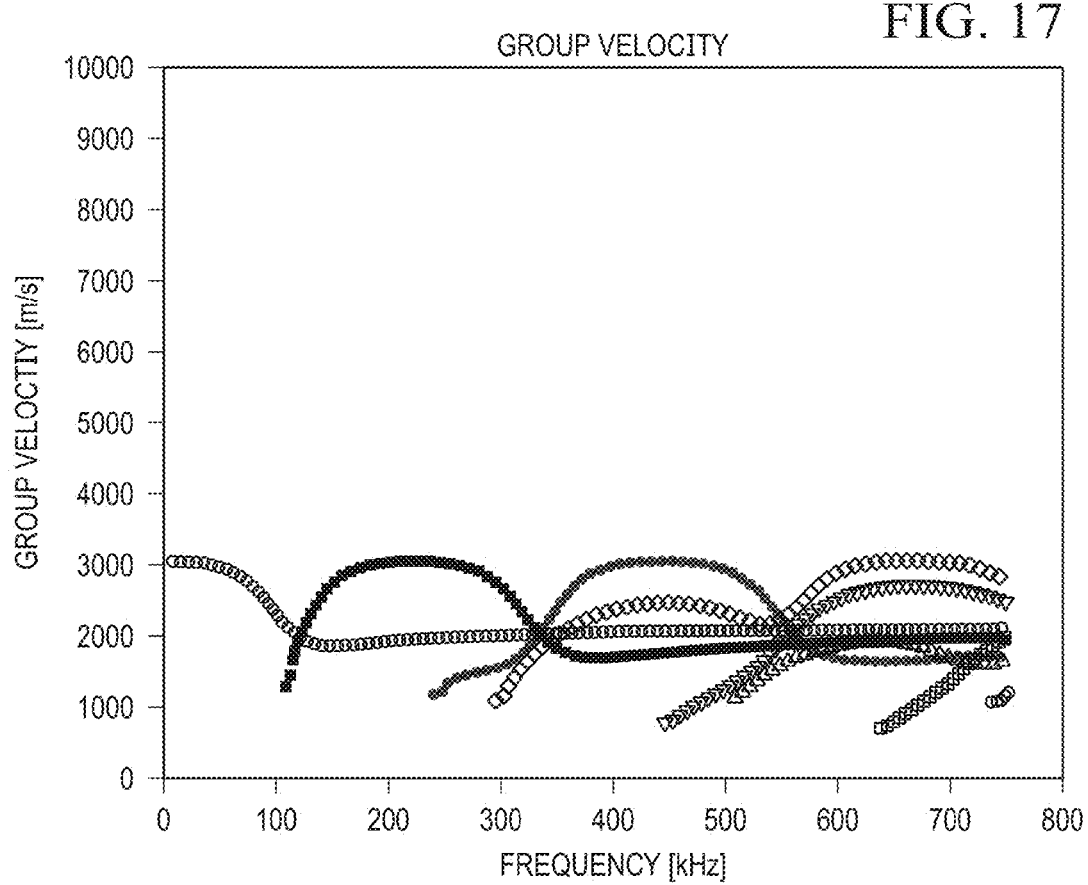
FIG. 17 is a plot of group velocity dispersion curves for a steel tubing with a 7 mm wall thickness and with the scale thickness of 6 mm.

The layers of the two-layer system are described by the shear modulus ($\mu$) and density ($\rho$). The first arrival time as function of frequency is extracted from the spectrograms. For example, the first arrival time is determined automatically by thresholding and peak detection in the spectrogram. In some examples, the first arrival time corresponds to the lowest mode number since the fundamental longitudinal and torsional modes have the highest velocities at low frequencies. In some examples, the fast travelling part of the fundamental wave mode is outside the frequency band of interest such as when the scale is really thick. Such an example is shown in FIG. 17 and further described below. To solve the wave propagation problem, the tubing is approximated by a planar structure because the curvature is much larger than the wavelength. Torsional waves are called shear horizontal waves in a planar structure. The wave equation in the time domain for this case reads:

$$\rho \frac{\partial^2 u_y}{\partial t^2} = \mu \left\{ \frac{\partial^2 u_y}{\partial x^2} + \frac{\partial^2 u_y}{\partial z^2} \right\}, \tag{3}$$

where $u_y$ is the displacement perpendicular to the plane of wave propagation (x, z), $\rho$ is the density and $\mu$ is the shear modulus. For one layer, we use the following test solution $$u_y(x,z,t) = U_y e^{ik(x+\alpha z - ct)}, \tag{4}$$

where $\alpha$ is ratio between horizontal and vertical wavenumbers can c is the phase velocity along the horizontal direction. Substitution of Eq. (4) into Eq. (2) and solving for $\alpha$ yields:

$$\alpha = \pm \sqrt{\frac{\rho c^2 - \mu}{\mu}}. \tag{5}$$

The sign determines the propagation direction vertically. For a two-layer system, the solution can be described by a weighted summation of the partial wave field for each layer. Boundary conditions at both outer surfaces and continuity conditions at the interface give the final solution. The trial solution for the displacement and shear stress for the complete stack of layers is given by:

$$u_y^n = \Sigma_{m=1}^2 B_m^n e^{ik(x + \alpha_m^n z - ct)} \tag{6}$$

and $$\sigma_{yz}^n = \Sigma_{m=1}^2 ik\alpha_m^n \mu^n B_m^n e^{ik(x + \alpha_m^n z - ct)}. \tag{7}$$

The upper index (n) indicates the layer number and the lower index (m) indicates the up or down going wave. In this case, the "up or down" going wave corresponds to the thickness direction. For example, the vertical direction of FIG. 15 corresponds to the "up or down" going direction and the horizontal direction of FIG. 15 corresponds to the direction that the guided waves travel. The following boundary conditions are applied:

$$\begin{cases} \sigma_{yz}^1 = 0 & \text{at } z = 0 \\ u_y^1 = u_y^2 & \text{at } z = h_1 \\ \sigma_{yz}^1 = \sigma_{yz}^2 & \text{at } z = h_1 \\ \sigma_{yz}^2 = 0 & \text{at } z = h_1 + h_2 \end{cases} \tag{8}$$

Substitution of Eqs. (6) and (7) into Eq. (8) yields a system of four equations with four unknowns:

$$\begin{pmatrix} \alpha_1^1 \mu^1 & \alpha_2^1 \mu^1 & 0 & 0 \\ e^{ik\alpha_1^1 h_1} & e^{ik\alpha_2^1 h_1} & -e^{ik\alpha_1^2 h_1} & -e^{ik\alpha_2^2 h_1} \\ \alpha_1^1 \mu^1 e^{ik\alpha_1^1 h_1} & \alpha_2^1 \mu^1 e^{ik\alpha_2^1 h_1} & -\alpha_1^2 \mu^2 e^{ik\alpha_1^2 h_1} & -\alpha_2^2 \mu^2 e^{ik\alpha_2^2 h_1} \\ 0 & 0 & \alpha_1^2 \mu^2 e^{ik\alpha_1^2(h_1+h_2)} & \alpha_2^2 \mu^2 e^{ik\alpha_2^2(h_1+h_2)} \end{pmatrix} \begin{pmatrix} B_1^1 \\ B_2^1 \\ B_1^2 \\ B_2^2 \end{pmatrix} = \begin{pmatrix} 0 \\ 0 \\ 0 \\ 0 \end{pmatrix}. \tag{9}$$

FIG. 16 is a plot of example dispersion curves for a 7 mm thick steel wall and a 6 mm thick scale layer. The mode cut-off frequencies from the dispersion curves are compared to the frequencies calculated using the simple two-layer approach (for example, as shown in FIGS. 11A and 11B). The cut-off frequencies extracted from the dispersion curves are listed in Table 1 together with the frequencies calculated using a 1D layer model. The result from the dispersion curves are obtained by solving Eq. (9).

TABLE 1

Comparison between cut-off frequencies from dispersion curves and the 1D layer model.

| Mode order | Cut-off freq. [kHz] (1D layer model) | Cut-off freq. [kHz] (dispersion curves) |
|---|---|---|
| 1 | 91 | 90 |
| 2 | 226 | 221 |
| 3 | 279 | 278 |
| 4 | 427 | 417 |

The scale and corrosion monitoring system 800 uses the first arrival time of longitudinal and torsional waves for scale thickness sizing. Apart from the cut-off frequency of modes, the first arrival time is also affected by a layer of scale.

To compute the first arrival time, the mode group velocity is first calculated. The mode group velocity ($c_{gr}$) is computed from the phase velocity ($c_{ph}$) by the following equation:

$$c_{gr} = \frac{c_{ph}^2}{c_{ph} - f\frac{\partial c_{ph}}{f \partial f}}, \tag{10}$$

where $f$ is the frequency. In other words, Eq. (9) gives the phase velocity as function of frequency per wave mode, then the group velocity is calculated using Eq. (10).

Figure 18:
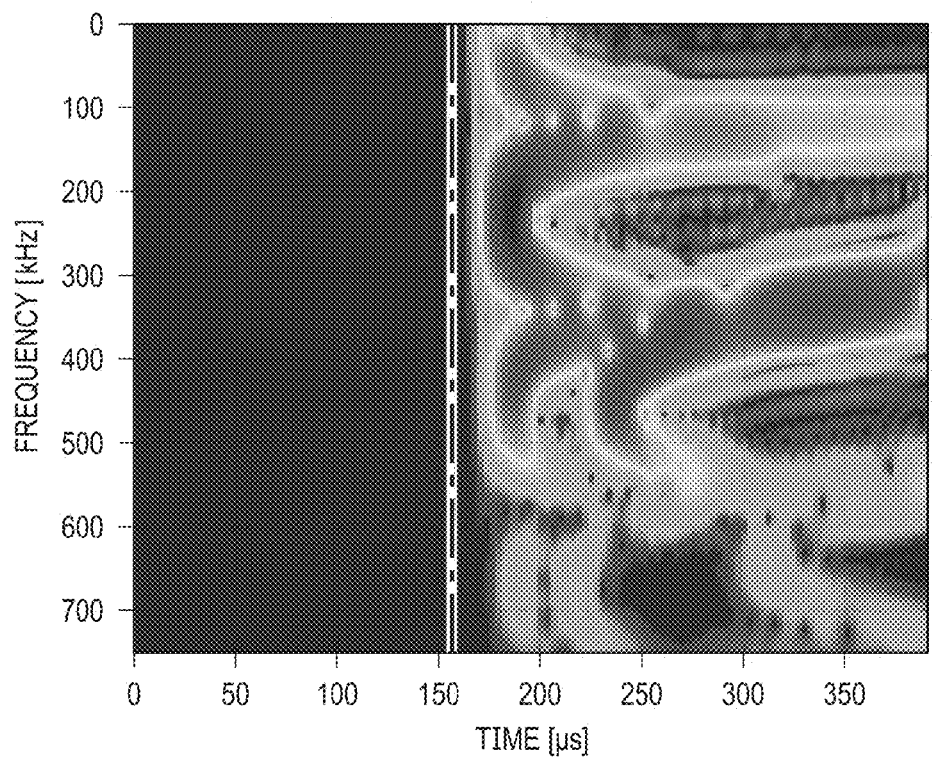
FIG. 18 is a spectrogram plot for torsional waves for a scale thickness of 6 mm.
Figure 19:
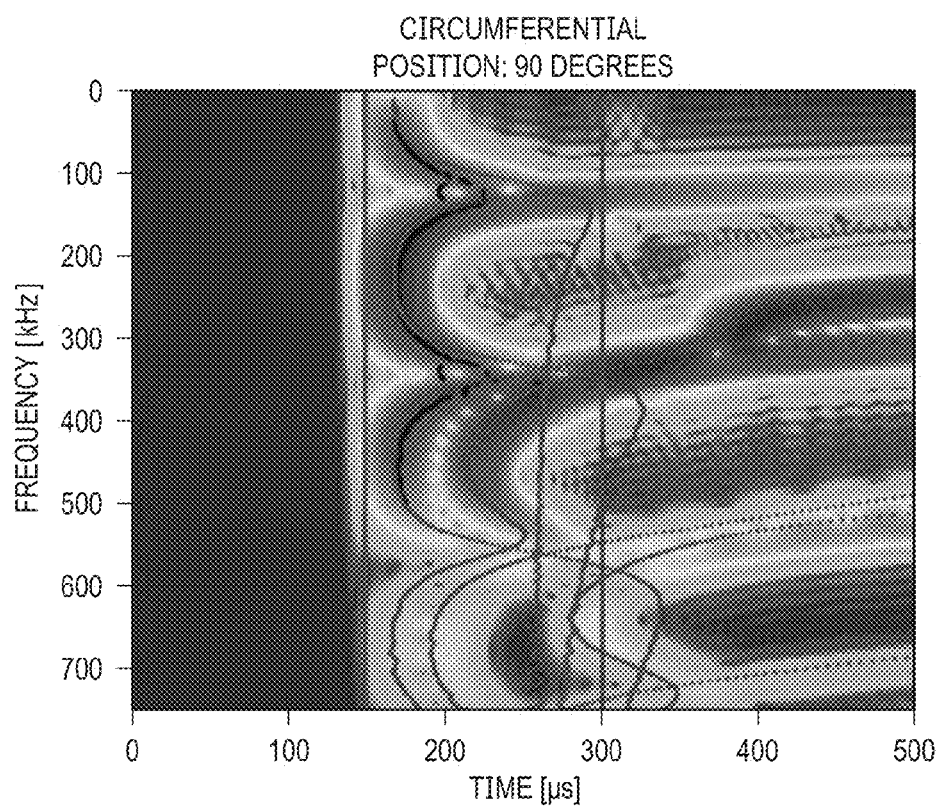
FIG. 19 is a spectrogram plot for torsional waves for a scale thickness of 6 mm with superimposed arrival time information.

FIG. 17 is a plot of group velocity dispersion curves for a steel wall (7 mm) and with the scale thickness of 6 mm. Near the cut-off frequency, the phase velocity goes to infinity and the group velocity goes to zero. At the cut-off frequency, the wave is a perfect standing wave in the thickness direction, all points at the surface move in phase, i.e., zero time difference. Therefore the phase velocity appears to be infinite. The wave does not travel spatially, because it is a standing wave. Therefore the group velocity goes to zero FIG. 18 is a spectrogram plot for torsional waves for the scale thickness of 6 mm. FIG. 19 is a spectrogram plot for torsional waves for the scale thickness of 6 mm with superimposed arrival time information. The first arrival time as function of frequency is determined by the time-frequency analysis as shown in FIG. 19. For example, the first arrival time is determined from FIG. 19 where the green curve is the theoretically calculated curve using Eqns. (9) and (10). These picked times are shown with the black markers. In other words, the system determines the first peak in the spectrogram and uses this as a measure of the first arrival time per frequency. In other words, the picked arrival time is shown in FIG. 19 using black markers, the computed group velocity curve is used to calculate the arrival time of each mode (green markers). The black markers are the picked arrival time in a search window indicated the red lines. The green markers are the computed arrival times from the group velocity dispersion curve.

To determine the scale thickness, dispersion curves are computed in a scale thickness range of 0 to 25 mm. The summed squared difference between the measured arrival time and the computed arrival times for each scale thickness value. In other words, the computed arrival times are from the analytical model. This yields an objective function. The minimum value of the objective function corresponds to the measured scale thickness. This is illustrated in FIGS. 20A and 20B.

Figure 20A:
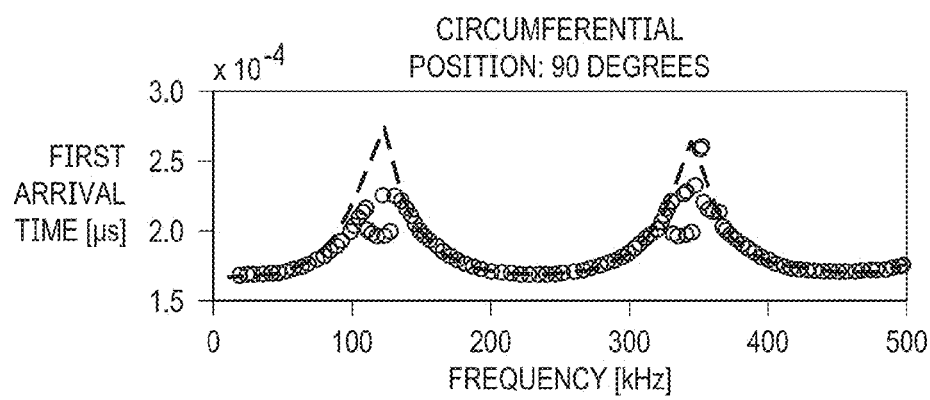
FIGS. 20A and 20B are plots of scale sizing using first arrival times.
Figure 20B:
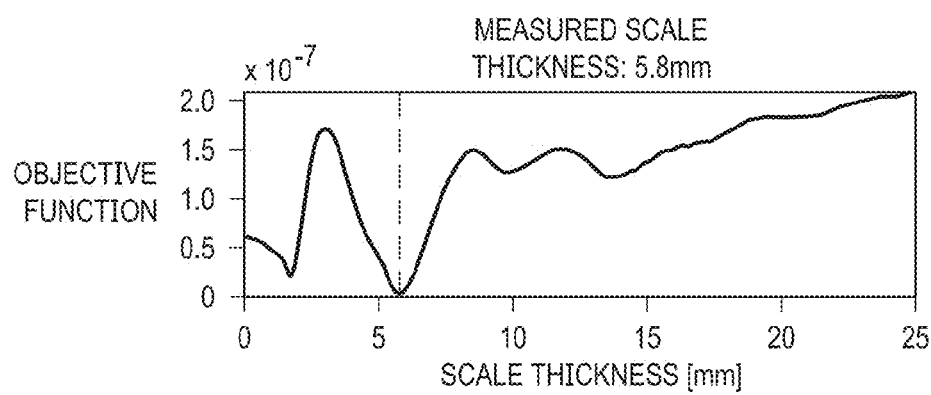

FIGS. 20A and 20B are plots of scale sizing using the first arrival time. An objective function is constructed using the sum of the squared differences between the picked arrival time and the computed arrival time using the group velocity curves. The minimum value of the objective function yields the scale thickness. FIG. 20A is the picked arrival time in markers and the computed arrival time in a solid line. In this case the solid line is for a scale thickness of 5.8 mm. These differences are squared and summed to give one point on the objective function shown below. The objective function has a global minimum at 5.8 mm, although there are more local minima.

Importantly, the combination of longitudinal waves and torsional waves is used to estimate the tubing thickness since this is generally not possible to estimate the tubing thickness using only torsional waves.

FIG. 21 is a schematic of a two-layer system used for solving for longitudinal waves. The approach is similar the approach described above for torsional waves. The material is characterized by its density and Lame constants. An analytical solution is used to solve for the dispersion relations for the layered system shown in FIG. 21. The solution is formulated in terms of a compressional and shear wave potential:

$$\varphi^n(x,z,t) = C_1^n e^{ik_L^n(x \sin\theta_L^n + z \cos\theta_L^n)} + C_2^n e^{ik_L^n(x \sin\theta_L^n - z \cos\theta_L^n)}, \text{ and} \tag{11}$$

$$\psi^n(x,z,t) = C_3^n e^{ik_T^n(x \sin\theta_T^n + z \cos\theta_T^n)} + C_4^n e^{ik_T^n(x \sin\theta_T^n - z \cos\theta_T^n)} \tag{12}$$

where $k_L^n$ and $k_T^n$ are the wave numbers for each layer. The propagation angle in each layer is denoted by $\theta$. The wave potentials can be related to the horizontal and vertical component of the displacement:

$$u_x^n = \frac{\partial \varphi^n}{\partial x} - \frac{\partial \psi^n}{\partial z} \text{ and} \tag{13}$$

$$u_z^n = \frac{\partial \varphi^n}{\partial z} + \frac{\partial \psi^n}{\partial x}. \tag{14}$$

To construct the solution, the vertical and shear stress need to be calculated:

$$\sigma_{zz}^n = (\lambda + 2\mu)\frac{\partial u_z^n}{\partial z} + \lambda\frac{\partial u_x^n}{\partial x} \text{ and} \tag{15}$$

$$\sigma_{xz}^n = \mu\left(\frac{\partial u_x^n}{\partial z} + \frac{\partial u_z^n}{\partial x}\right). \tag{16}$$

Substitution of general solution (Eqs. (11) and (12)) into Eqs. (13)-(16) provide general expressions for the solution. Boundary conditions at the outer surfaces and continuity conditions at the interfaces are also used. At the outer surfaces, free boundary conditions are applied, meaning that the normal and shear component of the stress vanishes:

$$\begin{cases} \sigma_{xz}^1 = 0 & \text{at } z = 0 \\ \sigma_{zz}^1 = 0 & \text{at } z = 0 \\ \sigma_{xz}^2 = 0 & \text{at } z = h_1 + h_2 \\ \sigma_{zz}^2 = 0 & \text{at } z = h_1 + h_2 \end{cases}. \tag{17}$$

The continuity conditions require the horizontal and vertical component of the particle displacement to be continuous over the interface:

$$\begin{cases} u_x^1 = u_x^2 & \text{at } z = h_1 \\ u_z^1 = u_z^2 & \text{at } z = h_1 \end{cases}, \quad (18)$$

and the vertical and shear stress to be continuous over the interface:

$$\begin{cases} \sigma_{xz}^1 = \sigma_{xz}^2 & \text{at } z = h_1 \\ \sigma_{zz}^1 = \sigma_{zz}^2 & \text{at } z = h_1 \end{cases}. \quad (19)$$

This leads to a set of independent equations with no trivial solutions by setting the determinant of the problem to zero. Generally, is solved numerically. In this way, the scale and corrosion monitoring system 800 computes the dispersion curves for the longitudinal waves.

Figure 23:
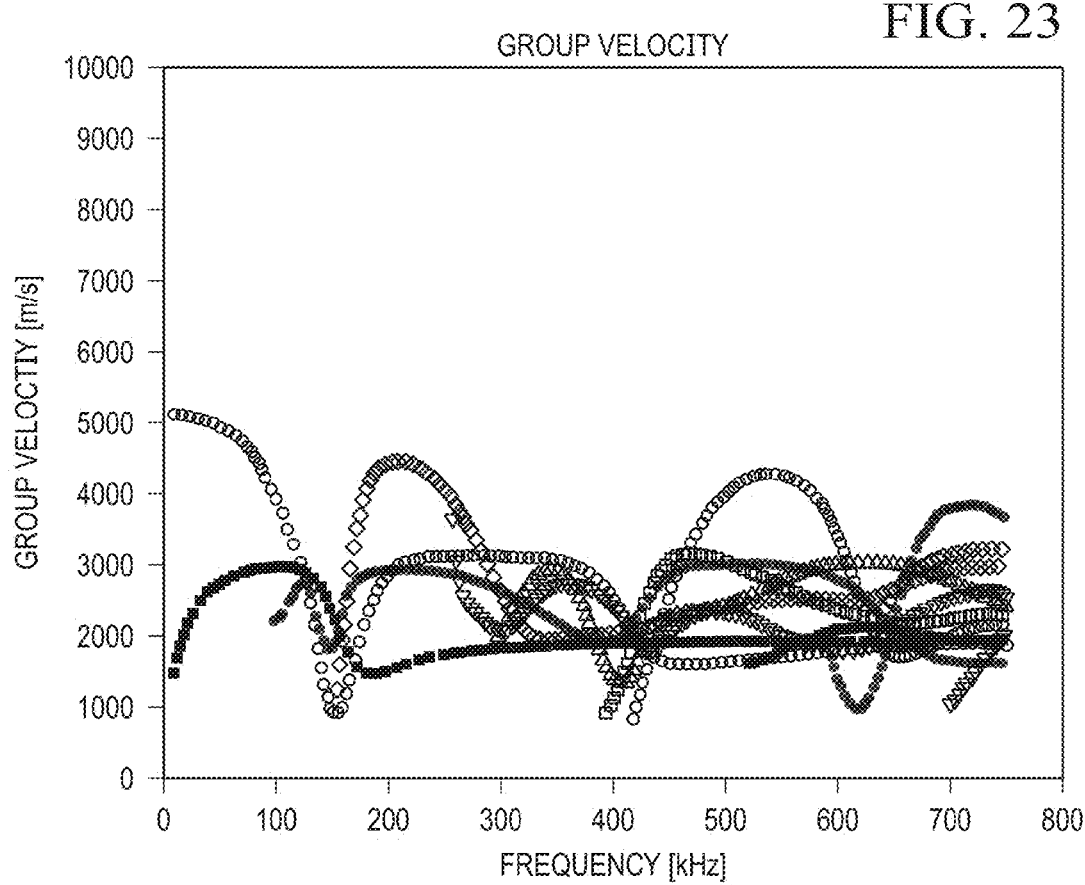
FIG. 23 is a plot of group velocity dispersion curves for a steel tubing with a 7 mm wall thickness with a scale thickness of 6 mm.

FIG. 22 is a plot of phase velocity dispersion curves for a steel wall (7 mm) with a scale thickness of 6 mm. The phase velocity is translated into group velocity using Eq. (10). The result is shown in FIG. 23. The highest group velocity as function of frequency will determine the first arriving wave mode. In other words, the arrival time is determined by the fastest wave per frequency. So for each frequency, the fastest wave-mode is used. At higher frequencies many modes may exist and only the highest value is used. The highest group velocity varies with scale thickness.

Figure 24:
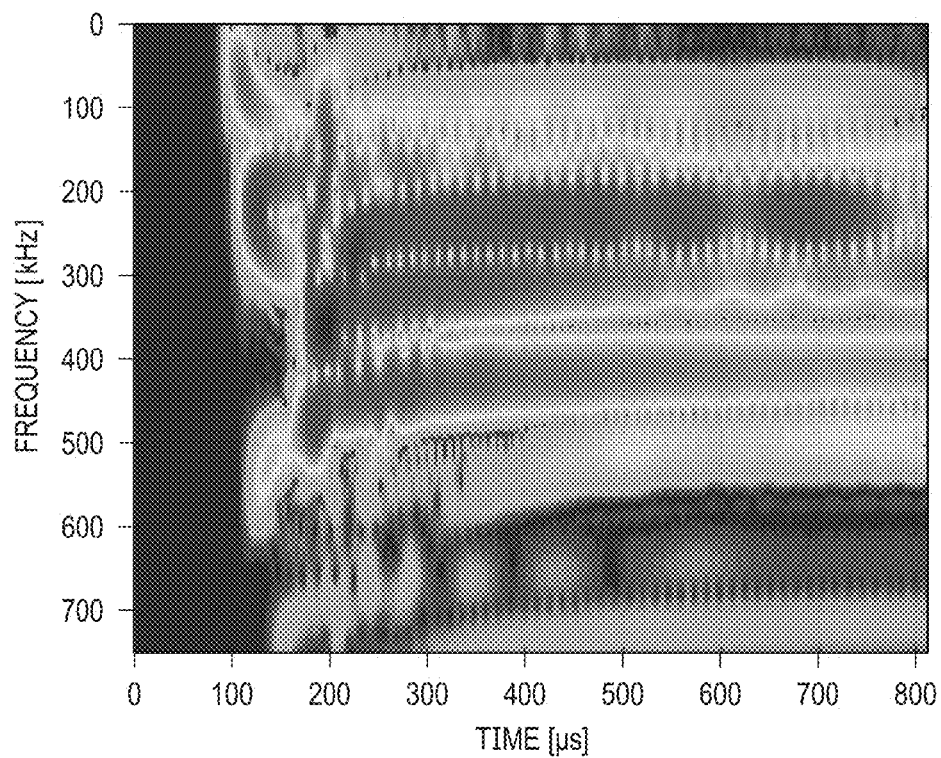
FIG. 24 is a spectrogram plot for longitudinal waves for with a scale thickness of 6 mm.

FIG. 23 is a plot of group velocity dispersion curves for a steel wall (7 mm) with a scale thickness of 6 mm. As validation, the spectrograms for the same cases are shown in FIG. 24. For example, the spectrogram is computed using measurements and the first arrival times are picked for each frequency from the spectrogram. An arrival time is calculated and compared to the measured arrival time to find which combination of scale and wall thickness matches the measured times based on the calculated group velocity and the distance between transmitter and receiver. Comparing both results shows good agreement and indicates that the calculation of dispersion curves is implemented correctly. For example, it is possible for the results to lack agreement in cases where there is an implementation error.

FIG. 24 is a spectrogram plot for longitudinal waves for with a scale thickness of 6 mm.

As described above, the scale and corrosion monitoring system 800 picks the first arrival times of both longitudinal and torsional wave modes within a frequency range from 100 kHz to 500 kHz. The measured arrival times are compared to an analytical model of dispersion results for a range of scale/tubing wall thicknesses An example approach for combining the model results for torsional waves and longitudinal waves propagating through a steel tubing with wall thickness of 7 mm and a scale thickness 6 mm is described below.

In general, dispersion curves are computed in a range of 0 to 25 mm scale, the best least squares fit gives the average scale thickness of a specific circumferential position (00 in this case). In this case an average scale thickness of 5.8 mm is found. The procedure is repeated for all receivers around the circumference. In this way, a separate result is produced for each longitudinal and torsional wave receiver pair around the circumference.

Figure 25A:
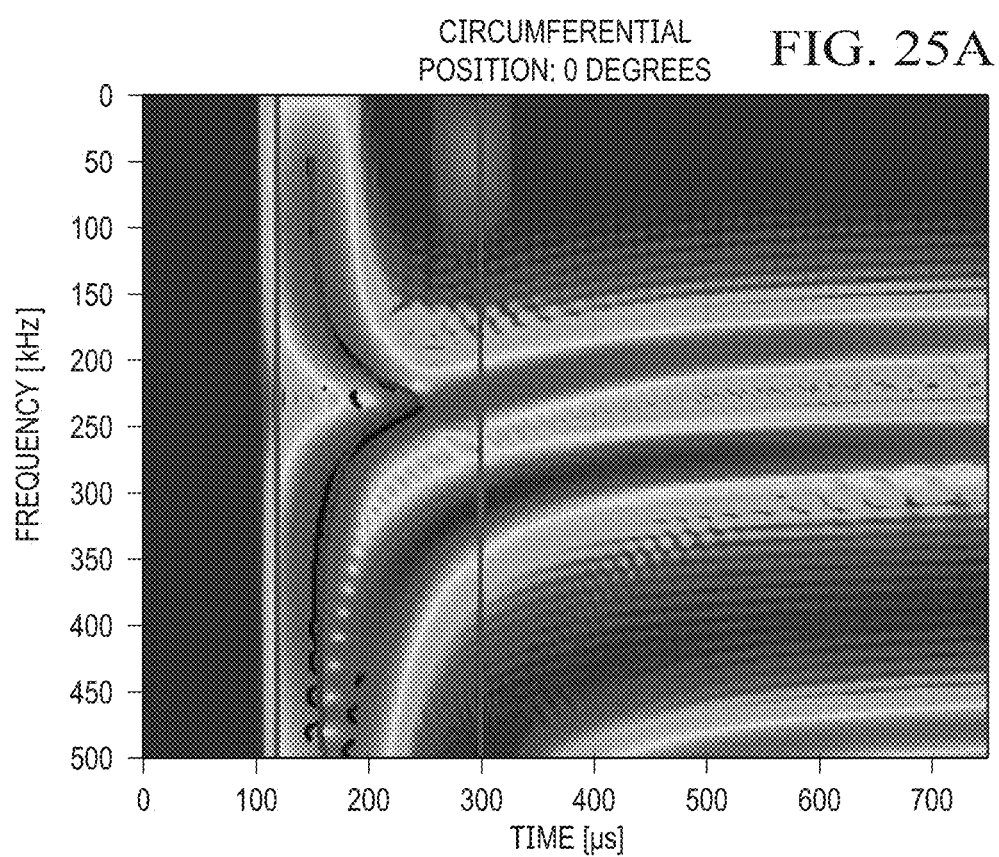
FIGS. 25A and 25B are spectrogram plots of first arrival time picking illustration of torsional waves and longitudinal waves, respectively.
Figure 25B:
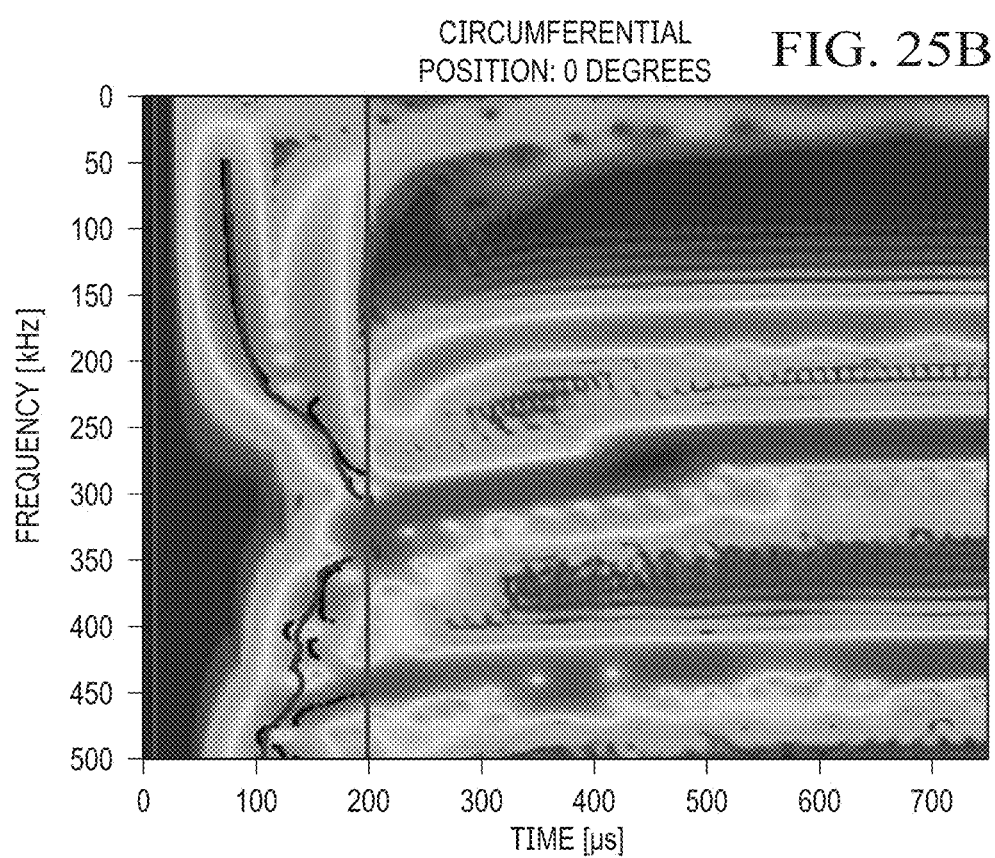

FIG. 25A is a spectrogram plot of first arrival time picking illustration of torsional waves and FIG. 25B is a spectrogram plot of first arrival time picking illustration of longitudinal waves. The red and blue curves represent the search window where the system searches for the first arrival time picks in the spectrogram.

FIG. 26A is a plot of measuring both scale thickness and tubing wall loss using picked arrival times (shown as small black dots which appear as a solid black line) and calculated first arrival time (solid line). The contour in green and red show the width of the global minimum for torsional waves and longitudinal waves separately. For example, in FIG. 26B there are more local minima. In this example, a local minima exists at a wall thickness of about 8 mm and a scale thickness of about 9 mm as well as at a wall thickness of about 8 mm and a scale thickness of about 15 mm. When the system uses an iterative scheme that searches for a minimum it is possible that one of these local minima are found instead of the deepest "global" minimum. Based on simulations it was found that torsional waves are more sensitive to scale thickness and longitudinal waves are more sensitive to tubing thickness variations. This is shown by the two contours in the 2D objective function, the green contour (torsional waves) is narrow in the scale thickness direction but long in the tubing wall thickness direction. The red contour (longitudinal waves) is much more narrow in the tubing wall direction, i.e., better resolution for measuring tubing wall loss.

The objective function is given by:

$$O(d_w, d_s, C_{s,scale}) = \Sigma_f |T_p^L - T_c^L| + |T_p^T - T_c^T|,$$

where $T_p^L$ and $T_p^T$ are the first arrival time picks of the Longitudinal waves and Torsional waves. The calculate times are indicated by subscript 'c'. The absolute difference (L1-norm) is calculate and summed over all frequency components. This norm is more robust against outliers than using the sum of the squared differences, as is normally done in a least squares minimization problem, this is called the L2-norm. The objective function depends on 3 variables, scale thickness, wall thickness and shear wave velocity. The minimum value of the objective function is the solution, with corresponding, scale thickness, wall thickness and shear wave velocity. An example is shown in FIG. 26B, the 2D-crossection at the found shear wave velocity is shown. The calculation is repeated for every receiver around the circumference. A cross-sectional view is provided showing the scale and wall thickness around the circumference FIG. 26B is a plot of an objective function with found global minimum ('x'). FIGS. 26A and 26B are results from numerical simulations.

FIG. 27A is an example spectrogram plot for a 6.5 mm wall thickness tubing and a 6.6 mm scale thickness. FIG. 27B is an example objective function for the inversion process shown in FIG. 27A. FIGS. 27A and 27B are substantially similar to FIGS. 26A and 26B, respectively, but use measured data from the artificial scale test instead of numerical simulation. In FIGS. 27A and 27B, the wall thickness is substantially the same but the scale thickness is different. The different thickness changes the arrival time pattern as a function of frequency. The results shown in FIGS. 27A and 27B represent real-life physical results. There are two curves for the same wave mode shown with the same color in FIG. 27A, one is from the time picking the other one is calculated for the found solution in terms of scale thickness, wall thickness and shear wave velocity.

The scale and corrosion monitoring system 800 is used to determine the scale thickness and the wall thickness using the first arrival times of both longitudinal and torsional waves as function of frequency. Example results of the scale and corrosion monitoring system 800 are described below.

Figure 28A:
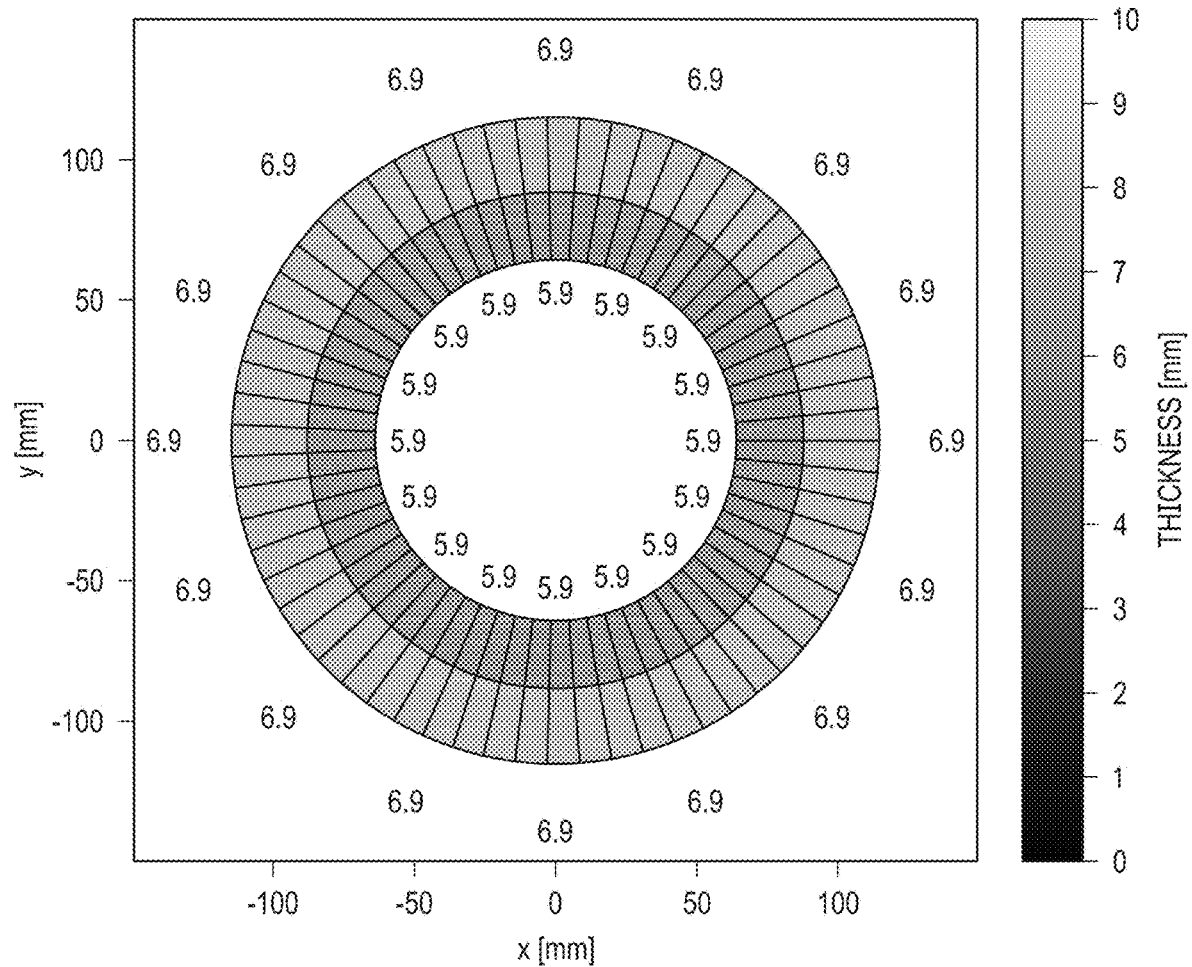
FIG. 28A is a plot of scale inversion results for a 6 mm scale thickness and FIG. 28B is a plot of scale inversion results for a model with a 6 mm scale thickness.
Figure 28B:
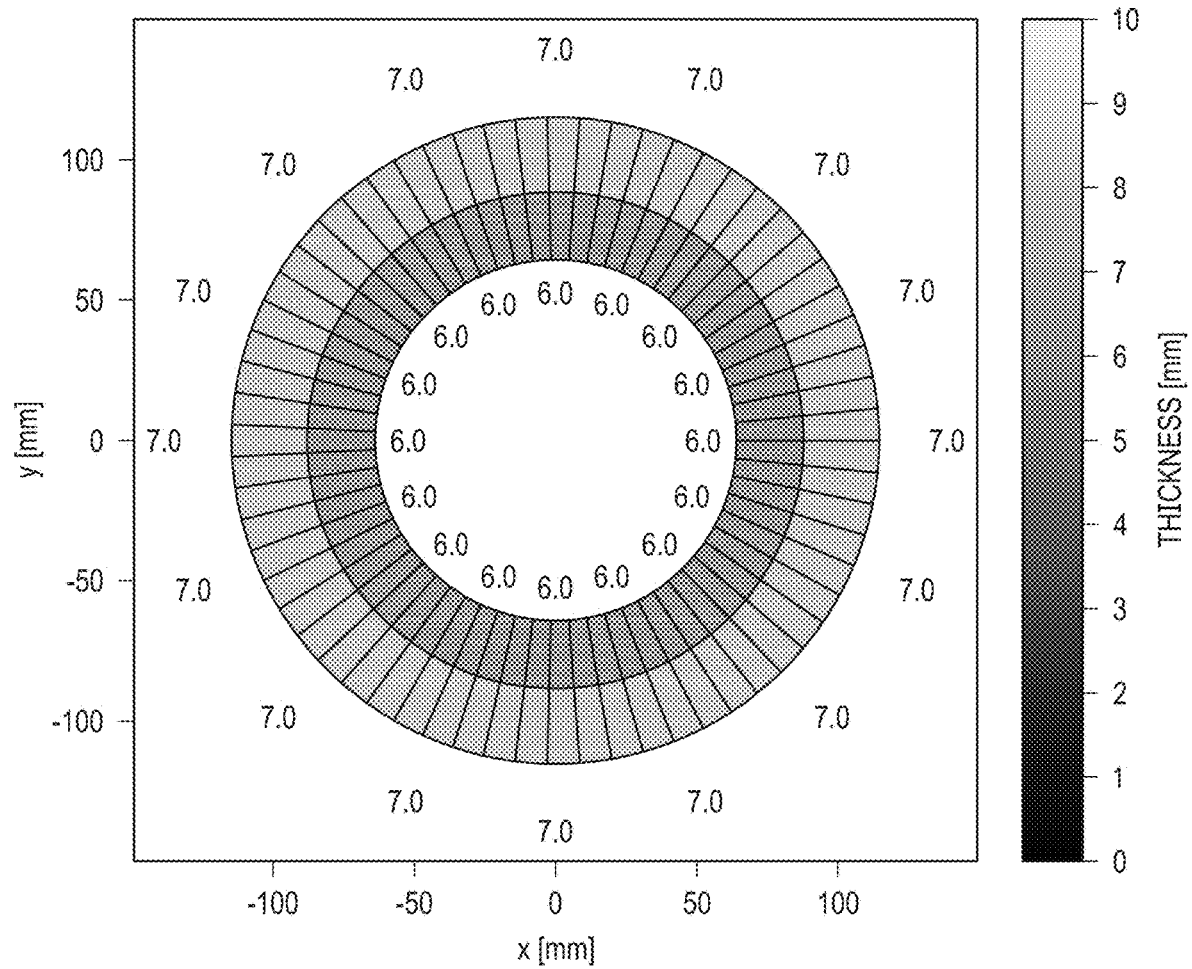

FIG. 28A is a plot of scale inversion results for a 6 mm scale thickness and FIG. 28B is a plot of scale inversion results for a model with a 6 mm scale thickness. The scale thickness is uniform around the circumference of the tubing. Three Simulations with uniform scale thickness varying between 0 and 6 mm have been performed for both longitudinal and torsional waves. The simulations are from a 3D finite difference scheme and the dispersion curves are calculated from the analytical solution. The first arrival times in the spectrogram have been picked. An inversion has been performed and the output of the inversion process is shown in FIG. 28A. FIG. 28A shows the inversion result from the receiver and FIG. 28B shows the exact result from the model. Values along the outside circumference represent the wall thickness and values along the inside circumference represent the scale thickness. Overall the inversion performs very well (e.g., within 0.1 mm of exact) and accuracy increases as scale thickness increases.

Table 2 is a result of a comparison between simulation input and estimated values. For zero scale thickness, there is a relatively large error (0.8 mm). This is caused by the fact that for zero scale thickness, the first arrival of the torsional wave is nondispersive. Generally, the torsional wave is not sensitive to thickness variations in the tubing wall. In this case, the system needs the longitudinal wave to determine thickness. If there is no scale, the torsional wave does not provide information. The first arrival time for a torsional wave does not carry any information about scale thickness. In this approach, the system takes the first arrival of a higher order mode with a cut-off frequency around 300 kHz. In some cases, a minimal measureable scale thickness is set to avoid generating incorrect results. In some examples, the minimal measurable scale thickness is set to 3 mm.

TABLE 2

Scale and wall thickness inversion results

| Modelled | | Estimated | |
| --- | --- | --- | --- |
| Wall thickness [mm] | Scale thickness [mm] | Wall thickness [mm] | Scale thickness [mm] |
| 7.0 | 0.0 | 6.6 | 0.7 |
| 7.0 | 3.0 | 7.0 | 2.7 |
| 7.0 | 6.0 | 6.9 | 5.8 |

Figure 29B:
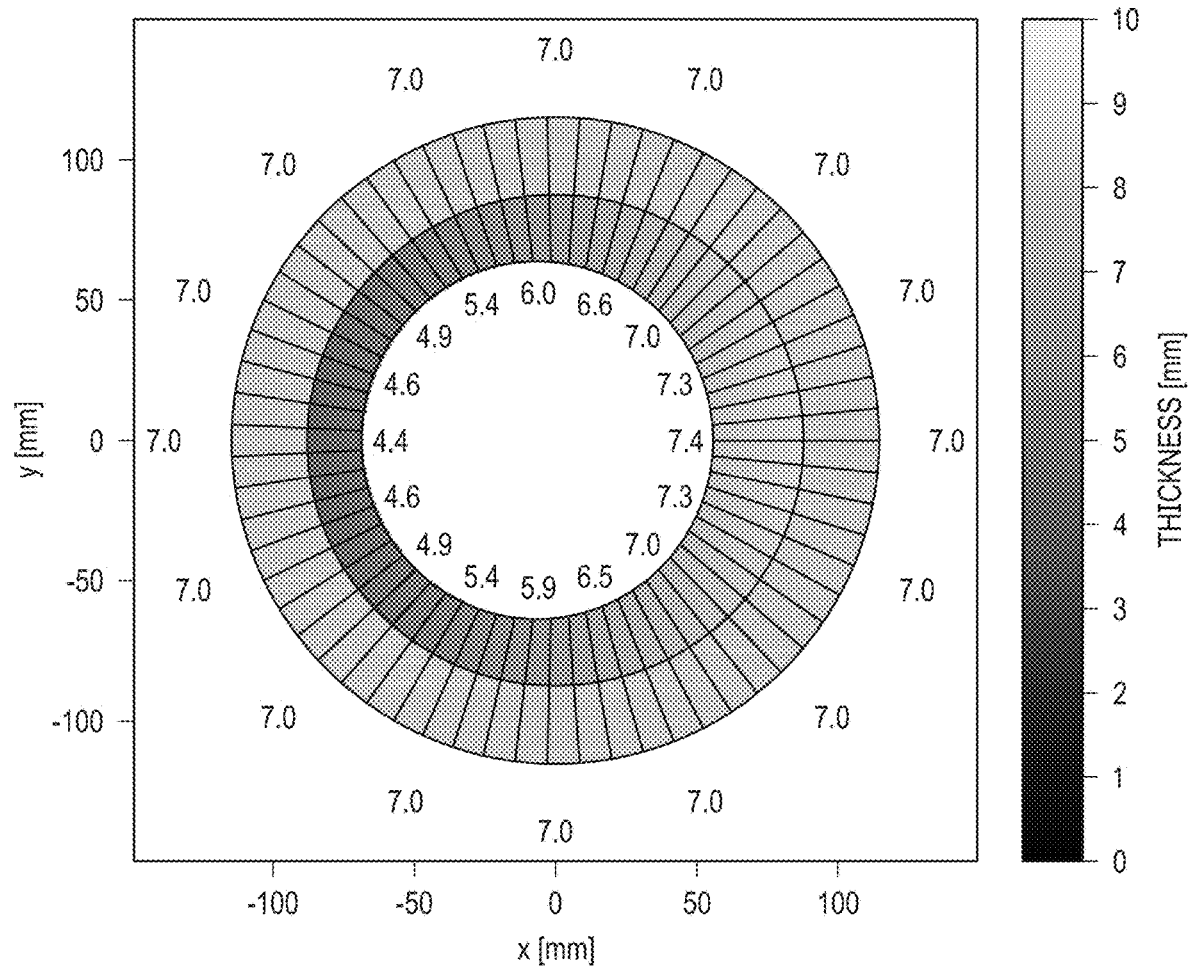

FIG. 29A is a plot of scale with a 6 mm nominal thickness and wall thickness sizing results from simulated data. In this example, simulated data is generated with the 3D finite difference scheme, and called "simulated data" because it mimics a real measurement by correctly modelling the underlying physics. FIG. 29A shows the inversion result for smooth scale thickness variation and FIG. 29B shows the inversion result for a true smooth scale thickness variation model. In other words, the inversion results shown in FIG. 29A and FIG. 29B shows the actual average wall thickness and scale thickness around the cross-section of the tubing. In this example, "average" means the average value between each transducer because the system measures the averaged thickness. In some examples, the thickness varies from 3 to 9 mm in the axial direction (50% variation, so +/−3 mm at 6 mm) and the system obtains 6 mm from the inversion, which is the average value. These simulation cases represent a scale and/or tubing thickness of a 25% thickness variation around the circumference of the tubing. In this example, FIG. 28 compared to FIG. 29 represents a comparison between modelled and inversion results. This demonstrates the concept of the system.

Comparing the inversion results of FIG. 29A with the actual model results of FIG. 29B, the extremes (min/max) (e.g., at a 3 o'clock and 9 o'clock position) scale thickness of the scale sizing is accurate within 0.5 mm. Overall the inversion results are quite good, with differences less than 0.5 mm. One explanation for this error is that the gradients in the recorded wave are minimal at these extremes. The recorded wave field is shown in FIGS. 29A-29C and FIGS. 30A-30C.

FIGS. 30A-30C are plots of the recorded torsional wave field for a smooth scale thickness variation around the tubing circumference. FIG. 30A plots the recorded $U_r$-component, FIG. 30B plots the recorded $U_\theta$-component, and FIG. 30C plots the recorded $U_z$-component. FIGS. 31A-31C are plots of the recorded torsional wave field for both wall thickness and scale thickness around the tubing circumference. FIG. 31A plots the recorded $U_r$-component, FIG. 31B plots the recorded $U_\theta$-component, and FIG. 31C plots the recorded $U_z$-component.

All three displacement components of the wave field are shown ($U_r$, $U_\theta$, $U_z$). At the extreme values of the wall/scale thickness, the wave field shows minimal circumferential gradients. The scale thickness varies smoothly around the circumference. For example, the zero degree position is the 12 o'clock position of FIG. 39A. Stationary points at the 3 o'clock and 9 o'clock position are shown in the recorded wave field. This provides reliable first arrival information in the time-frequency domain. This approach does not use the information that is embedded in the modes near their cut-off frequencies because there are refraction effects in the wave field which produce patterns at later time (for example, at the times where the system would expect the very slowly travelling waves (waves near the cut-off frequency)).

Figure 32:
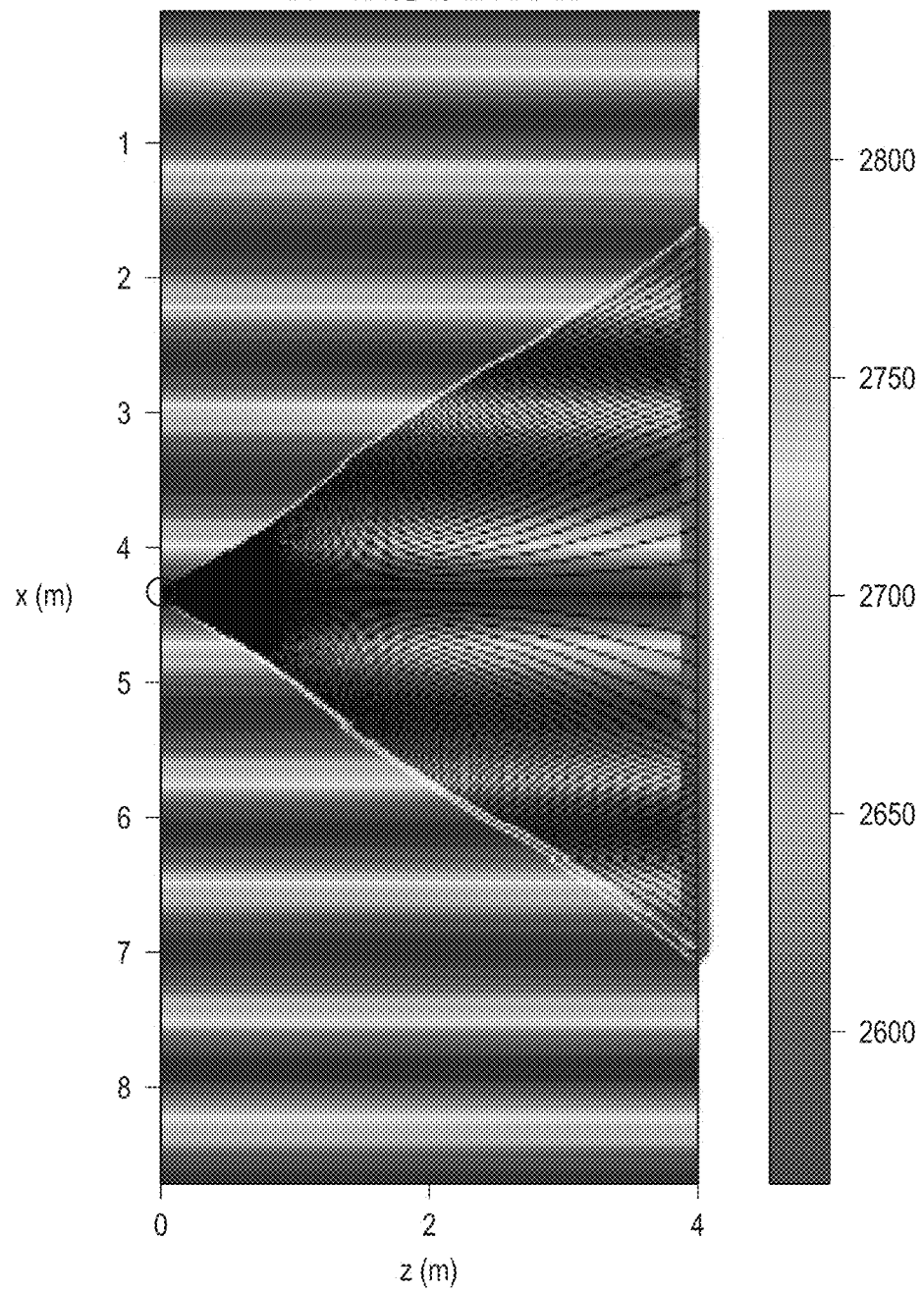
FIG. 32 is an example illustration of ray-tracing to account for varying thicknesses of the tubing cross-section.
Figure 43A:
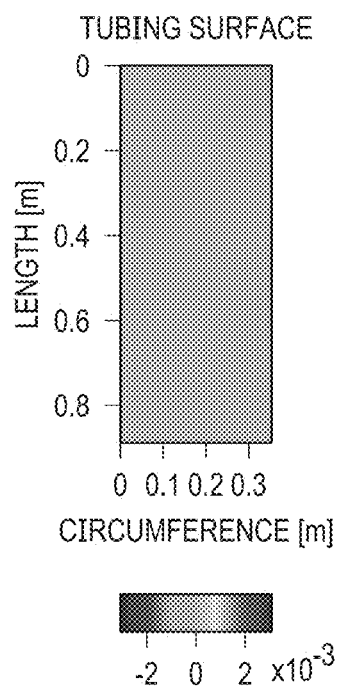
FIGS. 43A and 43B are plots of thickness variation indicating rough scale.
Figure 43B:
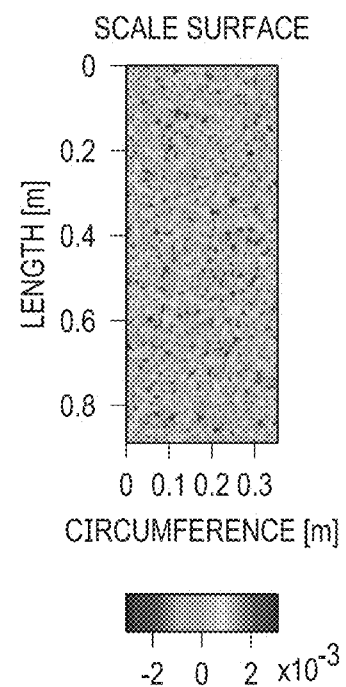

Some scale and corrosion monitoring systems 800 are used to measure scale and wall thickness sizing with rough scale. In this context "rough scale" means that the thickness varies locally, causing an irregular scale surface on the inside of the tubing. This is shown in FIGS. 43A and 43B where the colors represent the thickness variation (the inner surface profile of the scale inside the tubing). Some scale and corrosion monitoring systems 800 are used to measure scale and wall thickness sizing with an axial scale thickness variation. In this example, a non-axisymmetric excitation is used. For example, the system generates a non-axisymmetric wave by considering an axisymmetric wave as a plane wave travelling in the axial direction. As shown in FIG. 32, this non-axisymmetric wave would be a plane wave propagating in the horizontal direction. In some examples, the system generates a plane wave at another angle if a phase array transmitter is used. In this example, the refraction effect due to the axial gradient produces a different travel time compared to a constant scale thickness. The system uses this difference in travel time to detect axial gradients. Some scale and corrosion monitoring systems 800 are used to measure scale and wall thickness sizing with both wall thickness and scale thickness vary. In this example, the sum of the two is kept constant when one of the simulation cases show that both scale and wall thickness are measured.

Some scale and corrosion monitoring systems 800 account for refraction using a ray-tracing model. When the scale thickness is uniform, refraction can be ignored, but should be incorporated with scale thickness is not uniform. In some examples, refraction is ignored but becomes relevant when there are strong thickness changes around the circumference. The refraction effect is illustrated using ray tracing. The concept is then extended by, for example, assuming that the thickness varies sinusoidally around the circumference. In this example, the system calculates new arrival times by taking into account the refraction effects. In some cases, the scale and wall thickness sizing for circumferentially non-uniform scale thickness is influenced by refraction. The thickness variations of the scale or tubing wall influence the local wave velocity. For example, an axisymmetric wave is generated at the transmitter, but because the wave velocity changes in the circumferential direction due to refraction, the wave field will no longer be axisymmetric once it arrives at the receiver. In some scale and corrosion monitoring systems 800 refraction is taken into account when interpreting the measurements.

FIG. 32 is an example illustration of ray-tracing to account for varying thicknesses of the tubing cross-section. Refraction is taken into account using a ray-tracing model. Refraction alters the first arrival times as a function of frequency. Strong circumferential thickness variation causes the phase velocity of a specific wave mode to vary spatially. This happens when there is more scale on one side of the tubing wall than on the other. Ray-tracing is a method to model wave propagation through a varying velocity field and essentially uses Snell's law. The arrival time of each frequency and wave mode is calculated from the ray-tracing model. Ray tracing is done for each frequency assuming an initial thickness profile, for example, using current approach because we can already detect which parts of the profile are already correct. Then we would ray-trace for a number of relevant modes to find the first arrival time for all receivers. The first arrival times are compared to the measurement based on this the circumferential profile can be updated in an iterative scheme. An example of ray-tracing in an unfolded pipe is shown in FIG. 32. The scale thickness varies smoothly around the circumference (shown in the x-direction). The black lines indicate the ray at reach the receiving aperture (red markers), rays outside this aperture are shown in white. The rays are not straight but curved, as an indication that refraction plays a role.

Material properties have to be known in order to estimate the scale thickness and wall loss due to corrosion. The properties of the casing steel are very well known as a function of temperature. Measuring the tubing temperature and accounting for the temperature in the scale and corrosion monitoring system 800 provides an accurate sizing of wall loss. In some examples, temperature is measured on the outside of the pipe at 3 positions, 1 near the source, 1 near the receiver and 1 in the middle. In other examples, the system measures temperature near transmitter and near the receiver. The temperature dependence of the steel properties are known. Scale properties are derived from the measurements. The properties of scale may depend on temperature as well as the scale type. Particularly iron sulphate (Fe—S) scales appear in many different forms with different elastic properties. The consequence of using the incorrect elastic properties is that the scale thickness will be incorrectly determined by the scale and corrosion monitoring system 800.

Figure 33:
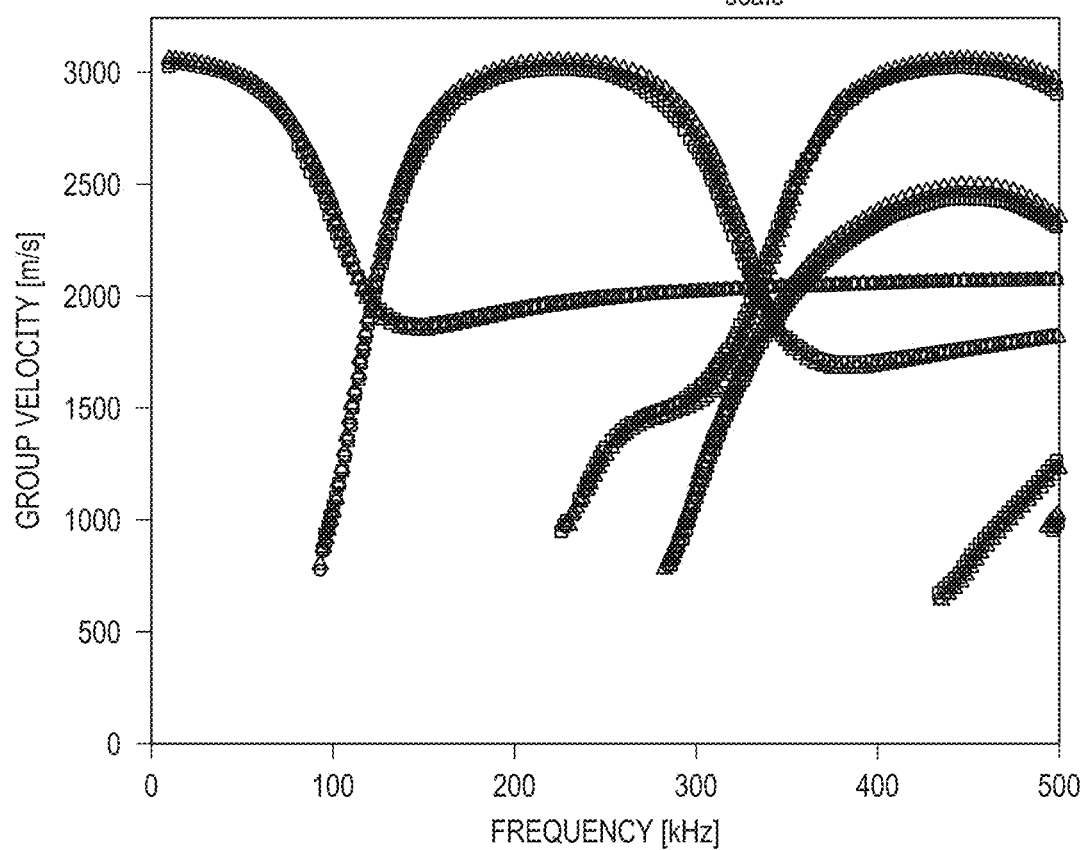
FIG. 33 is a plot of torsional wave dispersion curves with ±250 kg/m$^3$ difference in density around the nominal value

FIG. 33 is a plot of torsional wave dispersion curves with ±250 kg/m³ difference in density around the nominal value (black curves). The difference in density is ±250 kg/m³ and there is a minimal difference in group velocity. Therefore the density is not estimated. In the simulations we have the mass density of scale and of the tubing wall which are different. The analysis shows that the scale density is an irrelevant parameter and therefore ignored. The results indicate a very weak dependence between density and group velocity.

Some scale and corrosion monitoring systems 800 assume that the scale has an amorphous structure. This implies that all forms of scale have the same Poisson ratio which means that the ratio between compressional and shear wave velocity is fixed. This means that only one material parameter needs to be estimated (e.g., either compression or shear wave velocity). As the Poisson ratio is assumed constant, the system determines the shear wave velocity and the compressional wave velocity is then calculated. In the dispersion curve calculation both velocities are used. Some scale and corrosion monitoring systems 800 determine the scale shear wave velocity. This concept is evaluated using computed dispersion curves to evaluate how well scale shear wave velocity is resolved for different scale thicknesses. The minimum value of the objective function is calculated for varying shear wave velocities. The objective function is the sum of the absolute travel time differences between 'modelled' and 'measured' first arrival times for both torsional and longitudinal waves for a frequency interval from 100 to 500 kHz. In this example, the model is the same as the analytical model described above.

Figure 34:
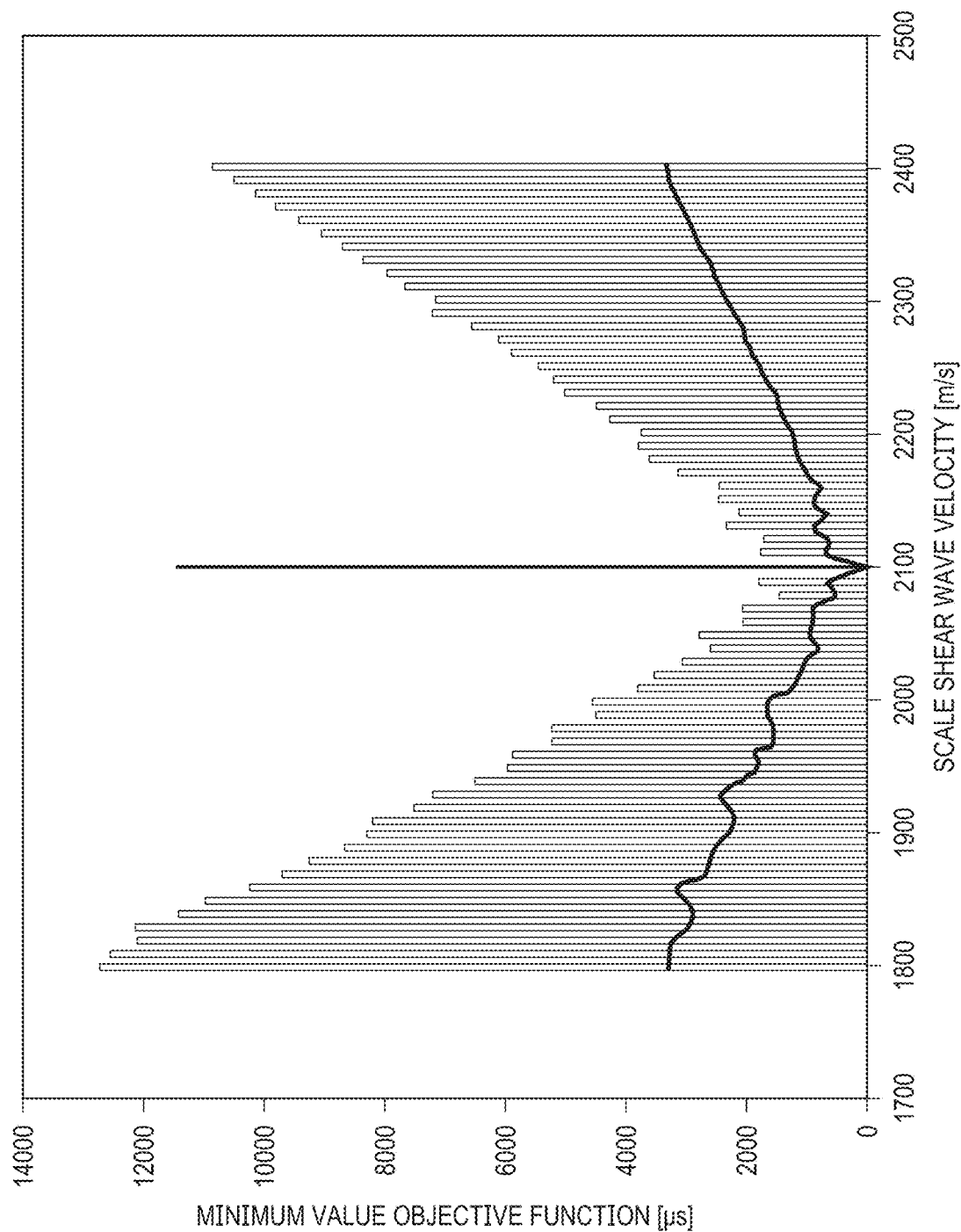
FIG. 34 is a bar plot of results for various scale thicknesses.

FIG. 34 is a bar plot of results for various scale thicknesses. Estimation of scale shear wave velocity. The bar plot shows the minimum value of the objective function for different shear wave velocities for a scale thickness of 6 mm. The contribution of the torsional waves to the total objective function is shown by the dark green curve. The bar plot shows the total objective function value, which includes the sum of the torsional and longitudinal wave contributions. The global minimum is the correct shear wave velocity and represents the correct shear wave velocity of 2100 m/s as determined from the model. The width of the global minimum and the number of local minima shows how well the shear wave velocity can be resolved.

From FIG. 34 it can be concluded that when the scale thickness is 6 mm or more, the shear wave velocity is well resolved. When there is no scale or only a thin layer, it is difficult to estimate the shear wave velocity accurately. In other words, when the scale thickness is relatively thin (less than 6 mm) it becomes more difficult to estimate the correct shear wave velocity using this approach and instead it is preferable to compute both scale shear wave velocity and scale compressional wave velocity. When the system is installed and initially there is no scale, the system assumes default values for the scale properties (shear/compressional wave velocities). In some examples, this assumption of default values produces a measurement error. Once there is sufficient scale build-up the system determines the values from the measurements as described.

The scale and corrosion monitoring system 110 determines an average of the wall thickness and the scale thickness between the axial position of the transmitter 142 and axial position of the receiver 144. In some examples, the distance between transmitter 142 and receiver 144 is predetermined within an accuracy of 5 mm. This distance is stored and input into the scale and corrosion monitoring controller 112 as an input parameter for data processing. In some examples, the system uses the distance measurement from the time frequency analysis. In this example, the system determines the arrival time as function of frequency and the calculated group velocity dispersion curves are converted to time. In this case, the system need the distance and time=distance/velocity.

FIGS. 35A and 35B are plots of scale thickness and wall thickness versus shear wave velocity. FIGS. 35A and 35B show an objective function for varying shear wave velocity for a scale with a scale thickness of 6 mm and 15 mm, respectively. A minimum of the objective function represents the predicted shear wave velocity and the true shear wave velocity is shown for reference. FIGS. 35A and 35B illustrate the resolution of determining the shear wave velocity. The red lines indicate measurement uncertainty.

Figure 36:
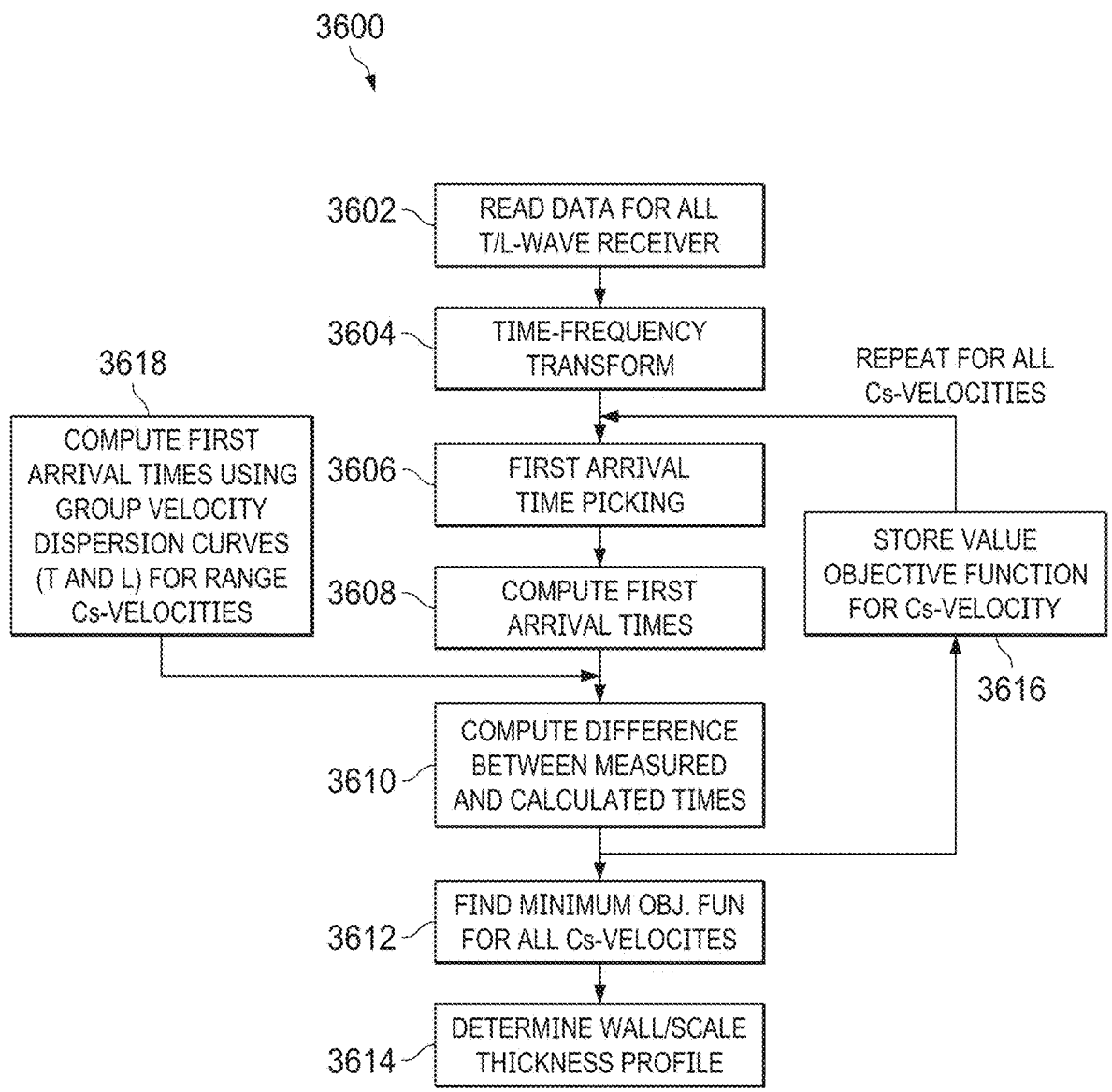
FIG. 36 is a flowchart of a method of a scale and corrosion monitoring system used according to the present disclosure.

FIG. 36 is a flowchart of a method 3600 of a scale and corrosion monitoring system used according to the present disclosure. The method 3600 includes reading 3602 data for all torsional and longitudinal waves from the receiver. The data is transformed 3604 into the frequency domain using the time-frequency transformation. The first arrival time is picked 3606 (or selected) from the measured data for both the longitudinal waves and the torsional waves. A range of first arrival time are computed 3608 from the model based for a range of scale thicknesses and/or wall thickness. In some cases, the range of first arrival times are pre-determined and retrieved from memory. The difference between the measured first arrival times and calculated first arrival times from the model is computed 3610. Step 3616 is essentially a database with dispersion curves for different scale thickness, wall thickness and shear wave velocity. This information is stored in memory because it can take a lot of time to calculate these. The used shear wave velocity affects the search window in the time picking (red lines in FIG. 25). The group velocity dispersion curves are used to find the highest velocity and then with the distance between the array to calculate the arrival time. The objective function is minimized 3612 for all shear wave speed velocities. The wall thickness and/or scale thickness profile is determined 3614.

Figure 37:
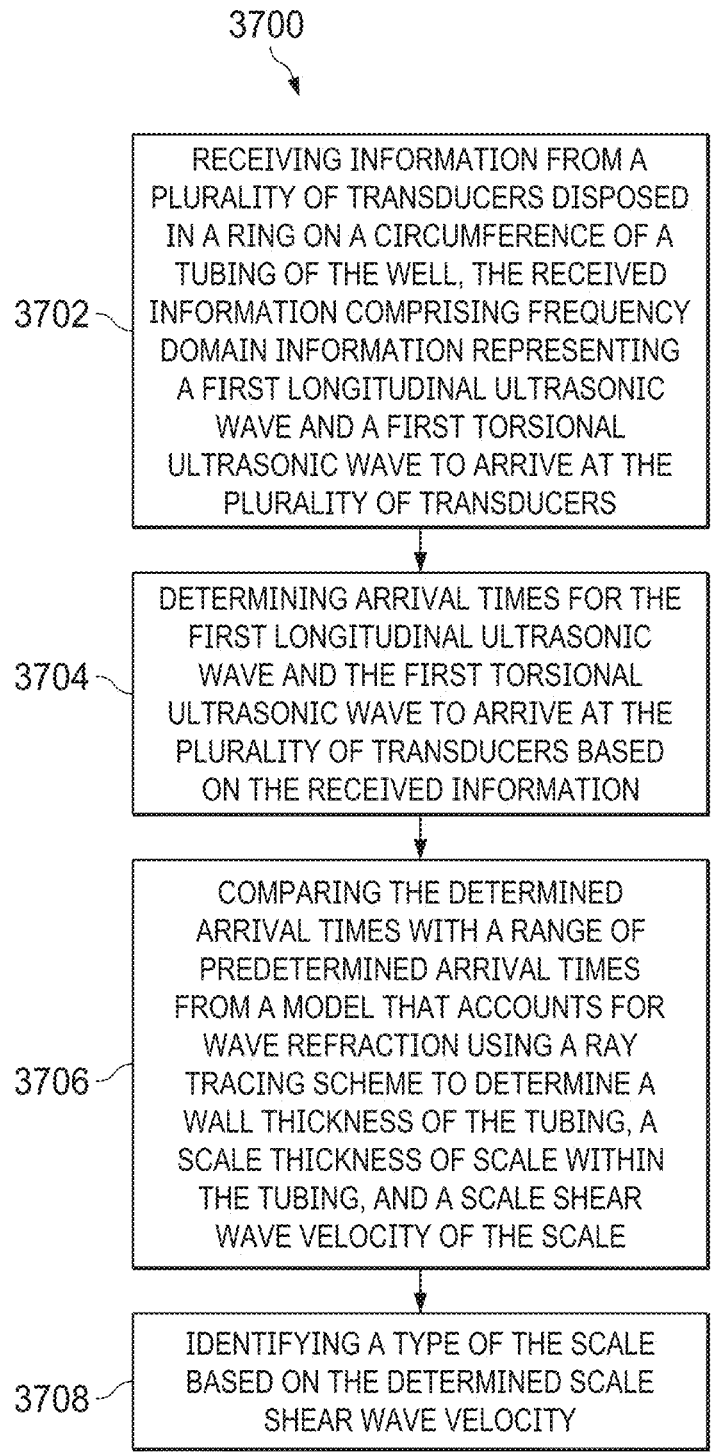
FIG. 37 is a flowchart of an alternate method of a scale and corrosion monitoring system used according to the present disclosure.

FIG. 37 is a flowchart of an alternate method 3700 of a scale and corrosion monitoring system used according to the present disclosure. The method 3700 includes receiving 3702 information from a plurality of transducers disposed in a ring on a circumference of a tubing of the well, the received information comprising frequency domain information representing a first longitudinal ultrasonic wave and a first torsional ultrasonic wave to arrive at the plurality of transducers.

The method includes 1100 determining 3704 arrival times for the first longitudinal ultrasonic wave and the first torsional ultrasonic wave to arrive at the plurality of transducers based on the received information. The method 3700 includes comparing 3706 the determined arrival times with a range of predetermined arrival times from a model that accounts for wave refraction using a ray tracing scheme to determine a wall thickness of the tubing, a scale thickness of scale within the tubing, and a scale shear wave velocity of the scale. The method 3700 includes identifying 3708 a material of the scale based on the determined scale shear wave velocity.

In some implementations, the method 3700 includes transmitting the first longitudinal ultrasonic wave and the first torsional ultrasonic wave using a transmitter disposed on the circumference of the tubing. In some cases, a source wavelet is transmitted with frequency content between 100 kHz and 500 kHz. In some cases, the first longitudinal ultrasonic wave and the first torsional ultrasonic wave is transmitted using a non-contact EMAT system. In some cases, the first longitudinal ultrasonic wave and the first torsional ultrasonic wave is transmitted using a piezo-electric system in bonded contact with the circumference of the tubing.

In some implementations, the wall thickness, the scale thickness, and the scale shear wave velocity is determined as a function of angular position around the circumference of the tubing. In some implementations, the wall thickness, the scale thickness, and the scale shear wave velocity is at each transducer location of the plurality of transducers.

In some implementations, the wall thickness, the scale thickness, and the scale shear wave velocity is determined by minimizing an objective function between the determined arrival times and the range of predetermined arrival times from the model. In some implementations, the method 1100 includes pumping fluid through the tubing to generate flow induced vibration that is measured by the plurality of transducers. In some implementations, the arrival times is determined by cross-correlating the received information between the plurality of transducers. In some implementations, the method 1100 includes damping vibrations using a vibration-absorbing material disposed around the circumference of the tubing and located adjacent to a joint of the tubing.

Figure 38:
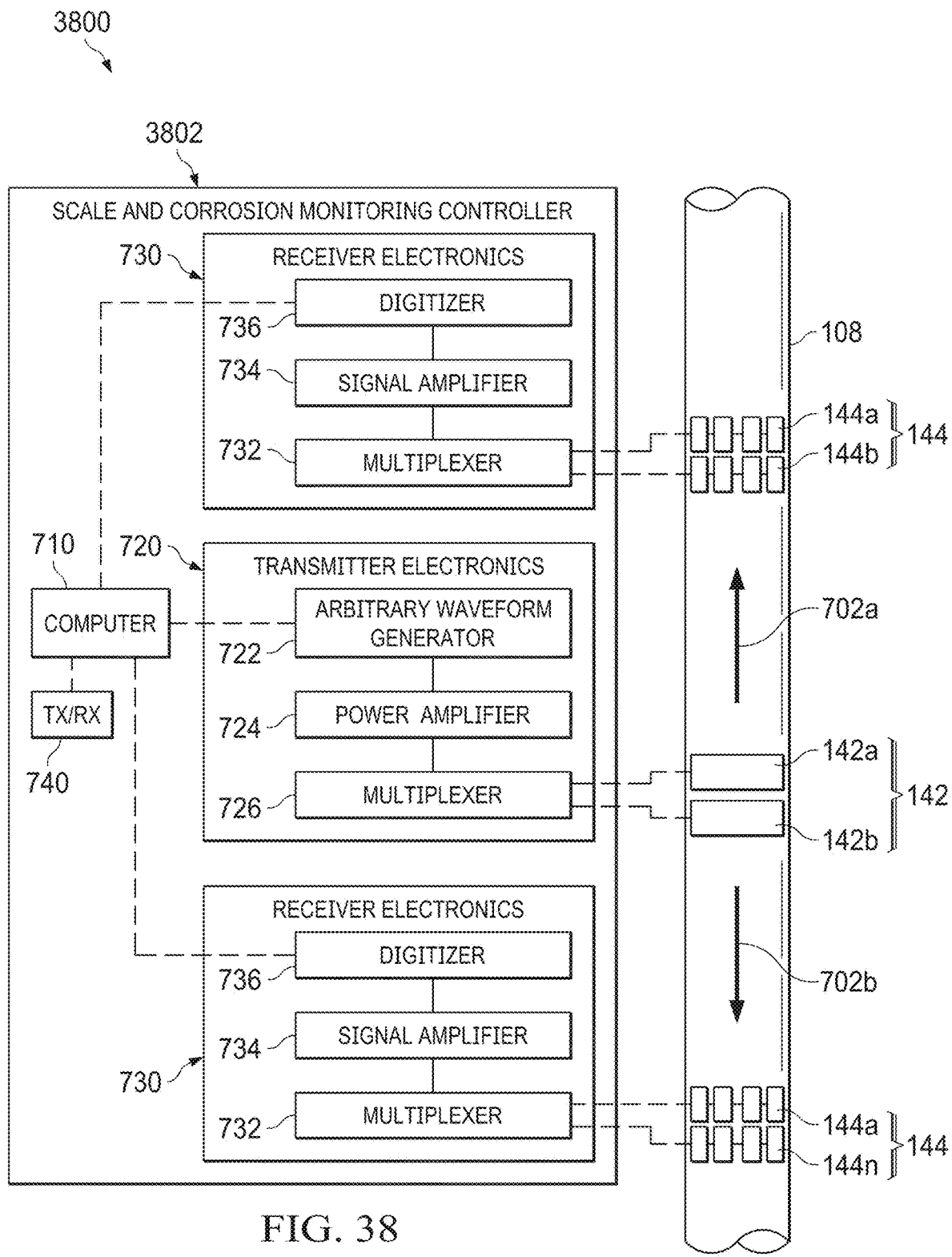
FIG. 38 is a schematic view of a wiring diagram of a scale and corrosion monitoring system according to the present disclosure.

FIG. 38 is a schematic view of a wiring diagram of a scale and corrosion monitoring system 3800 according to the present disclosure. The scale and corrosion monitoring system 3800 is substantially similar to the scale and corrosion monitoring system 110 but includes two sets of receiver electronics 730 instead of one set of receiver electronics 730. Each set of receiver electronics 730 is connected to a receiver 144 disposed on the tubing 108 so having two sets of receiver electronics 730 allows the scale and corrosion monitoring system 3800 to measure ultrasonic vibrations at more than one axial location along the tubing 108. In the example shown in FIG. 38, ultrasonic waves propagating through the side wall of the tubing 108 travel from the transmitter 142 in direction 702a to a first receiver 144 and in direction 702b to a second receiver 144.

In some examples, the transmitter 142 is arranged between the receivers 144. The distance between the transmitter 142 and each receiver 144 is the same. For example, positioning the receivers 144 with equal distance to the transmitter 142 is convenient because the system calculates the arrival times using the same distance. In this example, systems that use two receivers 144 are similar to systems that use one receiver but the actual distance between transmit and receive array is used by the system.

Figure 39:
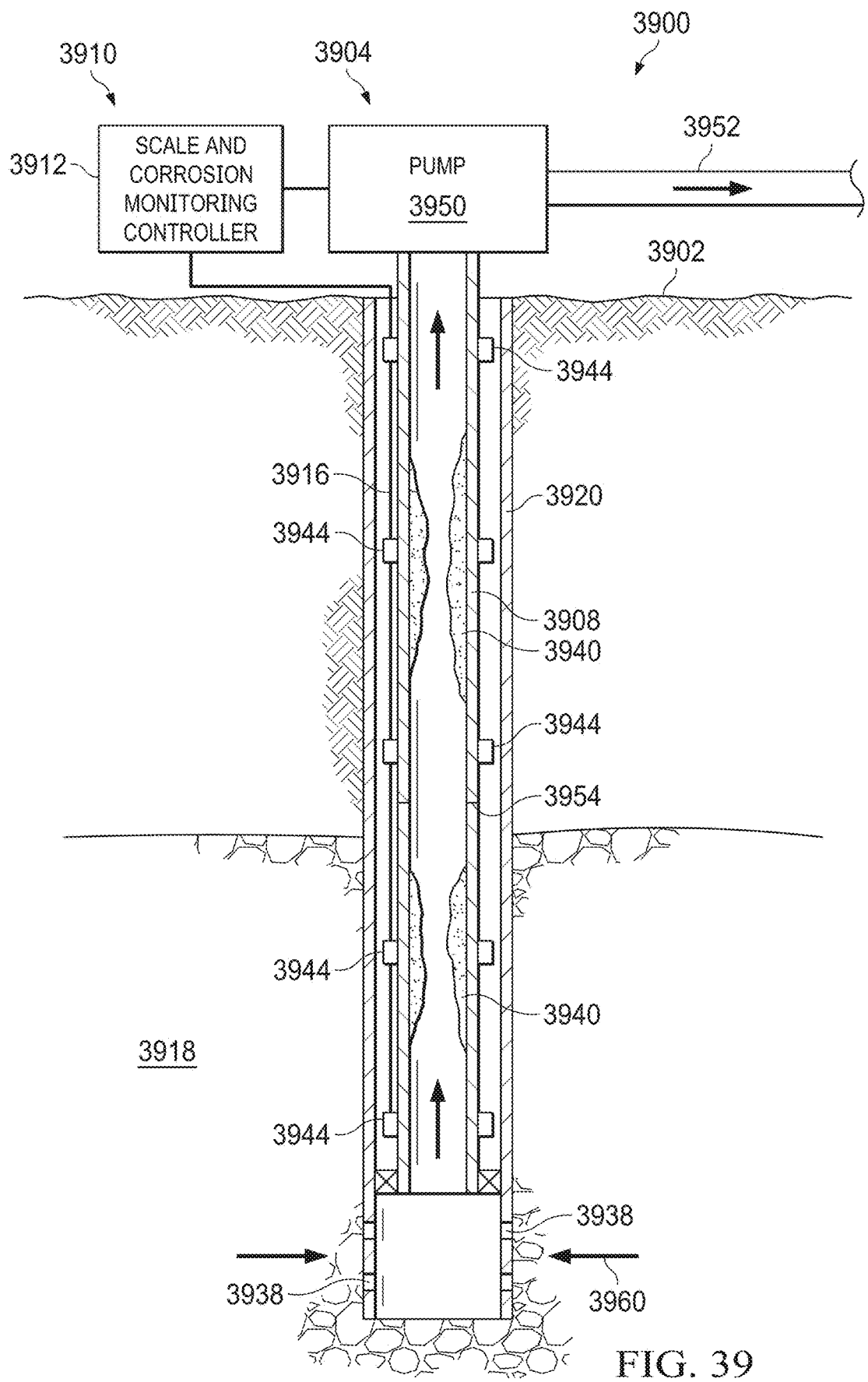
FIG. 39 is a schematic diagram of an example implementation of a wellbore system according to the present disclosure.

FIG. 39 is a schematic diagram of an example implementation of a wellbore system 3900 according to the present disclosure. The wellbore system 3900 is substantially similar to wellbore system 100, but uses the fluid flow 3960 of reservoir fluid to generate the ultrasonic waves instead of using a transmitter (such as the transmitter 142). In some examples, the fluid flow 3960 is a gas and/or exhibits turbulent flow that generates the ultrasonic waves on the wall of the tubing. In some examples, removing the transmitter from the system reduces the electrical power demand of the system by removing a need for a power amplifier.

The wellbore system 3900 includes a wellbore 3904 with a casing 3920 positioned and set around the wellbore 3904 from the surface 3902 into a particular depth in the Earth. In some cases, the casing 3920 is a production casing 3922 and in other cases, the casing 3920 is a surface casing 3920. Cement 3930 is positioned around the casing 3920 in an annulus between the casing 3920 and the wellbore 3904. In the example shown in FIG. 39, the wellbore system 3900 includes one or more perforations 3938 that are formed in the wellbore 3904.

The wellbore system 3900 includes a pump 3950 for pumping the reservoir fluid from a reservoir, through the one or more perforations 3938, through the tubing 3908 up to the surface 3902 (generally denoted by the flow direction 3960).

The pump 3950 pumps the reservoir fluid through a pipeline 3952 that is connected to distribution plant for reservoir fluid processing and storage.

The wellbore system 3900 includes a scale and corrosion monitoring system 3910 with a controller 3912 for controlling the scale and corrosion monitoring system 3910 for detecting scale and corrosion of a tubing 3908 of the wellbore system 3900. In some examples, the controller 3912 includes one or more processors and other computer components of a controller 4400 described with reference to FIG. 44. Instead of using a transmitter, one or more receivers 3944 are located along the axial length of the tubing 3908 and measure ultrasonic waves generated from the flow of the reservoir fluid through the tubing 3908. In some examples, this flow is caused by the pump 3950.

By cross-correlating signals recorded by at two receivers 3944, the required transfer function between two points can be obtained. For example, turbulence in the wall induce waves in the tubing wall, these wave pass along array 1 and array 2. At array 2 the wave field is the same as at array 1 but has travelled a certain distance more along the tubing. In this context, "cross-correlation" means subtracting the part of the signals in common so that the only substantial difference is the distance that the wave travelled from array 1 to array 2. So after cross-correlation it appear that array 1 acts as transmitter and array 2 as receiver. The rest of the processing is substantially similar to above noted processing. In some examples, by correlating the signals of this receiver with the signals on the phased receiver array, the required response can be obtained without actively transmitting waves. In some examples, the phased receiver array is the receiver.

Some scale and corrosion monitoring systems 3910 detects when a layer of scale 3940 develops on an inside diameter of the tubing 3908 using the cross-correlated signals instead of using a transmitter. As with wellbore system 100, in some examples, the layer of scale 3940 develops over time as fluid and gas flow from the subterranean formation 3918, through the tubing 3908, and out of the wellbore 3904. In some implementations, the scale and corrosion monitoring system 3910 detects when the tubing 3908 wall thickness changes due to, for example, corrosion.

The scale and corrosion monitoring system 110 includes one or more receiver 3944 located on the outside circumference of the tubing 3908. The receiver 3944 is also in communication with the controller 3912 via the electrical connection 3916. The receiver 3944 receives both the longitudinal and torsional ultrasonic waves. In this way, the ultrasonic waves travel, in the form of mechanical vibrations, longitudinally along the sidewall of the tubing 108 from a source of the flow induced vibration to the receiver 144. In this example, both torsional and longitudinal waves are measured with this flow induced vibration system using a mode-specific receiver. A mode-specific receiver eliminates the need to measure a combination of both at the same time.

The scale and corrosion monitoring system 110 determines an average of the wall thickness and the scale thickness between the axial positon of the transmitter 142 and axial position of the receiver 144. The system does not need to know the source when using flow induced waves because the correlation processes gives the propagation between the arrays as described above.

Figure 40:
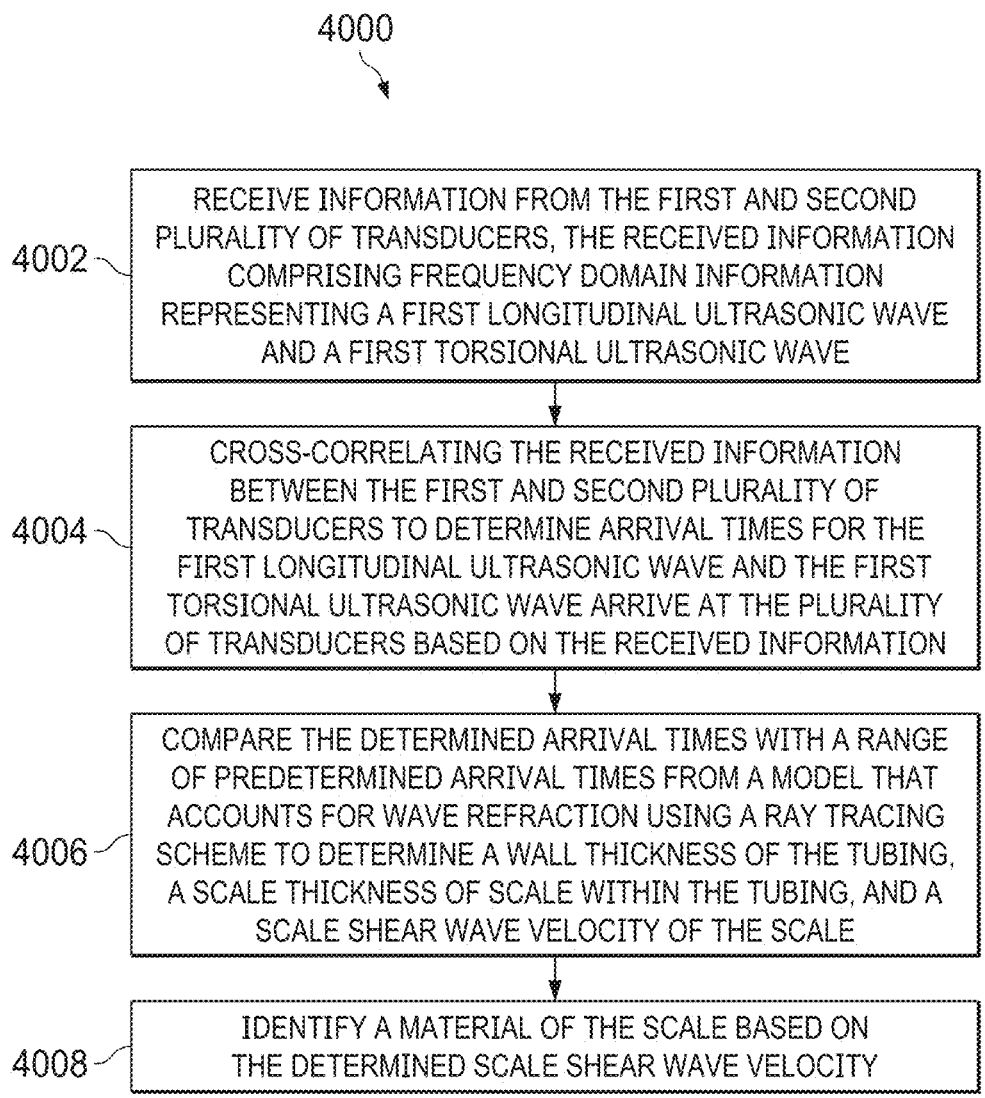
FIG. 40 is a flowchart of an alternate method of a scale and corrosion monitoring system used according to the present disclosure.

FIG. 40 is a flowchart of an alternate method 4000 of a scale and corrosion monitoring system used according to the present disclosure. The method 4000 includes receiving 4002 information from the first and second plurality of transducers, the received information comprising frequency domain information representing a first longitudinal ultrasonic wave and a first torsional ultrasonic wave. The method includes cross-correlating 4002 the received information between the first and second plurality of transducers to determine arrival times for the first longitudinal ultrasonic wave and the first torsional ultrasonic wave arrive at the plurality of transducers based on the received information.

The method includes comparing 4004 the determined arrival times with a range of predetermined arrival times from a model that accounts for wave refraction using a ray tracing scheme to determine a wall thickness of the tubing, a scale thickness of scale within the tubing, and a scale shear wave velocity of the scale. The method includes identifying 4006 a material of the scale based on the determined scale shear wave velocity.

Figure 44:
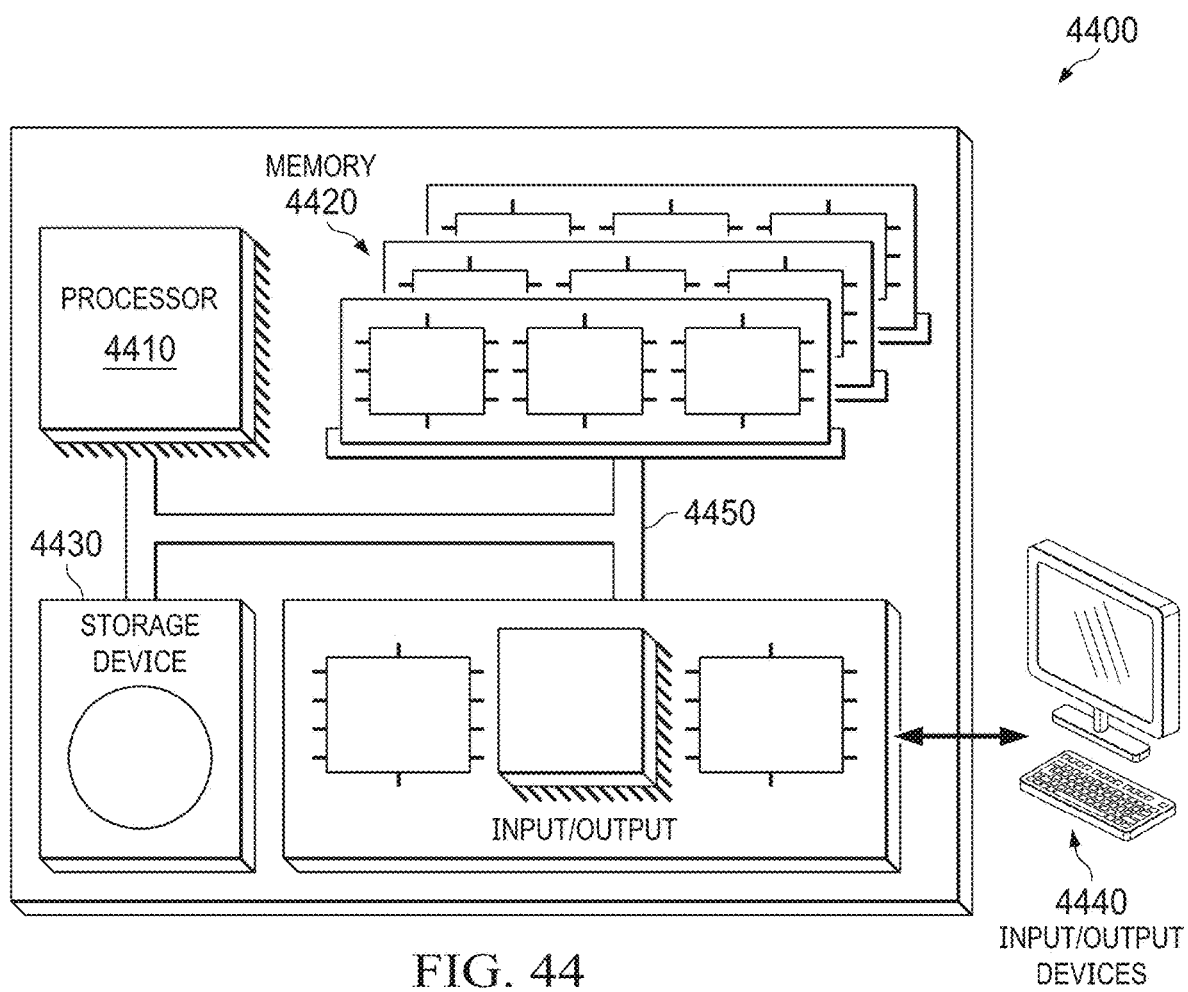
FIG. 44 is a schematic illustration of an example controller for a scale and corrosion monitoring system described in this disclosure.

FIG. 44 is a schematic illustration of an example controller 4400 (or control system) for a scale and corrosion monitoring system described in this disclosure. For example, the controller 4400 may include or be part of controllers 112 and/or 3912. The controller 4400 is intended to include various forms of digital computers, such as printed circuit boards (PCB), processors, digital circuitry, or otherwise parts of a system for determining a subterranean formation breakdown pressure. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 4400 includes a processor 4410, a memory 4420, a storage device 4430, and an input/output device 4440 (for displays, input devices, example, sensors, valves, pumps). Each of the components 4410, 4420, 4430, and 4440 are interconnected using a system bus 4050. The processor 4410 is capable of processing instructions for execution within the controller 4400. The processor may be designed using any of a number of architectures. For example, the processor 4410 may be a CISC (Complex Instruction Set Computers) processor, a RISC (Reduced Instruction Set Computer) processor, or a MISC (Minimal Instruction Set Computer) processor.

In one implementation, the processor 4410 is a single-threaded processor. In another implementation, the processor 4410 is a multi-threaded processor. The processor 4410 is capable of processing instructions stored in the memory 4420 or on the storage device 4430 to display graphical information for a user interface on the input/output device 4440.

The memory 4420 stores information within the controller 4400. In one implementation, the memory 4420 is a computer-readable medium. In one implementation, the memory 4420 is a volatile memory unit. In another implementation, the memory 4420 is a non-volatile memory unit.

The storage device 4430 is capable of providing mass storage for the controller 4400. In one implementation, the storage device 4430 is a computer-readable medium. In various different implementations, the storage device 4430 may be a floppy disk device, a hard disk device, an optical disk device, or a tape device.

The input/output device 4440 provides input/output operations for the controller 4400. In one implementation, the input/output device 4440 includes a keyboard and/or pointing device. In another implementation, the input/output device 4440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method for a scale and corrosion monitoring system for a well, the method comprising:
    receiving information from a plurality of transducers disposed in a ring on a circumference of a tubing of the well, the received information comprising frequency domain information representing a first longitudinal ultrasonic wave and a first torsional ultrasonic wave to arrive at the plurality of transducers;
    determining arrival times for the first longitudinal ultrasonic wave and the first torsional ultrasonic wave to arrive at the plurality of transducers based on the received information;
    comparing the determined arrival times with a range of predetermined arrival times from a model to determine a wall thickness of the tubing, a scale thickness of scale within the tubing, and a scale shear wave velocity of the scale;
    identifying a material of the scale based on the determined scale shear wave velocity; and
    at least partially removing the scale of the well based on the identified material of the scale or the determined scale thickness of the scale.

2. The method of claim 1, wherein comparing the determined arrival times with the model comprises accounting for wave refraction using a ray tracing scheme.

3. The method of claim 1, further comprising transmitting the first longitudinal ultrasonic wave and the first torsional ultrasonic wave using a plurality of transmitters disposed on the circumference of the tubing, each transmitter of the plurality of transmitters transmitting at the same time.

4. The method of claim 3, wherein transmitting the first longitudinal ultrasonic wave and the first torsional ultrasonic wave comprises transmitting a source wavelet with frequency content between 100 kHz and 500 kHz.

5. The method of claim 3, wherein transmitting the first longitudinal ultrasonic wave and the first torsional ultrasonic wave comprises transmitting the first longitudinal ultrasonic wave and the first torsional ultrasonic wave using a non-contact EMAT system.

6. The method of claim 3, wherein transmitting the first longitudinal ultrasonic wave and the first torsional ultrasonic wave comprises transmitting the first longitudinal ultrasonic wave and the first torsional ultrasonic wave using a piezo-electric system in bonded contact with the circumference of the tubing.

7. The method of claim 1, wherein determining the wall thickness, the scale thickness, and the scale shear wave velocity comprises determining the wall thickness, the scale thickness, and the scale shear wave velocity as a function of angular position around the circumference of the tubing.

8. The method of claim 1, wherein determining the wall thickness, the scale thickness, and the scale shear wave velocity comprises determining the wall thickness, the scale thickness, and the scale shear wave velocity at each transducer location of the plurality of transducers.

9. The method of claim 1, wherein determining the wall thickness, the scale thickness, and the scale shear wave velocity comprises determining the wall thickness, the scale thickness, and the scale shear wave velocity by minimizing an objective function between the determined arrival times and the range of predetermined arrival times from the model.

10. The method of claim 1, further comprising pumping fluid through the tubing to generate flow induced vibration that is measured by the plurality of transducers.

11. The method of claim 1, wherein determining arrival times comprises cross-correlating the received information between the plurality of transducers.

12. The method of claim 1, further comprising damping vibrations using a vibration-absorbing material disposed around the circumference of the tubing and located adjacent to a joint of the tubing.

13. The method of claim 1, wherein identifying the material of the scale based on the determined scale shear wave velocity comprises identifying the material of the scale from a set of materials based on an assumption that each material of the set of materials has the same Poisson's ratio.

14. The method of claim 13, further comprising determining a scale compressional wave velocity of the scale based on the determined scale shear wave velocity.

15. The method of claim 1, wherein identifying the material of the scale based on the determined scale shear wave velocity comprises identifying the material of the scale based on a linear interpolation of the determined scale shear wave velocity.

16. The method of claim 1, wherein identifying the material of the scale based on the determined scale shear wave velocity comprises, responsive to determining that the scale thickness is less than a thickness threshold, (i) determining a compressional scale wave velocity of the scale, and (ii) identifying the material of the scale based on the determined scale shear wave velocity and the determined compressional scale wave velocity.

17. The method of claim 16, wherein the thickness threshold is 6 mm.

18. A scale and corrosion monitoring system for a well, the system comprising:
a plurality of transmitters disposed on a circumference of a tubing of the well for transmitting axisymmetric longitudinal and torsional ultrasonic waves along a longitudinal axis of the tubing, each transmitter of the plurality of transmitters operable to transmit at the same time;
a plurality of transducers disposed in a ring on the circumference of the tubing for measuring the transmitted longitudinal and torsional ultrasonic waves from the plurality of transmitters; and
one or more processors in electronic communication the plurality of transmitters and the plurality of the transducers, the one or more processors operable to:
receive information from the plurality of transducers, the received information comprising frequency domain information representing a first longitudinal ultrasonic wave and a first torsional ultrasonic wave to arrive at the plurality of transducers;
determine arrival times for the first longitudinal ultrasonic wave and the first torsional ultrasonic wave arrive at the plurality of transducers based on the received information;
compare the determined arrival times with a range of predetermined arrival times from a model to determine a wall thickness of the tubing, a scale thickness of scale within the tubing, and a scale shear wave velocity of the scale; and
identify a material of the scale based on the determined scale shear wave velocity.

19. The system of claim 18, wherein the model accounts for wave refraction using a ray tracing scheme.

20. The system of claim 18, wherein the plurality of transmitters are operable to transmit a source wavelet with frequency content between 100 kHz and 500 kHz.

21. The system of claim 18, wherein the plurality of transducers are mechanically mounted in at least two transducer rings and the plurality of transmitters are arranged between the at least two transducer rings.

22. The system of claim 18, wherein the tubing comprises a layer of vibration-absorbing material disposed around the circumference of the tubing and located adjacent to a joint of the tubing, the layer of vibration-absorbing material comprising a length of at least 25 cm along a longitudinal direction of the tubing.

23. The system of claim 18, wherein the plurality of transmitters comprise either a non-contact EMAT system or a piezo-electric system in bonded contact with an outside surface of the tubing.

24. A scale and corrosion monitoring system for a well, the system comprising:
a first transducer ring disposed around a circumference of a tubing of the well, the first transducer ring comprising a first plurality of transducers for measuring longitudinal ultrasonic waves and torsional ultrasonic waves;
a second transducer ring disposed around the circumference of the tubing, the second transducer ring comprising a second plurality of transducers for measuring longitudinal ultrasonic waves and torsional ultrasonic waves; and one or more processors in electronic communication the first and second plurality of transducers, the one or more processors operable to:
- receive information from the first and second plurality of transducers, the received information comprising frequency domain information representing a first longitudinal ultrasonic wave and a first torsional ultrasonic wave;
- cross-correlating the received information between the first and second plurality of transducers to determine arrival times for the first longitudinal ultrasonic wave and the first torsional ultrasonic wave arrive at the first and/or second plurality of transducers based on the received information;
- compare the determined arrival times with a range of predetermined arrival times from a model to determine a wall thickness of the tubing, a scale thickness of scale within the tubing, and a scale shear wave velocity of the scale; and
- identify a material of the scale based on the determined scale shear wave velocity.

25. The system of claim 24, further comprising a pump for pumping fluid through the tubing to generate flow induced vibration in the tubing to generate the longitudinal ultrasonic waves and torsional ultrasonic waves.

* * * * *